United States Patent
Hattori et al.

(10) Patent No.: US 8,031,980 B2
(45) Date of Patent: Oct. 4, 2011

(54) IMAGE PROCESSING APPARATUS AND INFORMATION PROCESSING SYSTEM

(75) Inventors: Yasuhiro Hattori, Kanagawa (JP); Yukinori Ishii, Kanagawa (JP); Satoru Sugishita, Tokyo (JP); Yoshiko Aono, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1080 days.

(21) Appl. No.: 11/802,479

(22) Filed: May 23, 2007

(65) Prior Publication Data
US 2007/0279667 A1    Dec. 6, 2007

(30) Foreign Application Priority Data

| May 29, 2006 | (JP) | 2006-148861 |
| May 29, 2006 | (JP) | 2006-148862 |
| May 29, 2006 | (JP) | 2006-148863 |
| Mar. 29, 2007 | (JP) | 2007-088518 |

(51) Int. Cl.
*G06K 9/60* (2006.01)

(52) U.S. Cl. ........ 382/305; 382/189; 382/216; 382/307; 358/403; 358/408

(58) Field of Classification Search .................. 382/305, 382/307, 189; 358/403
See application file for complete search history.

(56) References Cited

U.S. PATENT DOCUMENTS

| 4,315,315 A | 2/1982 | Kossiakoff |
| 5,386,568 A | 1/1995 | Wold et al. |
| 6,226,102 B1 | 5/2001 | Koike et al. |
| 6,429,812 B1 * | 8/2002 | Hoffberg ................. 342/357.31 |
| 6,640,145 B2 * | 10/2003 | Hoffberg et al. ................. 700/83 |
| 6,691,134 B1 * | 2/2004 | Babula et al. ......................... 1/1 |
| 6,704,039 B2 * | 3/2004 | Pena ........................... 348/14.01 |
| 6,985,929 B1 * | 1/2006 | Wilson et al. ................. 709/217 |
| 7,013,289 B2 * | 3/2006 | Horn et al. ...................... 705/26 |
| 7,098,293 B2 * | 8/2006 | Van Schijndel et al. ....... 528/272 |
| 7,167,262 B2 | 1/2007 | Muramoto et al. |
| 7,249,059 B2 * | 7/2007 | Dean et al. ...................... 705/26 |
| 7,415,715 B2 * | 8/2008 | Fradkov et al. ................ 719/328 |
| 2001/0034879 A1 | 10/2001 | Washington et al. |
| 2004/0003372 A1 | 1/2004 | Sato et al. |

(Continued)

FOREIGN PATENT DOCUMENTS

EP    0 295 760    12/1988

(Continued)

OTHER PUBLICATIONS

Konstantinos Konstantinides. "The Khoros Software Development for Image and Signal Processing," IEEE Transactions on Image Processing, IEEE Service Center, Piscataway, NJ, US, vol. 3, No. 3, May 1, 1994, pp. 243-252.

(Continued)

*Primary Examiner* — Yosef Kassa
(74) *Attorney, Agent, or Firm* — Harness, Dickey & Pierce, PLC

(57) ABSTRACT

A disclosed image processing apparatus includes process components configured to input, process, or output image data; and a registration unit configured to obtain a list of the process components available in the image processing apparatus, to display on a display unit a screen for selecting one or more of the process components from the list and thereby defining a combination of the process components which combination implements an application program for performing an image processing task, and to register the combination with an identifier in the image processing apparatus.

20 Claims, 40 Drawing Sheets

U.S. PATENT DOCUMENTS

| | | |
|---|---|---|
| 2005/0166184 A1 | 7/2005 | Takao |
| 2005/0174675 A1 | 8/2005 | Hattori et al. |
| 2007/0041047 A1 | 2/2007 | Sugishita |

FOREIGN PATENT DOCUMENTS

| | | |
|---|---|---|
| JP | 2002-084383 | 3/2002 |
| JP | 2002-254762 | 9/2002 |
| JP | 2003-91393 | 3/2003 |
| JP | 2005-196367 | 7/2005 |
| JP | 2005-196414 | 7/2005 |
| JP | 2005-275476 | 10/2005 |
| WO | WO 01/25905 | 4/2001 |

OTHER PUBLICATIONS

Zdravko Kacic. "Laboratory Course on Speech Processing Using Khoros Development Environment." Conference Proceedings, ESCA/Socrates Matisse, Apr. 16-17, 1999, pp. 117-120.

Khoral Research, Inc. "The Khoros Visual Programming Environment, Chapter 1 and Appendix A." Internet Citation, Dec. 20, 1994. Retrieved from the Internet: URL: ftp://ftp.tnt.uni-hannover.de/pub/soft/khoros2/manual/khoros_manual/ [retrieved on Jun. 23, 2004].

European Search Report.

Japanese Office Action dated Jan. 18, 2011 for JP Application No. 2006-148863.

\* cited by examiner

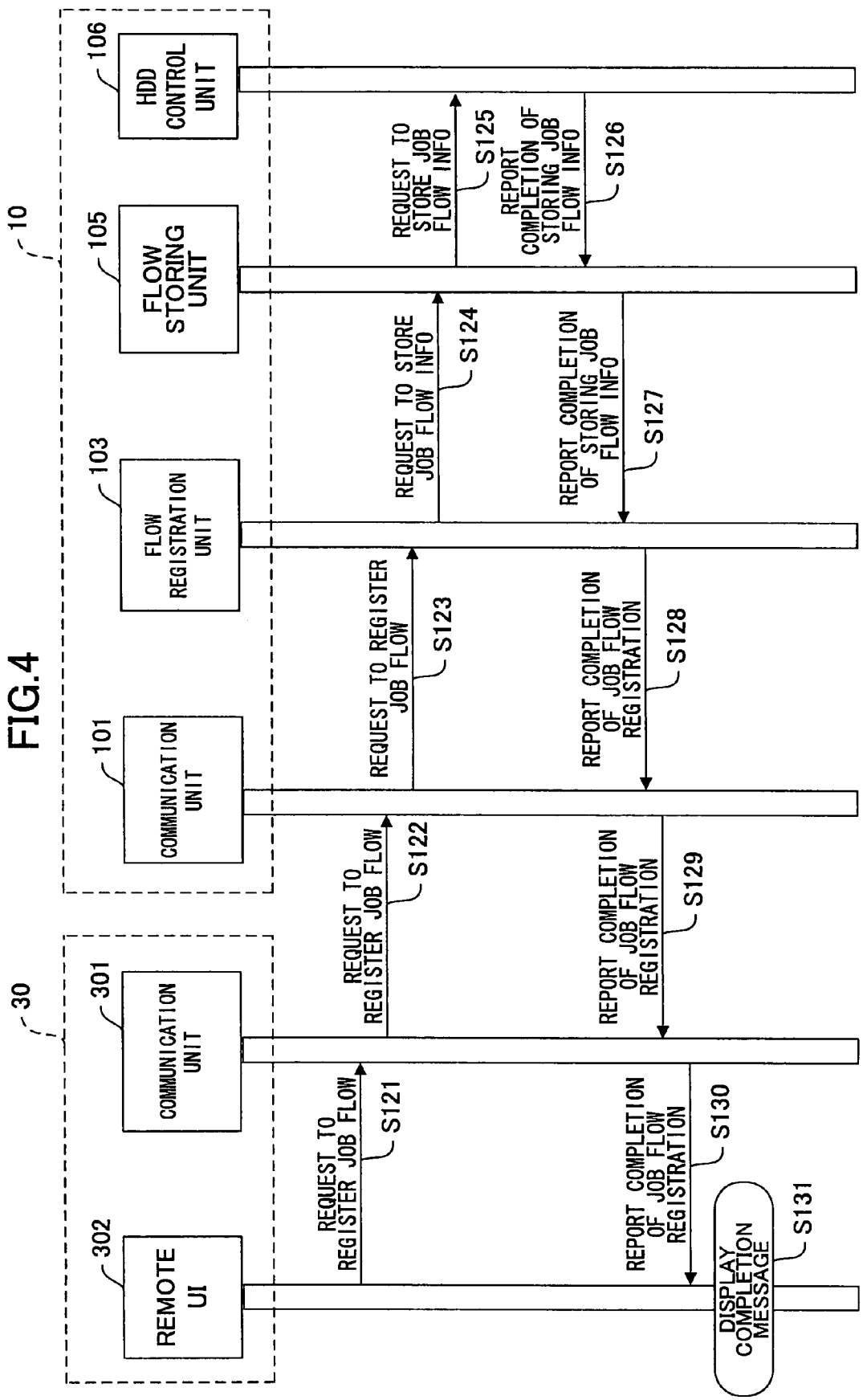

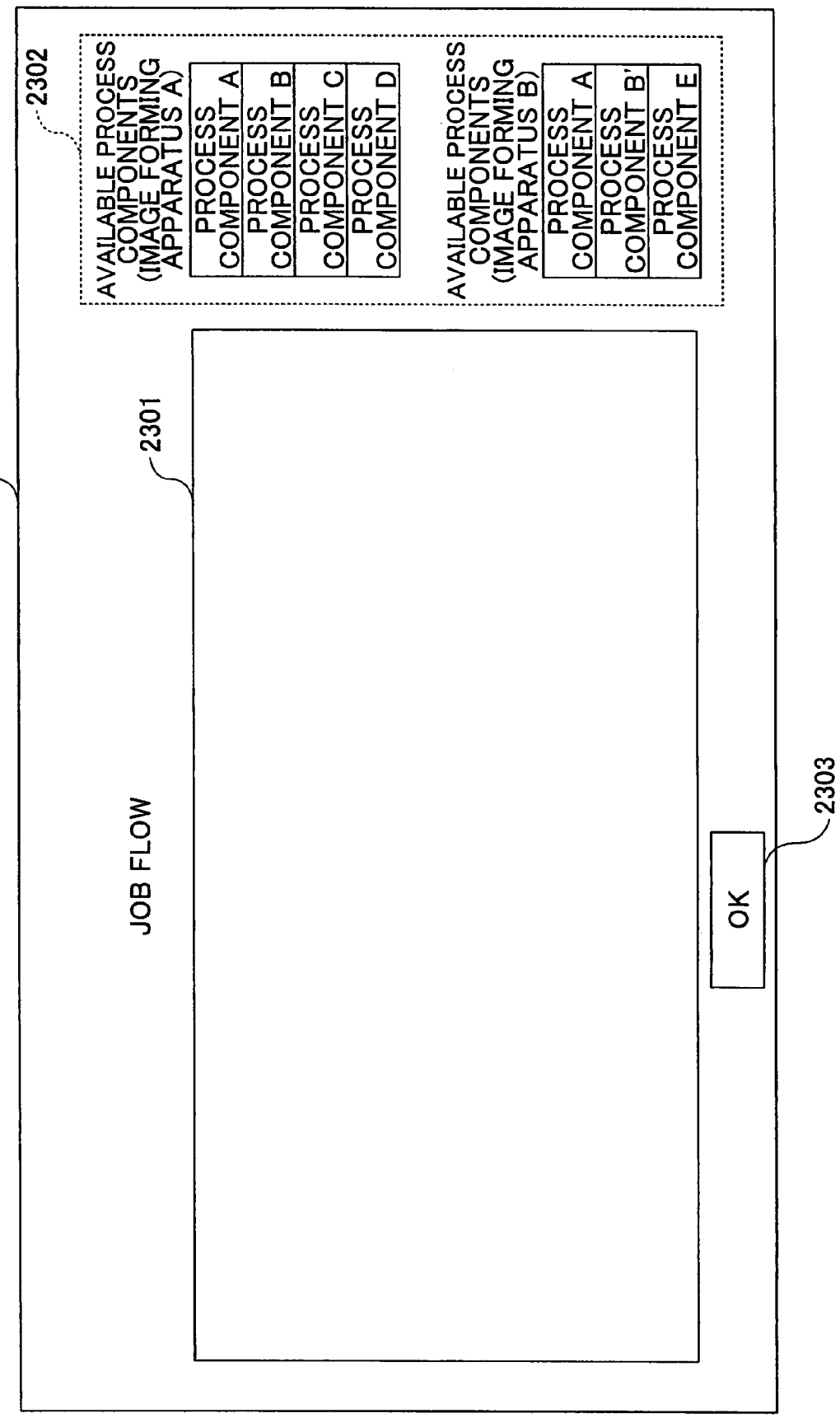

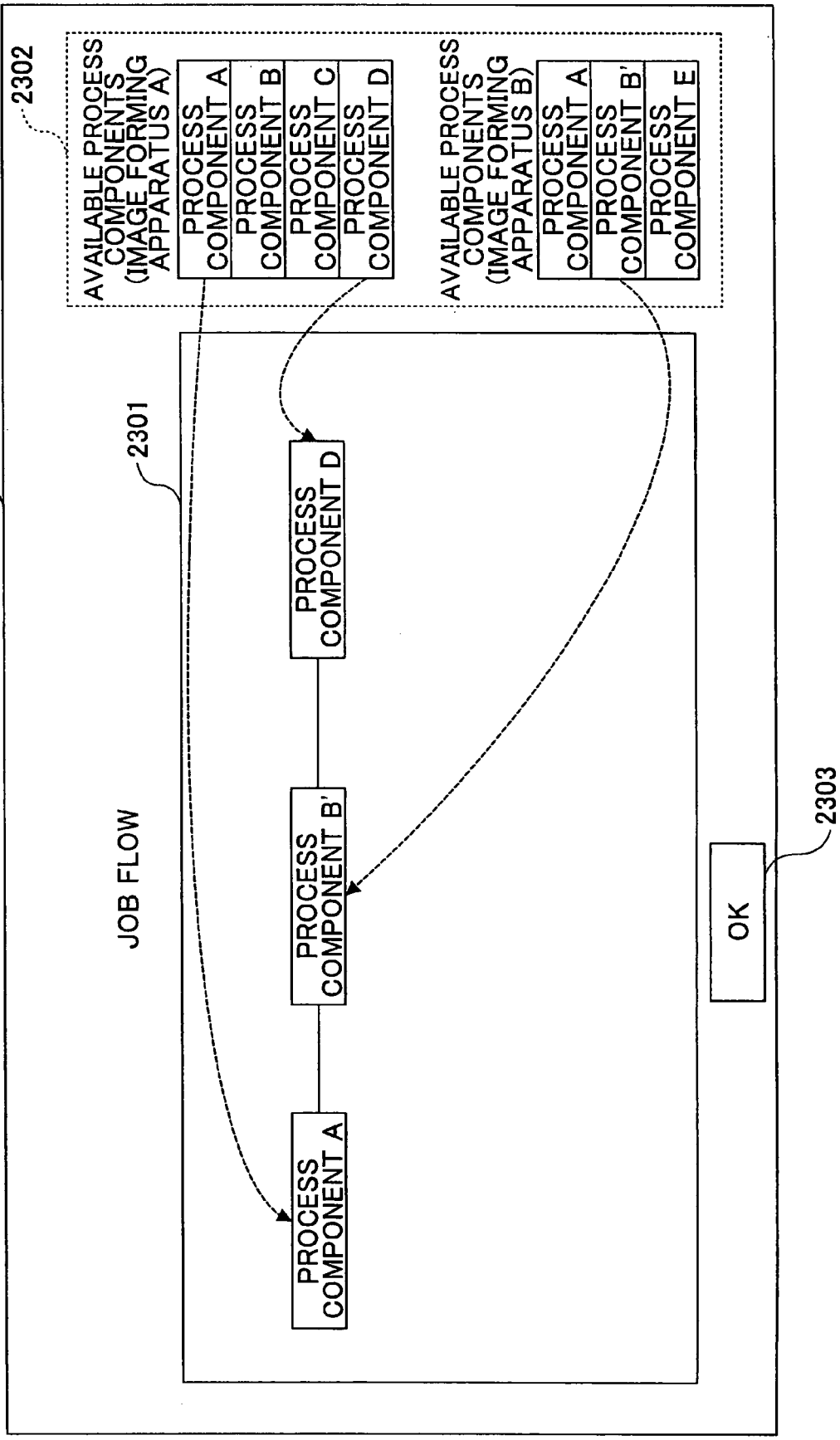

FIG.35

| JOB FLOW NAME | EXECUTION SEQUENCE | PROCESS COMPONENT | IMAGE FORMING APPARATUS |
|---|---|---|---|
| E | 1 | PROCESS COMPONENT A | A |
| | 2 | PROCESS COMPONENT B' | B |
| | 3 | PROCESS COMPONENT D | A |

IMAGE PROCESSING APPARATUS AND INFORMATION PROCESSING SYSTEM

BACKGROUND OF THE INVENTION

1. Field of the Invention

The present invention generally relates to an image processing apparatus and an information processing system.

2. Description of the Related Art

Nowadays, an image forming apparatus, such as a printer, a copier, a scanner, a facsimile, or a multifunction copier having functions of these apparatuses normally has a configuration, although its memory is limited, similar to that of a general purpose computer where functions are implemented by a CPU and application programs.

For example, in an image forming apparatus disclosed in patent document 1, common functions used by multiple application programs are provided as a platform and therefore application programs can be implemented using application programming interfaces (APIs) provided by the platform. Such an image forming apparatus having common functions as a platform makes it possible to avoid overlapping functions being provided in multiple application programs and thereby to improve efficiency in developing application programs.

One difficulty in providing common functions or APIs as a platform in an image forming apparatus is to appropriately design the granularity of the functions or APIs in the platform. If the granularity is not designed appropriately, improvement in efficiency of application program development may not be expected.

For example, too fine granularity may make it necessary to call many APIs even when developing a simple application program and thereby complicate the source code of the application program.

On the other hand, too coarse granularity may increase the chance of having to modify an API in or add a new API to the platform in developing an application program involving a function slightly different from that provided in the platform and therefore may reduce development efficiency. Especially, when the dependency between modules or APIs in the platform is high, in addition to modifying or adding an API, it may become necessary to modify other dependent APIs.

Also, with the technology disclosed in patent document 1, it is not possible to implement a new application program providing a service similar to an existing application program by calling a part of the existing application program and by writing code only for a function (for example, image input) unique to the new application program. In other words, it is necessary to write source code from the scratch even to develop an application program similar to an existing application program.

[Patent document 1] Japanese Patent No. 3679349

To obviate the above problems, the present applicant/inventor is pursuing the possibility of developing a new framework where an application program executed in an image forming apparatus is composed of functions for inputting, processing, and outputting data. For example, an application program for copying may be composed of functions for inputting image data from a scanner, for processing (for example, N-up processing ("N-up processing" means combining multiple pages into one page)) the image data, and for outputting the image data on a plotter. Also, as another example, an application program for processing print requests from a client PC may be composed of functions for inputting (or receiving) print data via a network, for processing (for example, rendering) the print data, and for outputting the print data on a plotter. Compared with an environment where addition and removal of functions are possible only in units of application programs, a framework where application programs are composed of functional components (hereafter called "process components") allows adding and removing functions based on the process components and thereby makes it possible to improve efficiency in developing application programs and to flexibly provide services to the user.

With such a framework, for example, an application program for scanning and an application program for copying may use the same process component for outputting image data on a plotter. Also, an application program for scanning and an application program for facsimile transmission may use the same process component for inputting image data from a scanner. Further, such a framework makes it possible to allow a user of an image forming apparatus to select process components for inputting, processing, or outputting data and thereby to provide various services according to the user's needs.

However, there is also a disadvantage in providing a user interface that allows the user to select process components. While such a user interface provides better flexibility, it may increase the number of user steps to perform a task (for example, copying) and thereby degrade operability.

SUMMARY OF THE INVENTION

The present invention provides an image processing apparatus and an information processing system that substantially obviate one or more problems caused by the limitations and disadvantages of the related art.

Embodiments of the present invention provide an image processing apparatus and an information processing system that make it possible to implement an application program by combining process components while maintaining good operability.

According to an embodiment of the present invention, an image processing apparatus includes process components configured to input, process, or output image data; and a registration unit configured to obtain a list of the process components available in the image processing apparatus, to display on a display unit a screen for selecting one or more of the process components from the list and thereby defining a combination of the process components which combination implements an application program for performing an image processing task, and to register the combination with an identifier in the image processing apparatus.

According to another embodiment of the present invention, an image processing apparatus includes process components configured to input, process, or output image data; a storing unit configured to store combinations of the process components, wherein each of the combinations implements an application program for performing an image processing task; an analysis unit configured to determine whether the combinations are executable based on availability information sent from the process components and indicating whether the process components are available; and a display control unit configured to display a list of the combinations on a display unit based on determination results from the analysis unit in such a manner that executable ones of the combinations are distinguishable.

According to still another embodiment of the present invention, an information processing system includes multiple electronic apparatuses configured to implement an application program for performing an information processing task by a combination of process components configured to input, process, or output electronic data; wherein the information processing system is configured such that a first one of the electronic apparatuses executes one of the process components in the combination to input the electronic data and a second one of the electronic apparatuses executes at least another one of the process components in the combination to process or output the electronic data.

BRIEF DESCRIPTION OF THE DRAWINGS

FIG. 4 is a sequence chart showing a process of registering a job flow in an image forming apparatus;

FIGS. 34A and 34B are drawings illustrating an exemplary job flow generation screen according to the fourth embodiment;

FIG. 35 is a table showing exemplary job flow information according to the fourth embodiment;

DESCRIPTION OF THE PREFERRED EMBODIMENTS

Figure 1:
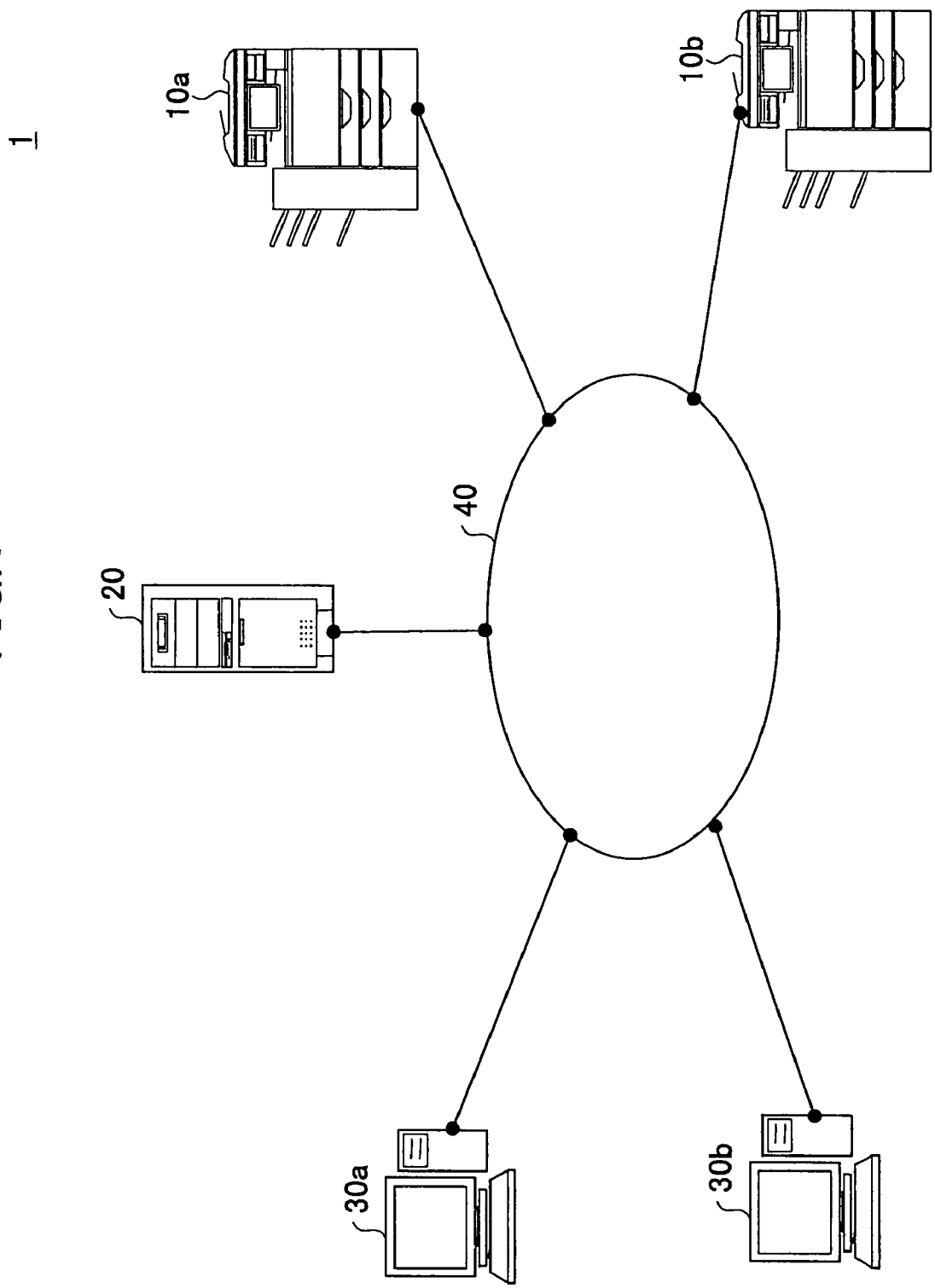
FIG. 1 is a drawing illustrating a configuration of an exemplary image processing system according to a first embodiment of the present invention.

Preferred embodiments of the present invention are described below with reference to the accompanying drawings. FIG. 1 is a drawing illustrating an exemplary configuration of an image processing system 1 according to a first embodiment of the present invention. As shown in FIG. 1, the image processing system 1 includes one or more image forming apparatuses (image forming apparatuses 10a and 10b, which hereafter may also be collectively called an image forming apparatus(es) 10), a management server 20, and one or more client PCs (client PCs 30a and 30b, which hereafter may also be collectively called a client PC(s) 30). The above components of the image processing system 1 are connected via a network such as a local area network (LAN).

The image forming apparatus 10 is an example of an image processing apparatus such as a copier, printer, or multifunction copier. The image forming apparatus 10 is designed such that application programs can be added or removed after shipment. Application programs for the image forming apparatus 10 may be developed, for example, by using Java (registered trademark) or C language. An application program in this embodiment refers to a piece of software executed by the image forming apparatus 10 to provide a particular service or to perform a particular task (sequence of jobs from input of a request to output of the result) for the user. More specifically, the image forming apparatus 10 is designed so as to allow addition or removal of functional components (process components) constituting application programs. For example, an application program of the image forming apparatus 10 may be composed of process components for inputting, processing, or outputting data. Compared with an environment where addition and removal of functions are possible only in units of application programs, a framework where application programs are composed of process components allows adding and removing functions based on the process components and thereby makes it possible to improve efficiency in developing application programs and to flexibly provide services to the user. In this embodiment, a process component for inputting data is called an input component, a process component for processing data is called a processing component, and a process component for outputting data is called an output component.

The management server 20 may be implemented by a general-purpose computer having functions for managing one or more image forming apparatuses 10. The client PC 30 may be implemented by a general-purpose computer that provides a user interface for operating the image forming apparatuses 10 and the management server 20.

Figure 2:
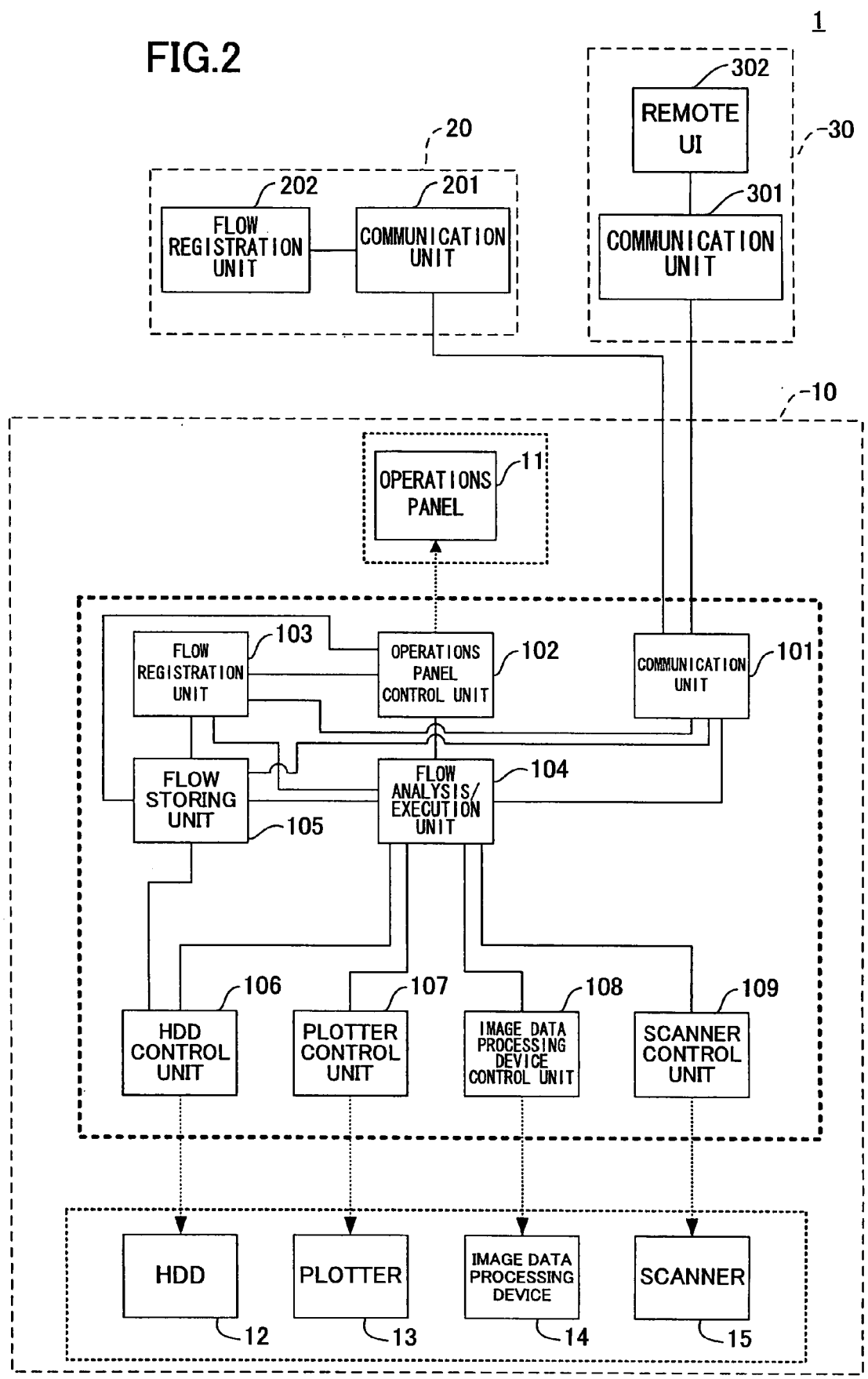
FIG. 2 is a drawing illustrating a functional configuration of the exemplary image processing system according to the first embodiment.

FIG. 2 is a drawing illustrating an exemplary functional configuration of the image processing system 1 according to the first embodiment. FIG. 2 shows only components that are necessary to describe the first embodiment. As shown in FIG. 2, the image forming apparatus 10 includes, as hardware components, operations panel 11, a hard disk drive (HDD) 12, a plotter 13, an image data processing device 14, and a scanner 15. The image forming apparatus 10 also includes, as software components, a communication unit 101, an operations panel control unit 102, a flow registration unit 103, a flow analysis/execution unit 104, a flow storing unit 105, a HDD control unit 106, a plotter control unit 107, an image data processing device control unit 108, and a scanner control unit 109.

The communication unit 101 controls network communications. The operations panel control unit 102 controls input and output of information from/to the operations panel 11. The flow registration unit 103 controls a process of registering a job flow. A "job flow" refers to information for controlling the sequence of jobs in an application program and includes a list of process components and the execution sequence of the process components. Thus, the image forming apparatus 10 of this embodiment is configured to allow the user to register combinations of process components as job flows and to use a service of the image forming apparatus 10 by selecting the corresponding job flow. The flow storing unit 105 stores job flows registered by the flow registration unit 103 in the HDD 12 in a predetermined format and manages the stored job flows. The flow analysis/execution unit 104 controls execution of a job flow selected by the user. Also, the flow analysis/execution unit 104 displays a list of process components available in the image forming apparatus 10 when the user registers a job flow via the flow registration unit 103.

The HDD control unit 106, the plotter control unit 107, the image data processing device control unit 108, and the scanner control unit 109 are examples of process components and may be stored in a storage unit such as an HDD. The HDD control unit 106 is a process component for storing (outputting) data in and retrieving (inputting) data from the HDD 12. The plotter control unit 107 is a process component for outputting image data on the plotter 13. The image data processing device control unit 108 is a process component for causing the image data processing device 14 to convert (process) image data. The scanner control unit 109 is a process component for inputting image data by reading a document with the scanner 15. In this embodiment, a job flow is composed of one or more of the HDD control unit 106, the plotter control unit 107, the image data processing device control unit 108, and the scanner control unit 109. Also, as described above, it is possible to add or remove process components to/from the image forming apparatus 10. For example, it is possible to develop and install a process component having a function different from those of the process components shown in FIG. 2.

The management server 20 includes a communication unit 201 and a flow registration unit 202 as software components. The communication unit 201 and the flow registration unit 202 have substantially the same functions as those of the communication unit 101 and the flow registration unit 103 of the image forming apparatus 10.

The client PC 30 includes a communication unit 301 and a remote user interface (UI) 302 as software components. The communication unit 301 controls network communications. The remote UI 302 is a user interface for operating the image forming apparatuses 10 and the management server 20 via a network. In this embodiment, a Web browser is used as the remote UI 302. However, the remote UI 302 may be implemented by a dedicated application program.

Figure 3:
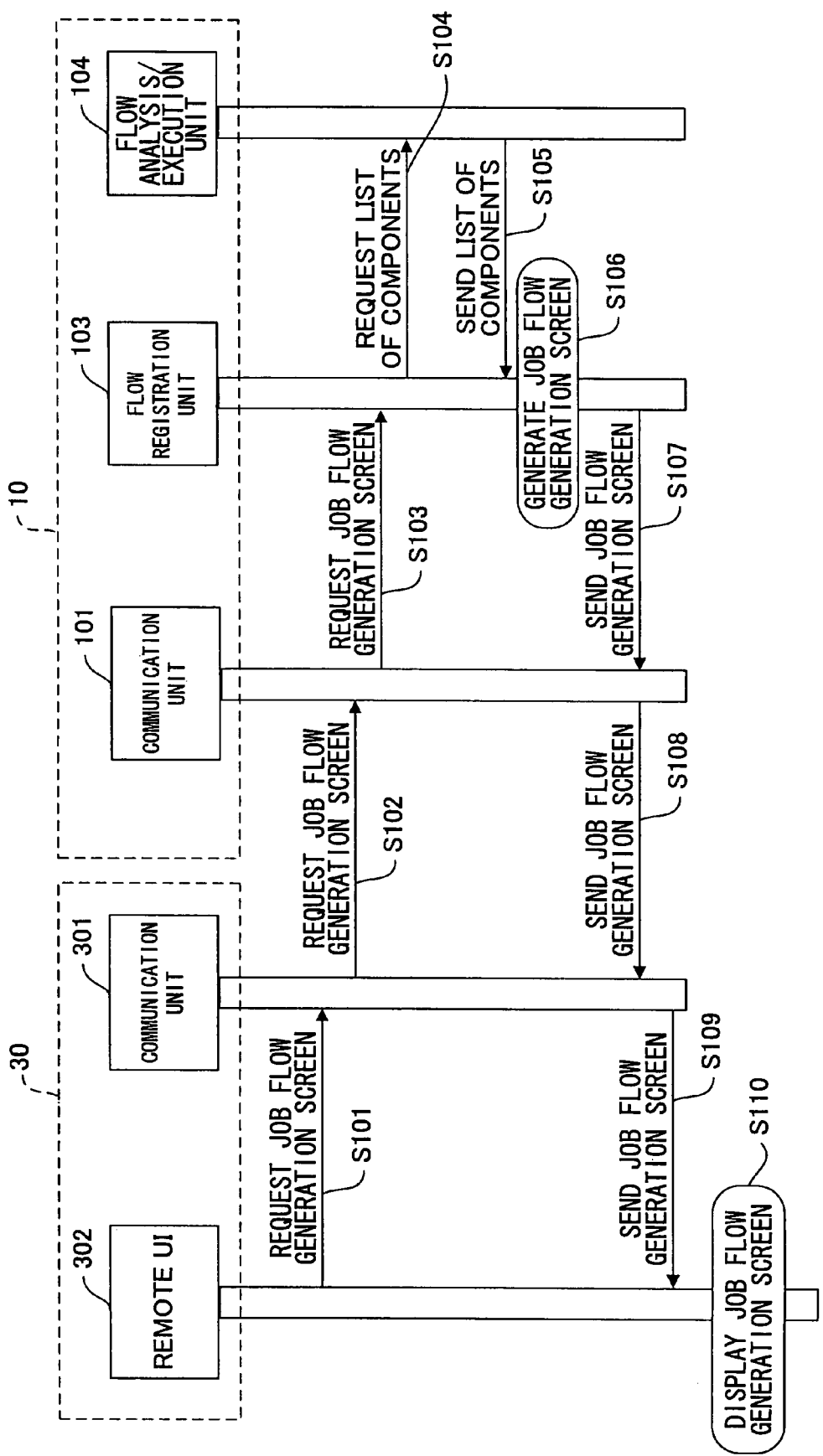
FIG. 3 is a sequence chart showing a process of registering a job flow in an image forming apparatus.

Exemplary processes in the image processing system 1 are described below. First, an exemplary process of registering a job flow is described. FIGS. 3 and 4 are sequence charts showing an exemplary process of registering a job flow in an image forming apparatus.

When the user requests the remote UI 302 of the client PC 30 to display a job flow generation screen of one of the image forming apparatuses 10 (for example, the image forming apparatus 10a), the remote UI 302 requests the communication unit 301 to obtain the job flow generation screen (S101). A job flow generation screen in this case refers to a screen for selecting (combining) process components to generate (define) a job flow and registering the generated job flow. For example, the user selects one of the image forming apparatuses 10 as a registration destination and requests a job flow generation screen on a Web page provided by the selected image forming apparatus 10 and displayed by the remote UI 302. In this exemplary process, it is assumed that the image forming apparatus 10a is selected. The communication unit 301 requests the communication unit 101 of the image forming apparatus 10a to send the job flow generation screen (S102).

According to the request from the client PC 30, the communication unit 101 requests the flow registration unit 103 to generate the job flow generation screen (S103) The flow registration unit 103 requests the flow analysis/execution unit 104 to obtain a list of process components available in the image forming apparatus 10a which list is necessary to generate the job flow generation screen. Each of the image forming apparatuses 10 retains a list of available process components (process component list), for example, in the HDD 12. The flow analysis/execution unit 104 retrieves the process component list and sends the retrieved process component list to the flow registration unit 103 (S105). A process component list is updated when a process component is added or removed (installed or uninstalled). The flow registration unit 103 generates the job flow generation screen as HTML data using the process component list (S106) and sends the HTML data to the communication unit 101 (S107).

The communication unit 101 sends the HTML data to the communication unit 301 of the client PC 30 (S108). The communication unit 301 sends the received HTML data to the remote UI 302 (S109). Then, the remote UI 302 displays the job flow generation screen based on the HTML data on a display unit of the client PC 30 (S110).

Figure 5A:
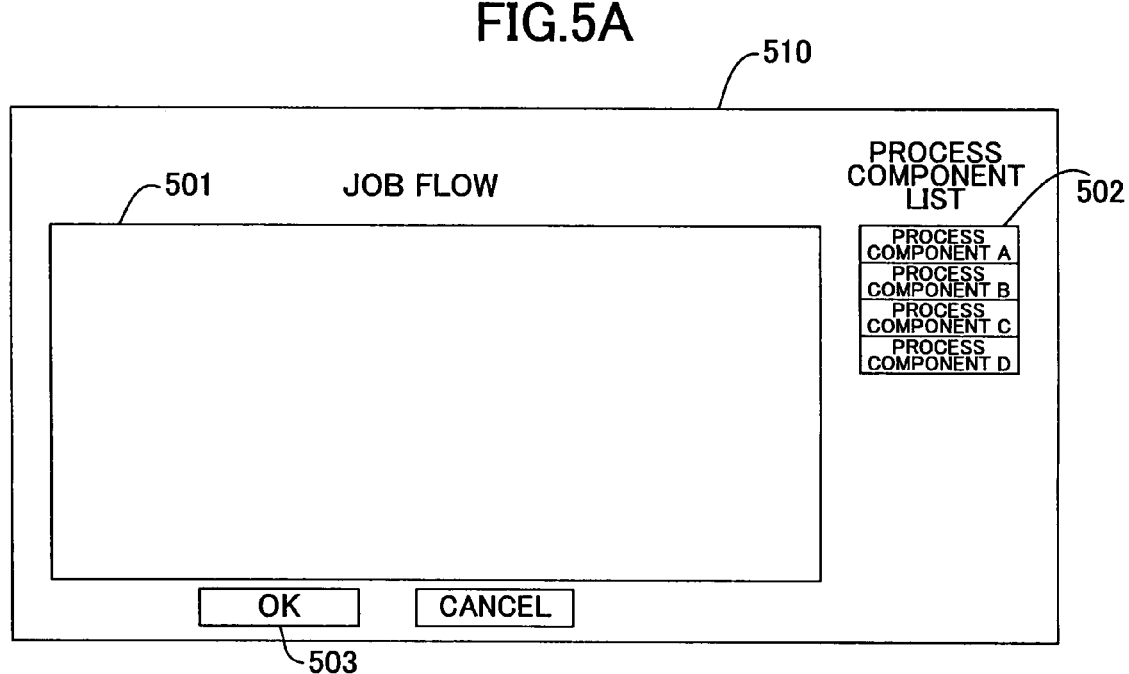
FIGS. 5A and 5B are drawings illustrating an exemplary job flow generation screen.
Figure 5B:
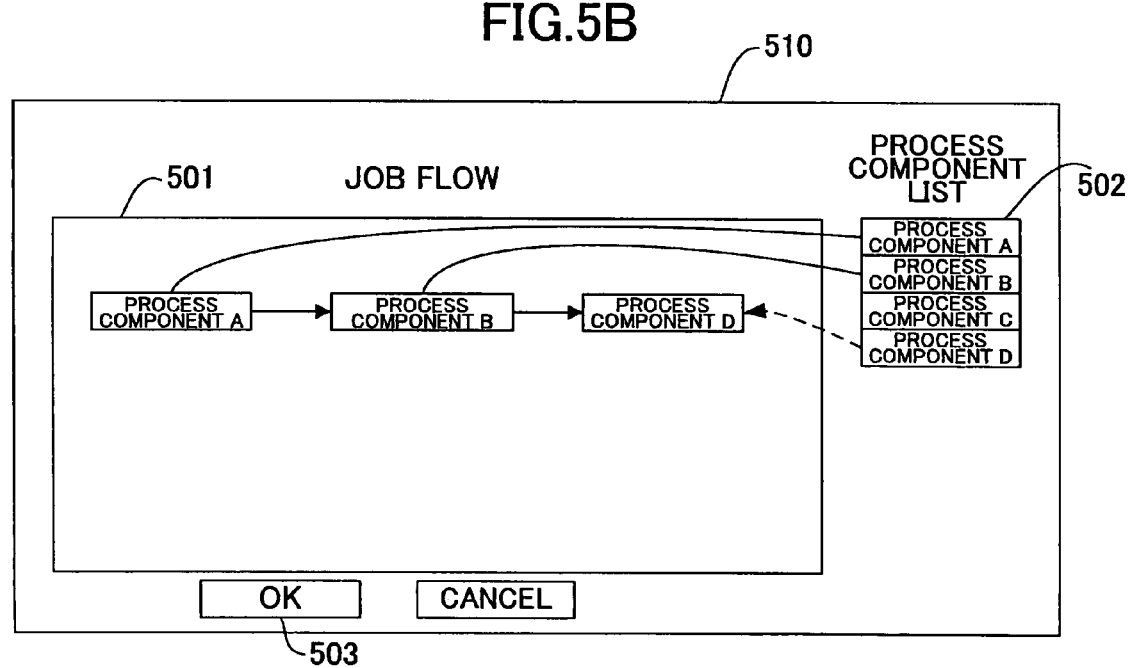

FIGS. 5A and 5B are drawings illustrating an exemplary job flow generation screen 510. FIG. 5A shows the initial state of the job flow generation screen 510 (immediately after displayed). FIG. 5B shows the job flow generation screen 510 where a job flow has been generated (defined) by the user.

The job flow generation screen 510 includes a job flow generation pane 501 and a process component list pane 502. The process component list pane 502 lists icons or buttons (process component icons) representing process components available in the image forming apparatus 10*a*. The job flow generation pane 501 is used to generate (define) a job flow using the process component icons listed in the process component list pane 502. As shown in FIG. 5B, the user can generate a job flow by dragging the process component icons into the job flow generation pane 501 and connecting them in the order of execution. For example, a job flow for copying may be generated by connecting a process component for inputting image data by scanning a document (scanning component), a process component for converting image data (image data conversion component), and a process component for outputting image data on a plotter (plotter output component). Double-clicking a process component icon in the job flow generation pane 501 displays a screen for specifying the execution conditions of the corresponding process component. For example, the execution conditions for a scanning component may include resolution and paper size. Precisely speaking, the remote UI 302 as a Web browser communicates with a Web server (in this case, the image forming apparatus 10*a*) each time when the job flow generation screen 510 changes. However, descriptions of communications with a Web server are omitted here for brevity.

A job flow may include multiple input components, multiple processing components, and/or multiple output components. For example, at least two input components and two output components are necessary to generate a job flow that synthesizes a scanned image and an image stored in the HDD 12 of the image forming apparatus 10, and prints and faxes the combined image.

When generation of a job flow is completed on the job flow generation screen 510 and an OK button 503 is clicked on, the remote UI 302 displays a screen for entering a name of the generated job flow (job flow name). After a job flow name is entered on the screen, the remote UI 302 sends a request for registering the job flow (job flow registration request) to the communication unit 301 (S121 in FIG. 4). The job flow registration request includes information (job flow information) specified on the job flow generation screen 510 such as a job name, identifiers of process components constituting the job flow, an execution sequence of the process components, and execution conditions of the process components. The communication unit 301 sends the job flow registration request to the communication unit 101 of the image forming apparatus 10*a* (S122).

According to the job flow registration request, the communication unit 101 requests the flow registration unit 103 to register the job flow (S123). The flow registration unit 103 requests the flow storing unit 105 to store the job flow information (S124). The flow storing unit 105 requests the HDD control unit 106 to store the job flow information in the HDD 12 in a predetermined format (S125). After storing the job flow information, the HDD control unit 106 reports completion of storing the job flow information to the flow storing unit 105 (S126). Then, the flow storing unit 105 reports the completion of storing the job flow information to the flow registration unit 103 (S127).

Figure 6:
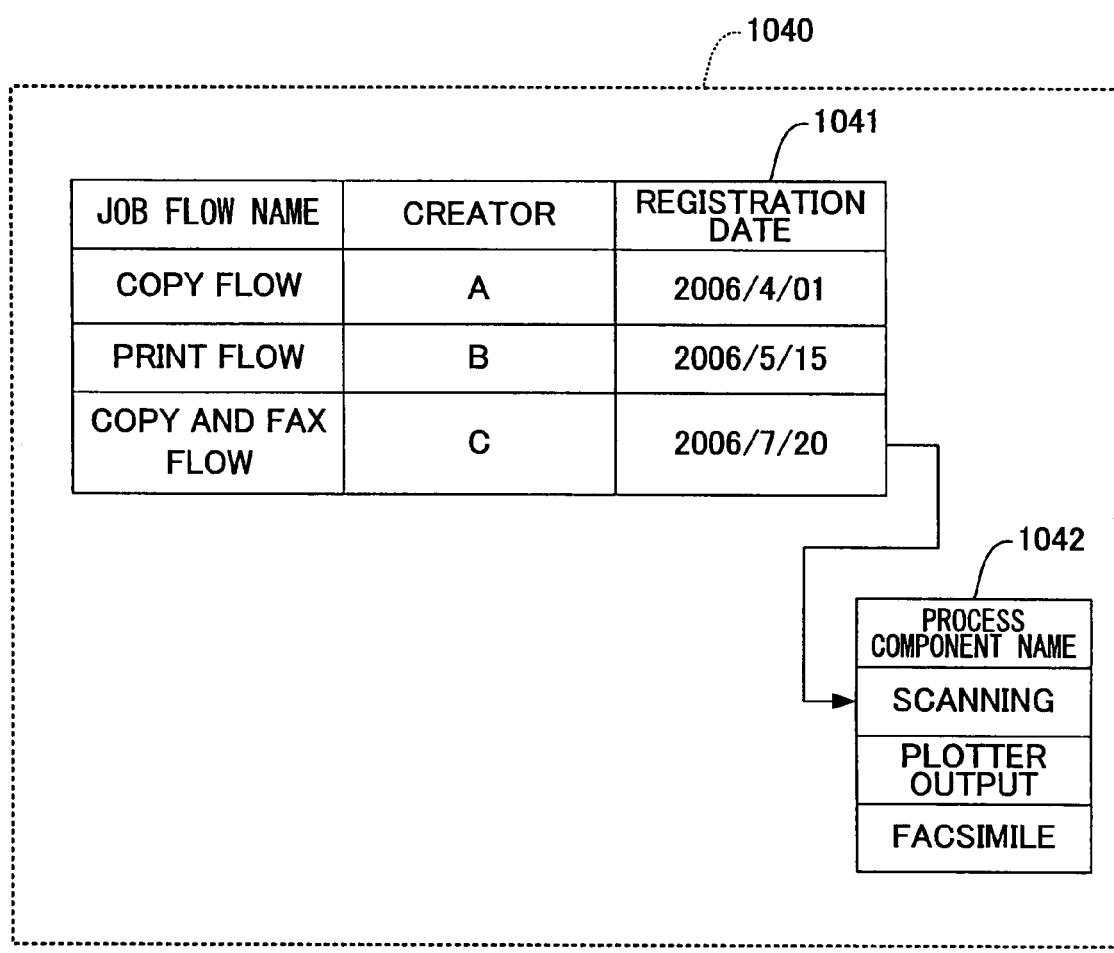
FIG. 6 is a drawing illustrating an exemplary format of job flow information.

FIG. 6 is a drawing illustrating an exemplary format of job flow information. As shown in FIG. 6, a job flow information 1040 includes for each job flow a job flow name, a job flow creator, and a job flow registration date (table 1041). The job flow information 1040 also includes names of process components constituting each job flow and execution information (execution sequence and execution conditions) of the constituent process components (table 1042). For example, a copy and fax flow shown in FIG. 6 includes a scanning component (input component), a plotter output component (output component), and a facsimile component (output component). Accordingly, the copy and fax flow is an application program for scanning an image and outputting the scanned image on a plotter as well as faxing the scanned image. The job flow generation screen 510 may also be configured to automatically create a job flow name based on the functions of process components constituting the job flow instead of asking the user to enter the job flow name.

The job flow registration unit 103 sends a job flow registration completion report via the communication unit 101 to the communication unit 301 of the client PC 30 (S128, S129). The communication unit 301 sends the job flow registration completion report to the remote UI 302 (S130). The remote UI 302 then displays a message indicating the completion of job flow registration (S131). Also, the remote UI 302 may be configured to display the details of the registered job flow together with the message.

Figure 7:
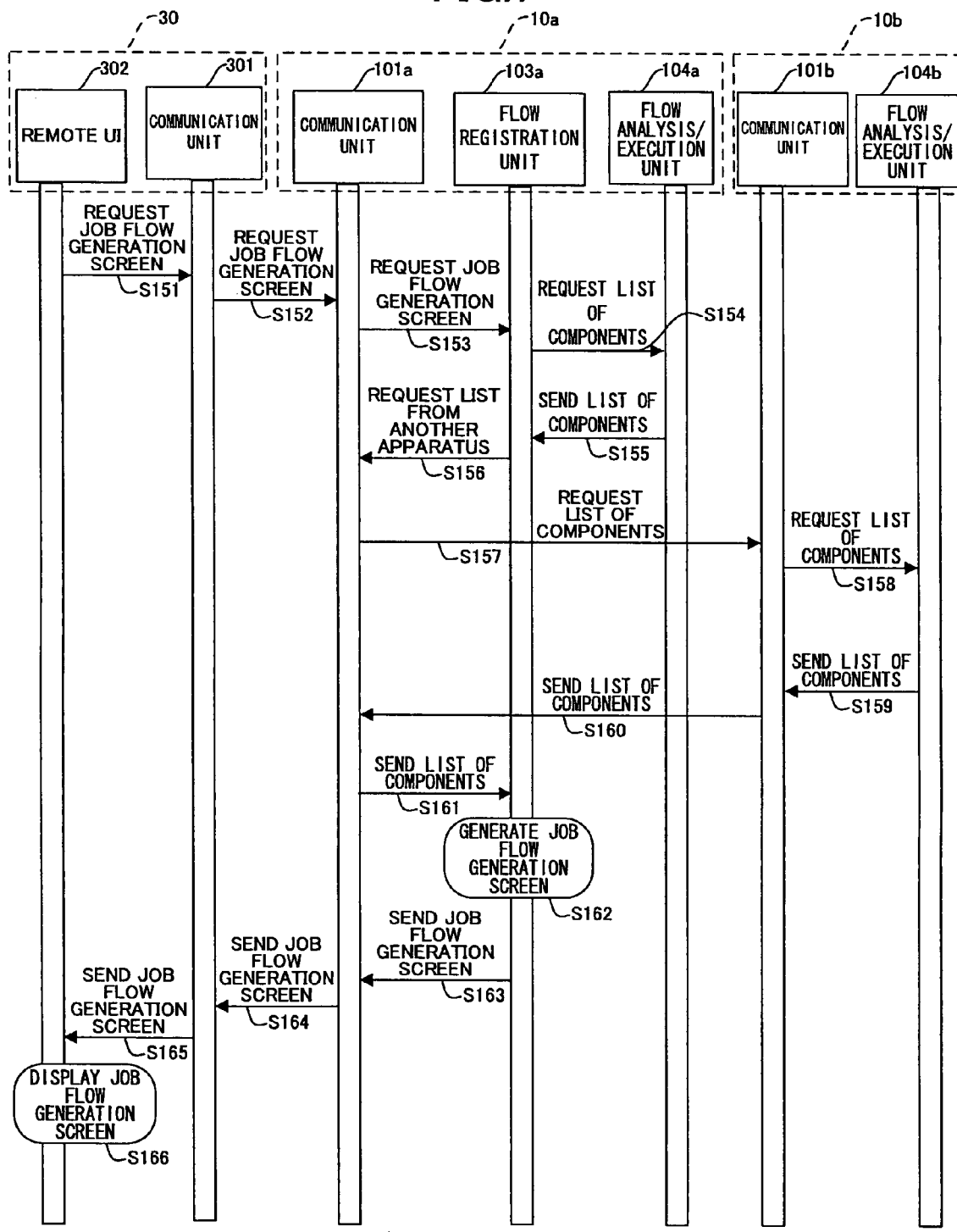
FIG. 7 is a sequence chart showing a process of registering a job flow in multiple image forming apparatuses in one operation.
Figure 8:
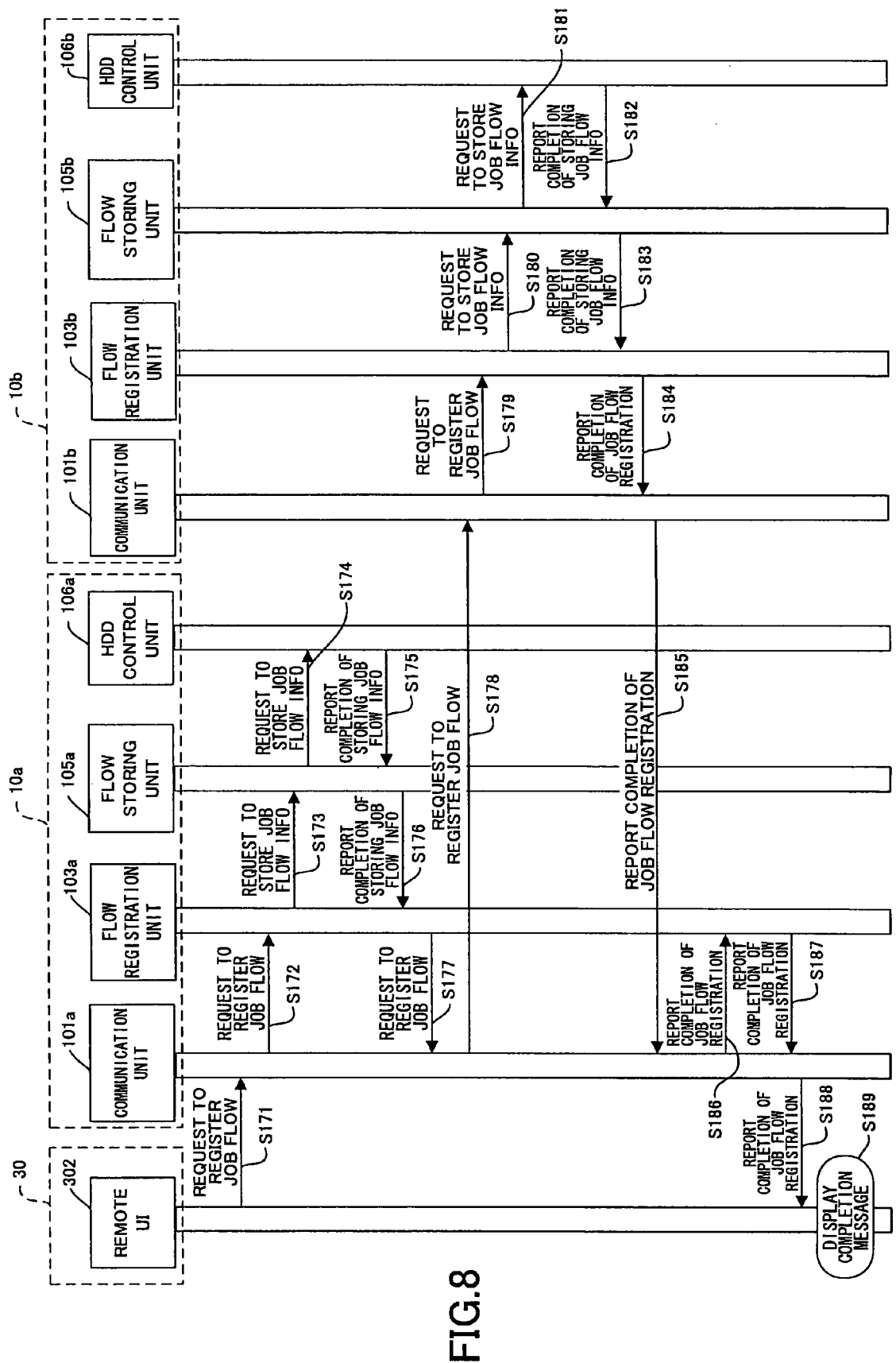
FIG. 8 is a sequence chart showing a process of registering a job flow in multiple image forming apparatuses in one operation.

An exemplary process of registering a job flow in multiple image forming apparatuses 10 in one operation is described below. FIGS. 7 and 8 are sequence charts showing a process of registering a job flow in multiple image forming apparatuses in one operation. In FIGS. 7 and 8, to distinguish components of the image forming apparatus 10*a* and components of the image forming apparatus 10*b*, "a" is attached to the reference numbers of components of the image forming apparatus 10*a* and "b" is attached to those of the image forming apparatus 10*b*.

When the user requests the remote UI 302 of the client PC 30 to display a job flow generation screen for two or more of the image forming apparatuses 10 (in this example, it is assumed that the image forming apparatuses 10*a* and 10*b* are selected), the remote UI 302 requests the communication unit 301 to obtain the job flow generation screen (S151). The request from the remote UI 302 to obtain the job flow generation screen includes the image forming apparatuses 10*a* and 10*b* as registration destinations. The communication unit 301 requests the communication unit 101*a* of the image forming apparatus 10*a* to send the job flow generation screen (S152). According to the request from the client PC 30, the communication unit 101*a* requests the flow registration unit 103*a* to generate the job flow generation screen for the image forming apparatuses 10*a* and 10*b* (S153). The registration destinations (in this case, the image forming apparatuses 10*a* and 10*b*) are specified in the request for generating the job flow generation screen and are thereby reported to the flow registration unit 103*a*

According to the request for generating the job flow generation screen, the flow registration unit 103*a* collects a list of process components in all of the image forming apparatuses 10 specified as registration destinations. In this step, the flow registration unit 103*a* first obtains a list of process components available in the image forming apparatus 10*a* from the flow analysis/execution unit 104*a* (S154, S155). Then, the flow registration unit 103*a* requests the communication unit 101*a* to obtain a list of process components available in the image forming apparatus 10*b* (S156). The communication unit 101*a* requests the communication unit 101*b* of the image forming apparatus 10*b* to send the list of process components (S157). According to the request from the communication unit 101*a*, the communication unit 101*b* obtains the list of process components available in the image forming apparatus 10*b* from the flow analysis/execution unit 104*b* (S158, S159) and sends the list to the communication unit 101*a* (S160).

When receiving the list from the communication unit 101*b*, the communication unit 101*a* sends the list to the flow registration unit 103*a* (S161). The flow registration unit 103*a* obtains the logical sum of the process component list of the image forming apparatus 10*a* and the process component list of the image forming apparatus 10*b*, generates the job flow generation screen as HTML data using the process component list obtained as the logical sum (S162), and sends the HTML data to the communication unit 101*a* (S163). Subsequent steps S164 through S166 are substantially the same as steps S108 through S110 shown in FIG. 3. The resulting job flow generation screen 510 to be displayed in step S166 includes the logical sum of the process component lists of the image forming apparatuses 10*a* and 10*b*. The operation of the job flow generation screen 510 is substantially the same as described above with reference to FIGS. 5A and 5B. The user selects process components from the process component list (logical sum of the process component lists) and generates a job flow.

When completing generation of a job flow on the job flow generation screen 510, the user clicks on the OK button 503 and enters a job flow name. Then, the remote UI 302 sends a request (job flow batch registration request) for registering the job flow in the image forming apparatuses 10*a* and 10*b* via the communication unit 301 to the image forming apparatus 10*a* (S171 in FIG. 8).

The job flow batch registration request contains, in addition to the job flow information, identifiers (for example, host names or IP addresses) of the image forming apparatuses 10 (in this case, the image forming apparatuses 10*a* and 10*b*) where the job flow is to be registered.

In FIG. 8, the communication unit 301 is omitted for brevity.

According to the job flow batch registration request, the communication unit 101*a* of the image forming apparatus 10*a* requests the flow registration unit 103*a* to register the job flow in the image forming apparatuses 10*a* and 10*b* (S172). The flow registration unit 103*a* requests the flow storing unit 105*a* to store the job flow information (S173). The flow storing unit 105*a* requests the HDD control unit 106*a* to store the job flow information in the HDD 12 in a predetermined format (S174). After storing the job flow information, the HDD control unit 106 reports completion of storing the job flow information to the flow storing unit 105*a* (S175). When receiving the completion report, the flow storing unit 105*a* reports the completion of storing the job flow information to the flow registration unit 103*a* (S176). Subsequently, the flow registration unit 103*a* requests the communication unit 101*a* to register the job flow in the image forming apparatus 10*b* contained as a registration destination in the job flow batch registration request (S177).

The communication unit 101*a* requests the communication unit 101*b* of the image forming apparatus 10*b* to register the job flow (S178). After the request is received by the communication unit 101*b*, the job flow (job flow information) is registered in the image forming apparatus 10*b* through steps S179 to S184 that are substantially the same as steps S123 to S128 shown in FIG. 4. In the above exemplary process, the same job flow information is registered in both of the image forming apparatuses 10*a* and 10*b*. The communication unit 101*b* reports the completion of job flow registration in the image forming apparatus 10*b* to the communication unit 101*a* of the image forming apparatus 10*a* (S185). The communication unit 101*a* reports the completion of job flow registration to the flow registration unit 103*a* (S186). The flow registration unit 103*a* confirms that the job flow has been registered in all of the image forming apparatuses 10 contained as registration destinations in the job flow batch registration request, and when the completion is confirmed, sends a job flow registration completion report via the communication unit 101*a* to the client PC 30 (S187, S188). The remote UI 302 then displays a message indicating the completion of job flow registration (S189).

Thus, the above exemplary method makes it possible to register a job flow in multiple image forming apparatuses 10 by one operation on the job flow generation screen 510. In other words, compared with a method of registering a job flow in one image forming apparatus 10 at a time, the above method improves the efficiency of registering a job flow. Although the client PC 30 is used as a front end of the image forming apparatus 10*a* in FIGS. 7 and 8, the management server 20 may also be used as a front end. For example, the management server 20 receives a job flow batch registration request from the client PC 30 and requests the image forming apparatuses 10 specified as registration destinations to register job flow information. In this case, the communication unit 201 and the flow registration unit 202 of the management server 20 perform substantially the same steps as those performed by the communication unit 101*a* and the flow registration unit 103*a* in FIG. 8. One difference is that a job flow is not registered in the management server 20 itself.

Also, instead of the remote UI 302 used as a user interface for registering a job flow in FIGS. 3 through 8, the operations panel 11 of the image forming apparatus 10 may be used as a user interface. In this case, the operations panel 11 also functions as a display unit to display, for example, a job flow generation screen.

Figure 9:
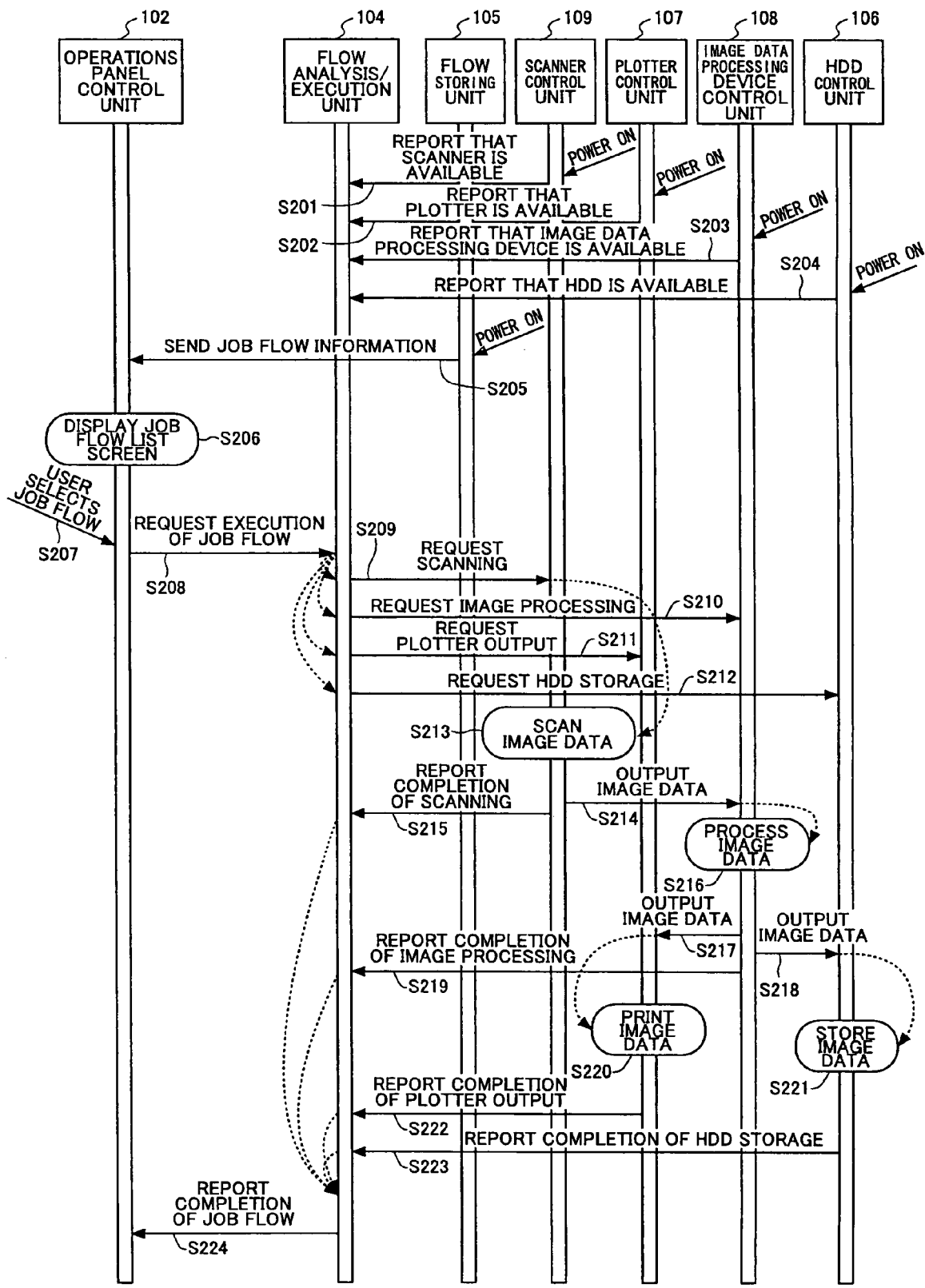
FIG. 9 is a sequence chart showing an exemplary process of executing a job flow.

Next, an exemplary process of executing a registered job flow is described. FIG. 9 is a sequence chart showing an exemplary process of executing a job flow.

When the image forming apparatus 10 is turned on, each process component reports its availability to the flow analysis/execution unit 104. For example, the scanner control unit 109 checks the status of the scanner 15 and if the scanner 15 is working normally, reports to the flow analysis/execution unit 104 that the scanner control unit 109 (a function to input data from the scanner 15) is available (S201). Similarly, the plotter control unit 107 checks the status of the plotter 13 and if the plotter 13 is working normally, reports to the flow analysis/execution unit 104 that the plotter control unit 107 (a function to output data on the plotter 13) is available (S202). The image data processing device control unit 108 checks the status of the image data processing device 14 and if the image data processing device 14 is working normally, reports to the flow analysis/execution unit 104 that the image data processing device control unit 108 (a function to process image data) is available (S203). And, the HDD control unit 106 checks the status of the HDD 12 and if the HDD 12 is working normally, reports to the flow analysis/execution unit 104 that the HDD control unit 106 (a function to store/retrieve data in/from the HDD 12) is available (S204). Also, if an additional process component has been installed, the additional process component also reports its availability.

Meanwhile, when the power is turned on, the flow storing unit 105 retrieves job flow information stored in the HDD 12 and sends the job flow information to the operations panel control unit 102 (S205). Based on the job flow information, the operations panel control unit 102 displays on the operations panel 11 a list screen (job flow list screen) listing job flows (job flow names) registered in the image forming apparatus 10 (S206). As another example, the image forming apparatus 10 may be configured to display the job flow list screen on a display unit of an external device such as a PC connected to the image forming apparatus 10 via a network.

When the user selects a job flow from the job flow list screen on the operations panel 11 (S207), the operations panel control unit 102 sends the identifier (for example, job flow name) of the selected job flow (hereafter called a current job flow) to the flow analysis/execution unit 104 and thereby requests the execution of the current job flow (S208). In this exemplary process, it is assumed the current job flow is configured to input image data from the scanner 13, to process (for example, to N-up process) the image data, to output the processed image data on the plotter 13, and also to store the processed image data in the HDD 12.

The flow analysis/execution unit 104 obtains the job flow information of the current job flow based on the job flow name sent from the operations panel control unit 102 and dynamically controls subsequent steps based on the obtained job flow information. First, the flow analysis/execution unit 104 determines the process components constituting the current job flow and executes each of the process components. For example, as shown in FIG. 9, the flow analysis/execution unit 104 sends execution requests simultaneously to the scanner control unit 109 that is a scanning component, the image data processing device control unit 108 that is an N-up processing component, the plotter control unit 107 that is a plotter output component, and the HDD control unit 106 that is an HDD storage component (S209 through S212).

In this embodiment, the execution requests are sent to the process components simultaneously, and the execution of the process components is controlled (or synchronized) via pipes connecting the process components. A "pipe" in this case is an abstract concept referring to a data communication channel between process components and may be implemented by a memory. When sending an execution request to a process component, the flow analysis/execution unit 104 also specifies an input pipe and an output pipe for the process component. Each of the process components waits until data are input to the input pipe, and when data are input, processes the input data and outputs the processed data to the output pipe. The output pipe of a preceding process component and the input pipe of a succeeding process component are the same. Therefore, when a process component outputs processed data to the output pipe, the next process component detects input of data to the input pipe and performs the corresponding job. As an exception, a process component that functions as an input component receives data from the corresponding device (the scanner 15, a network, etc.) instead of from the input pipe. As another exception, a process component that functions as an output component outputs data to the corresponding device (the HDD 12, the plotter 13, etc.) instead of to the output pipe. Also, the flow analysis/execution unit 104 may be used instead of pipes to synchronize process components. In this case, the flow analysis/execution unit 104 sends an execution request to the next process component after execution of the previous process component is completed.

When receiving an execution request from the flow analysis/execution unit 104, the scanner control unit 109 inputs image data from the scanner 15 (S213). The scanner control unit 109 outputs the image data to the pipe (hereafter called a pipe A) between itself and the image data processing device control unit 108 (S214) and reports the completion of the scanning job to the flow analysis/execution unit 104 (S215).

The image data processing device control unit 108, when detecting the input of the image data to the pipe A, processes (for example, N-up processes) the image data (S216). After completing the image data processing job, the image data processing device control unit 108 outputs the processed image data to the pipe (hereafter called a pipe B) between itself and the plotter control unit 107 and to the pipe (hereafter called a pipe C) between itself and the HDD control unit 106 (S217, S218), and reports the completion of the image data processing job to the flow analysis/execution unit 104 (S219).

The plotter control unit 107 and the HDD control unit 106 are executed concurrently. The plotter control unit 107, when detecting the input of the processed image data to the pipe B, outputs (prints) the processed image data on the plotter 13 (S220). The HDD control unit 106, when detecting the input of the processed image data to the pipe C, outputs (stores) the processed image data to the HDD 12 (S221). When completing the respective jobs, the plotter control unit 107 and the HDD control unit 106 report the completion of the jobs to the flow analysis/execution unit 104 (S222, S223).

After receiving completion reports from all of the process components in the current job flow, the flow analysis/execution unit 104 reports the completion of the current job flow execution to the operations panel control unit 102 (S224). The operations panel control unit 102 then displays a message indicating the completion of the current job flow execution on the operations panel 11.

Thus, the image forming apparatus 10 of this embodiment is configured to allow the user to perform a certain task by selecting and executing a pre-registered job flow.

Meanwhile, as described above, the image forming apparatus 10 is configured to allow the user to add or remove process components. This in turn means that a process component contained in a job flow may be uninstalled from the image forming apparatus 10 after the job flow is registered and, therefore, may be unavailable when the job flow is executed. Also, when a job flow is generated as shown in FIGS. 7 and 8 based on a list of process components collected from multiple image forming apparatuses 10 and registered in the respective image forming apparatuses. 10, it is possible that a process component in the job flow registered in an image forming apparatus 10 is not available in that image forming apparatus 10. Further, it is possible that a process component becomes unavailable because of, for example, a malfunction of the corresponding device.

Figure 10:
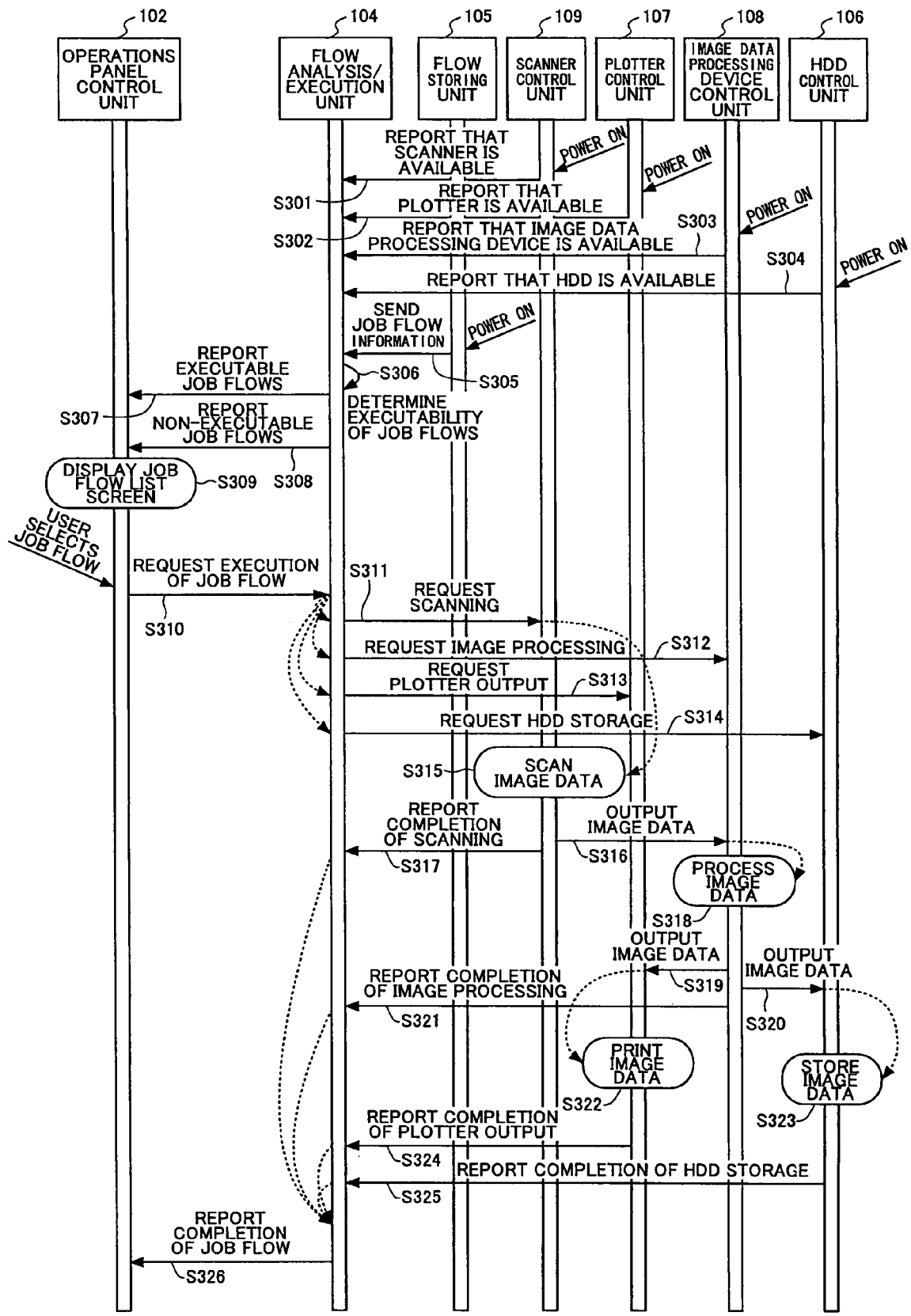
FIG. 10 is a sequence chart showing another exemplary process of executing a job flow.

An exemplary process of executing a job flow taking into account a situation (where a process component in a job flow is not available) as mentioned above is described below with reference to FIG. 10. FIG. 10 is a sequence chart showing another exemplary process of executing a job flow.

Steps S301 through S304 are substantially the same as steps S201 through S204 shown in FIG. 9 and therefore descriptions of those steps are omitted here.

Figure 11A:
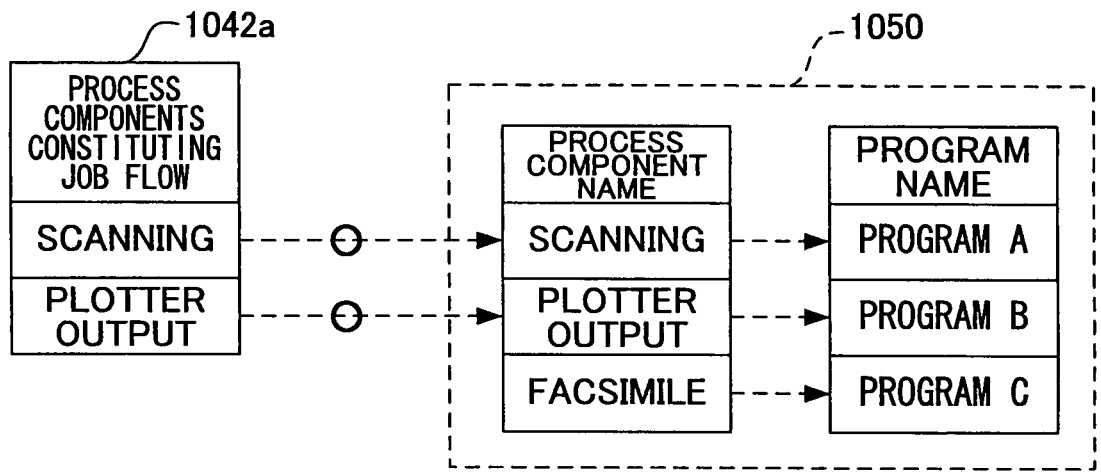
FIGS. 11A and 11B are drawings used to describe a step of determining whether a job flow is executable.
Figure 11B:
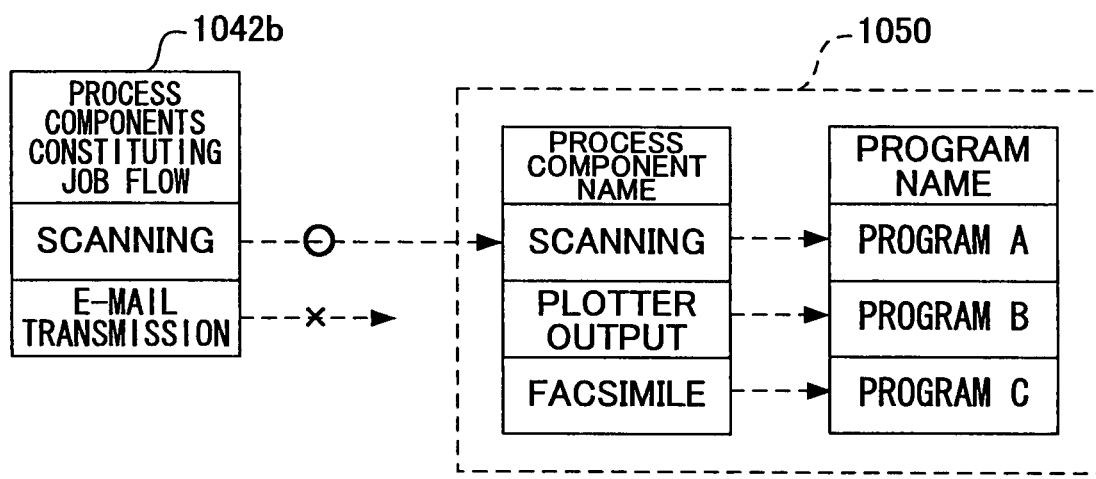

After step S304, when the power is turned on, the flow storing unit 105 retrieves job flow information stored in the HDD 12 and sends the job flow information to the flow analysis/execution unit 104 (S305). The flow analysis/execution unit 104 determines whether each of the job flows in the job flow information is executable (S306). FIGS. 11A and 11B are drawings used to describe. a step of determining whether a job flow is executable. FIG. 11A shows a case where a job flow is determined to be executable and FIG. 11B shows a case where a job flow is determined to be not executable.

A table 1042*a* and a table 1042*b* in FIGS. 11A and 11B, respectively, correspond to the table 1042 shown in FIG. 6. Each of the tables 1042*a* and 1042*b* is a part of the job flow information and shows process components constituting a job flow and the execution sequence of the process components. Process component information 1050 is generated by the flow analysis/execution unit 104 based on availability reports from process components and includes names of available process components and names of programs implementing the process components. The process component names and the program names are associated with each other. A program name in the process component information 1050 is an identifier used to dynamically call the corresponding program. An address indicating the location of a program may also be used as a program name. Program names are sent to the flow analysis/execution unit 104 from process components together with availability reports. Thus, the flow analysis/execution unit 104 dynamically generates the process component information 1050. This configuration makes it possible for the flow analysis/execution unit 104 to obtain information regarding functions (process components) and corresponding programs available in the image forming apparatus 10 before executing a job flow.

Based on the process component information 1050, the flow analysis/execution unit 104 determines whether each of the job flows in the job flow information is executable. For example, when a job flow is composed of a scanning component and a plotter output component as shown in FIG. 11A, the job flow analysis/execution unit 104 searches the process component information 1050 for entries corresponding to the scanning component and the plotter output component. When entries corresponding to the scanning component and the plotter output component exist in the process component information 1050, the flow analysis/execution unit 104 determines that the job flow is executable.

As another example, when a job flow is composed of a scanning component and an e-mail transmission component as shown in FIG. 11B, the job flow analysis/execution unit 104 searches the process component information 1050 for entries corresponding to the scanning component and the e-mail transmission component. Since the process component information 1050 does not include an entry corresponding to the e-mail transmission component, a part of the job flow (e-mail transmission) cannot be executed. In this case, the job flow analysis/execution unit 104 determines that the job flow is not executable.

After determining whether the job flows are executable, the job flow analysis/execution unit 104 sends the results (executability information) together with the job flow information to the operations panel control unit 102 (S307, S308).

Figure 12:
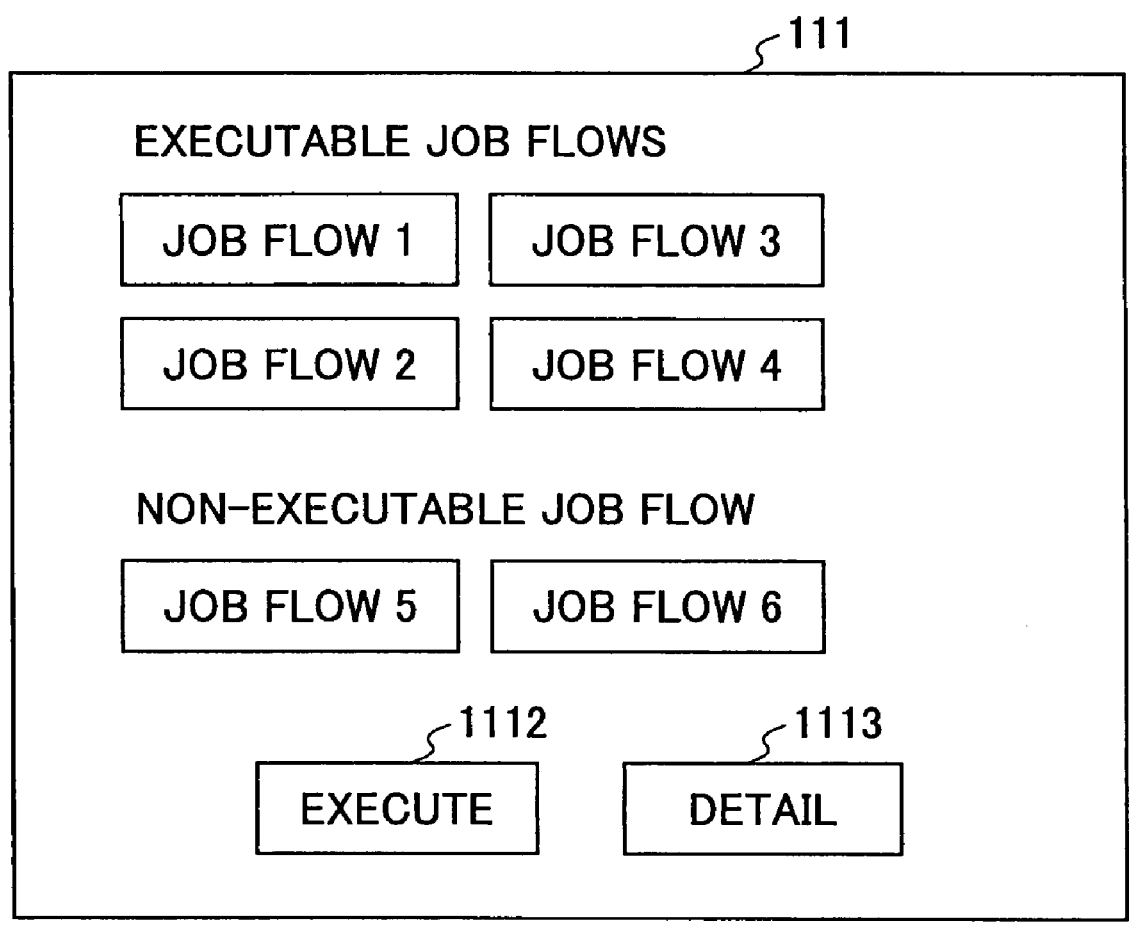
FIG. 12 is a drawing illustrating an exemplary job flow list screen.

The operations panel control unit 102 then displays a job flow list screen on the operations panel 11 based on the executability information and the job flow information (S309). FIG. 12 is a drawing illustrating an exemplary job flow list screen.

As shown in FIG. 12, a job flow list screen 111 lists executable job flows and non-executable job. flows in separate areas so that the user can easily distinguish the executable job flows from the non-executable job flows.

Figure 13A:
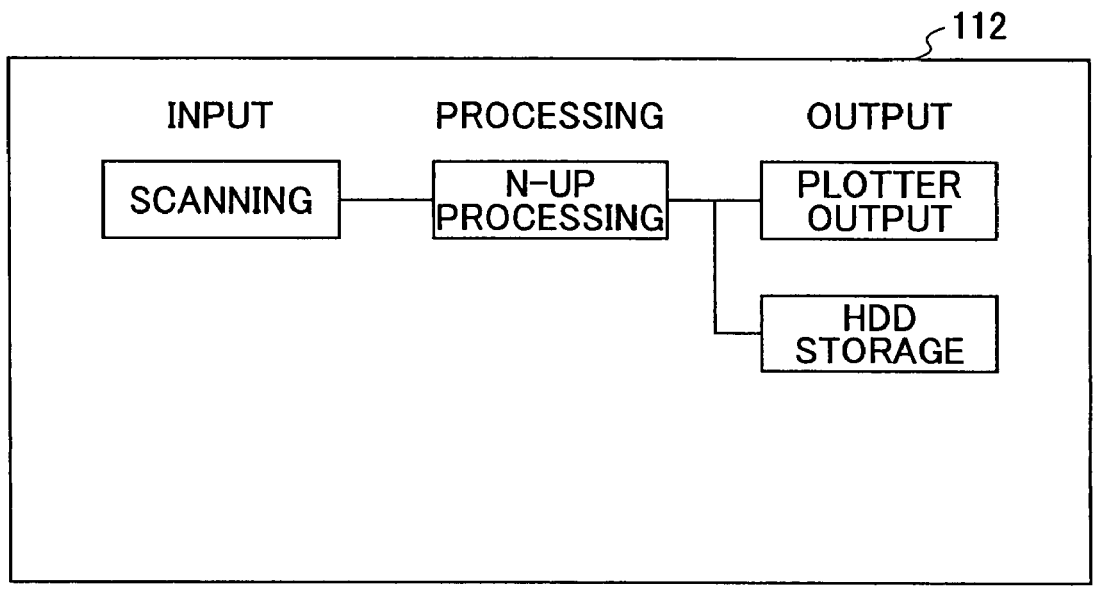
FIGS. 13A and 13B are drawings illustrating exemplary job flow detail screens.
Figure 13B:
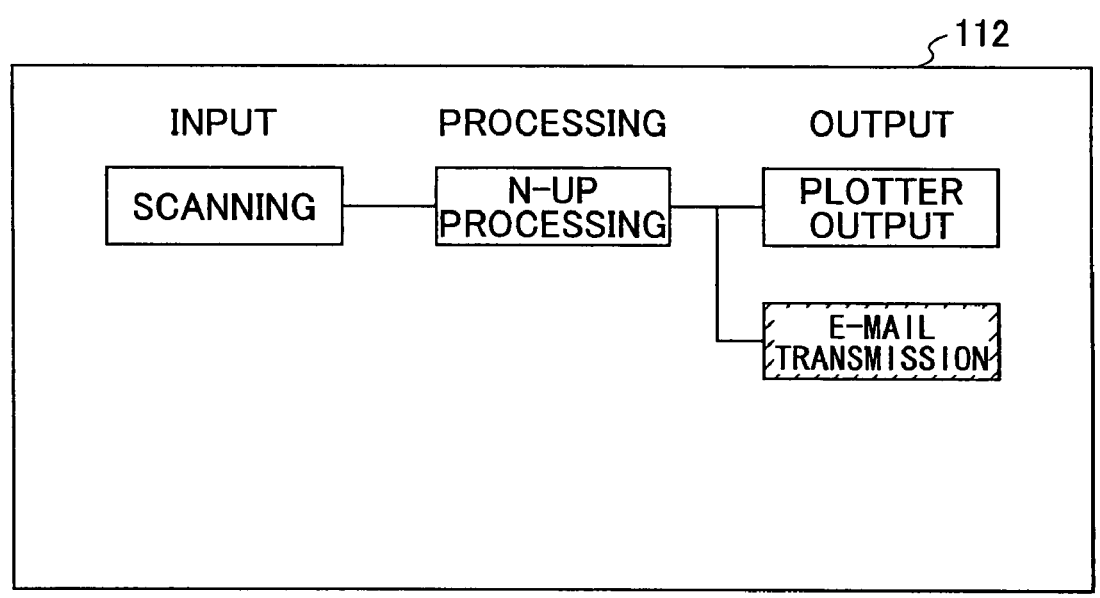

In the job flow list screen 111, job flows are represented by selectable buttons. When a job flow is selected and a detail button 1113 is pressed, the operations panel control unit 102 displays a detail screen (job flow detail screen) for the selected job flow on the operations panel 11. FIGS. 13A and 13B are drawings illustrating exemplary job flow detail screens.

FIG. 13A shows an exemplary job flow detail screen 112 for an executable job flow. The job flow detail screen 112 in FIG. 13A displays the execution sequence of process components in the executable job flow. The exemplary job flow shown in FIG. 13A corresponds to the job flow used as an example in FIGS. 9 and 10 and is designed to input image data from a scanner, to process (for example, to N-up process) the image data, and to output the processed image data on a plotter and to an HDD concurrently.

FIG. 13B shows an example of the job flow detail screen 112 for a non-executable job flow. The job flow detail screen 112 in FIG. 13B displays the execution sequence of process components in the non-executable job flow. In this case, a process component that is not currently available is displayed in such a manner that it is distinguishable from other process components (for example, by shading the unavailable process component). In FIG. 13B, an e-mail transmission component is shaded. This enables the user to identify the reason why the job flow is non-executable.

As an alternative, the job flow list screen 111 may be configured to list only executable job flows.

When an executable job flow is selected and an execute button 1112 is pressed on the job flow list screen 111, the operations panel control unit 102 sends the identifier (for example, job flow name) of the selected job flow to the flow analysis/execution unit 104 and thereby requests the execution of the selected job flow (S310). Step S311 and subsequent steps are substantially the same as step S209 and subsequent steps shown in FIG. 9 and therefore descriptions of those steps are omitted here. In steps S311 through S314, the flow analysis/execution unit 104 dynamically calls programs corresponding to the process components in the selected job flow according to the process component information 1050 shown in FIGS. 11A and 11B. This also applies to steps S209 through S212 in FIG. 9. Thus, the image forming apparatus 10 is configured to dynamically call programs performing functions of process components in a job flow when executing the job flow. This configuration makes it possible for the image forming apparatus 10 to flexibly adapt to addition of process components or functions.

Figure 14:
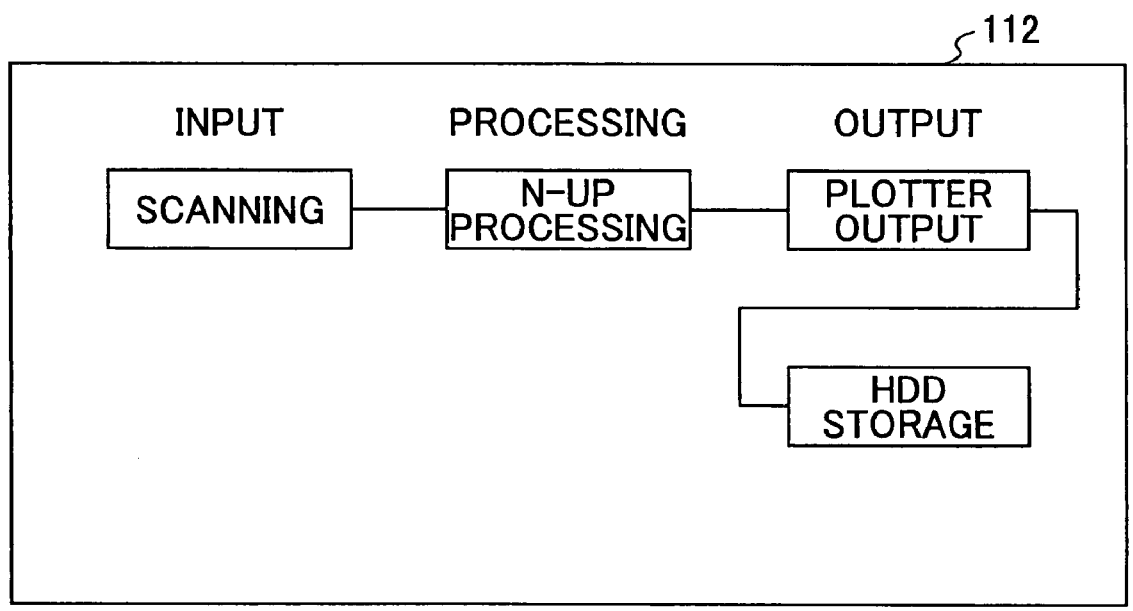
FIG. 14 is a drawing illustrating a job flow detail screen for a job flow A.

Other exemplary processes of executing job flows are described below. FIG. 14 is a drawing illustrating a job flow detail screen for a job flow A.

As shown in FIG. 14, the job flow A is designed to input image data from a scanner, to process (for example, to N-up process) the image data, to output the processed image data on a plotter, and then to store the processed image data in an HDD. The job flow A is different from the job flow shown in FIG. 10 in that the plotter output component and the HDD storage component are executed in series.

Figure 15:
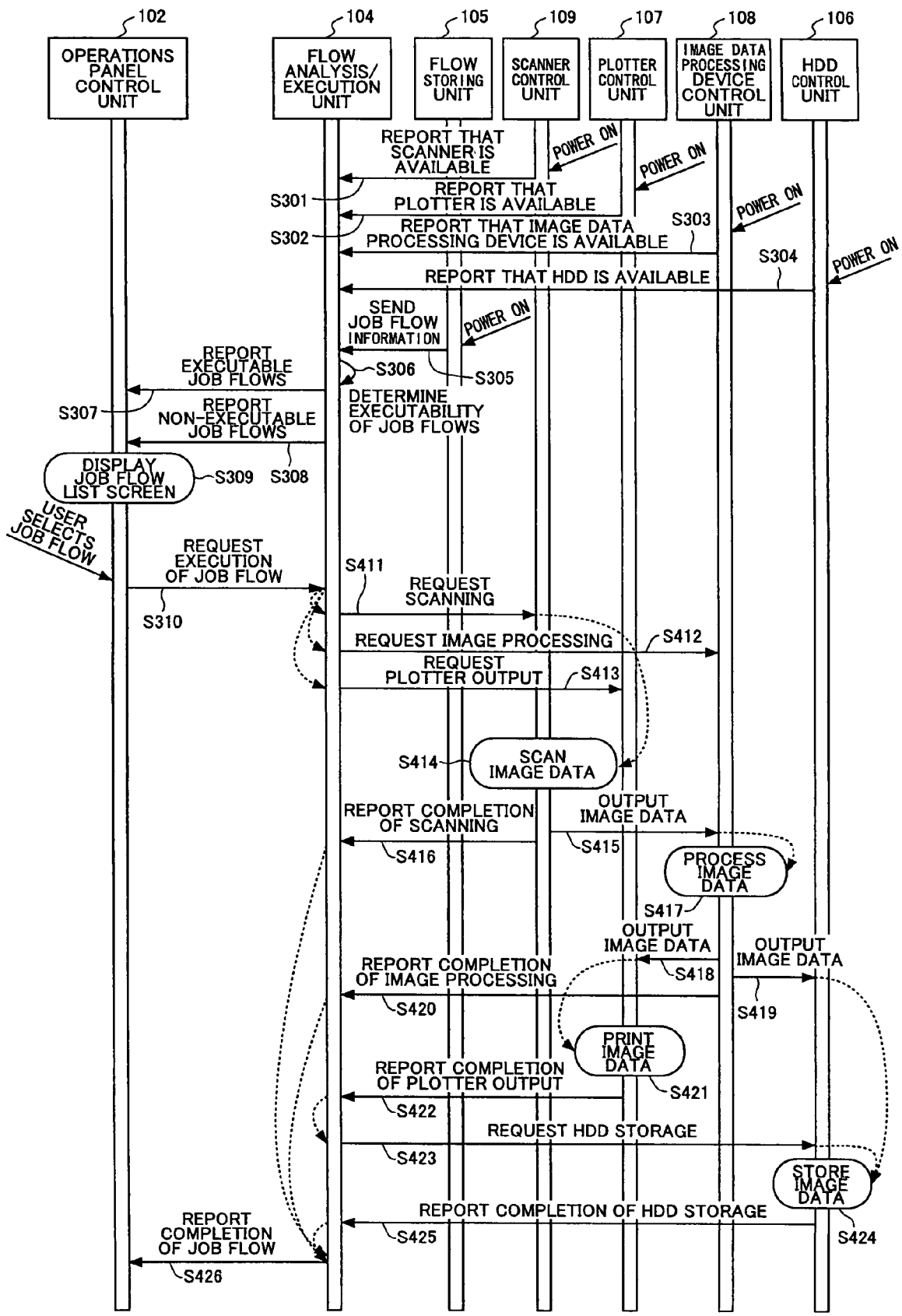
FIG. 15 is a sequence chart showing a process of executing a job flow A.

FIG. 15 is a sequence chart showing a process of executing the job flow A. In FIG. 15, steps corresponding to steps S301 through S310 shown in FIG. 10 are assigned the same step numbers and descriptions of those steps are omitted here.

When receiving a request for executing the current job flow (job flow A) from the operations panel control unit 102, the flow analysis/execution unit 104 sends execution requests simultaneously to the process components constituting the job flow A excluding the HDD control unit 106 (S411 through S413). In other words, when a job flow contains multiple output components to be executed in series, the flow analysis/execution unit 104 sends an execution request only to the first one of the output components at this timing. In this example, the flow analysis/execution unit 104 sends execution requests to the scanner control unit 109, the image data processing device control unit 108, and the plotter control unit 107.

When receiving the execution request from the flow analysis/execution unit 104, the scanner control unit 109 inputs image data from the scanner 15 (S414). The scanner control unit 109 outputs the image data to the pipe A between itself and the image data processing device control unit 108 (S415) and reports the completion of the scanning job to the flow analysis/execution unit 104 (S416).

When detecting the input of the image data to the pipe A, the image data processing device control unit 108 processes (for example, N-up processes) the image data (S417). After completing the image data processing job, the image data processing device control unit 108 outputs the processed image data to the pipe B between itself and the plotter control unit 107 and to the pipe C between itself and the HDD control unit 106 (S418, S419), and reports the completion of the image data processing job to the flow analysis/execution unit 104 (S420).

When detecting the input of processed image data to the pipe B, the plotter control unit 107 outputs (prints) the processed image data on the plotter 13 (S421) and reports the completion of the plotter output job to the flow analysis/execution unit 104 (S422). Meanwhile, the HDD control unit 106 does not start its job even when the processed image data are input to the pipe C. In other words, since no execution request has been sent from the flow analysis/execution unit 104 to the HDD control unit 106 at this stage, the HDD control unit 106 is not waiting for the input of the processed image data to the pipe C.

When receiving the completion report from the plotter control unit 107, the flow analysis/execution unit 104 sends an execution request to the HDD control unit 106 that is the second output component in the job flow A (S423). The HDD control unit 106, when receiving the execution request, detects the input of the processed image data to the pipe C and outputs (stores) the processed image data to the HDD 12 (S424). After outputting the processed image data to the HDD 12, the HDD control unit 106 reports the completion of the HDD storage job to the flow analysis/execution unit 104 (S425).

After receiving completion reports from all of the process components in the job flow A, the flow analysis/execution unit 104 reports the completion of the job flow A execution to the operations panel control unit 102 (S426). The operations panel control unit 102 then displays a message indicating the completion of the job flow A execution on the operations panel 11.

Thus, the image forming apparatus 10 of this embodiment may also be configured to be able to control the execution of a job flow containing two or more output components executed in series. This configuration makes it possible to generate various types of job flows and thereby to improve the usability of the image forming apparatus 10.

Figure 16:
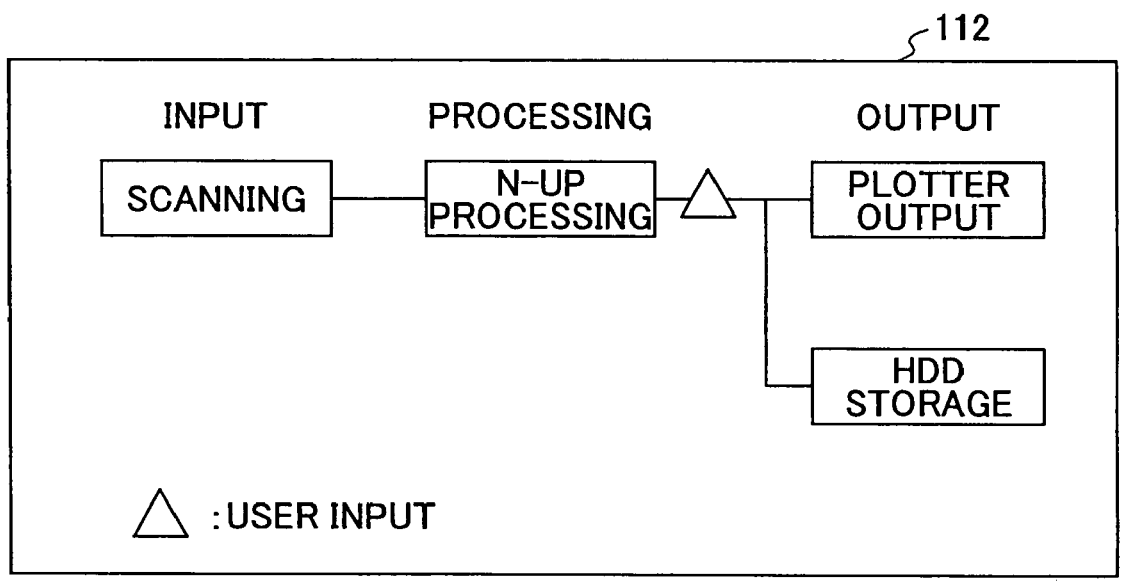
FIG. 16 is a drawing illustrating a job flow detail screen for a job flow B.

Next, an exemplary process of executing a job flow B shown in FIG. 16 is described. FIG. 16 is a drawing illustrating a job flow detail screen for the job flow B. In the job flow detail screen 112 shown in FIG. 16, a triangle indicates that the execution of the job flow B is interrupted until a user input (for example, pressing a start button) is received. The job flow B is designed to input image data from a scanner, to process (for example, to N-up process) the image data, and, after receiving a user input, to output the processed image data on a plotter and to an HDD concurrently. The job flow B is different from the job flow shown in FIG. 10 in that the execution is interrupted after the image data are processed until a user input is received.

Figure 17:
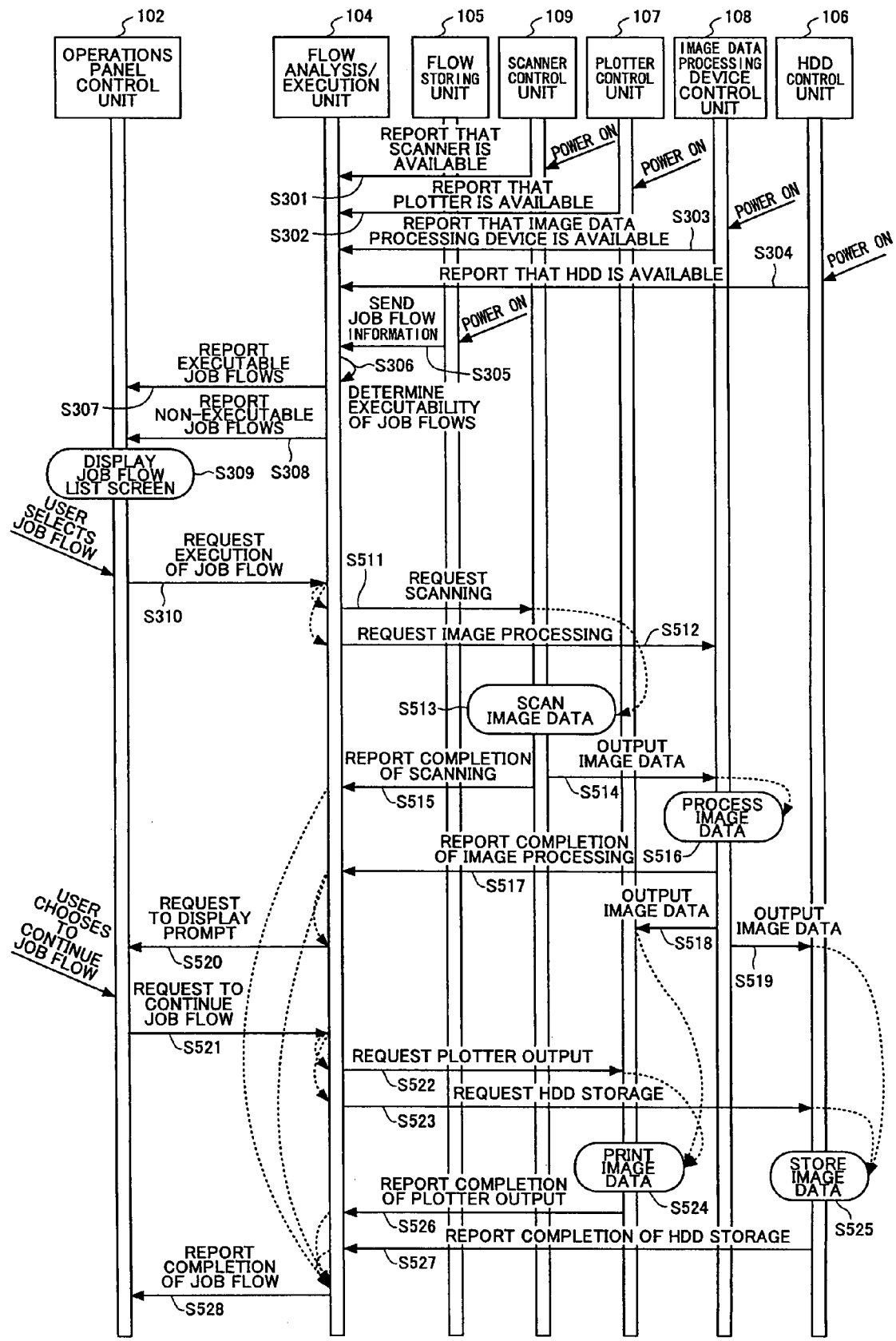
FIG. 17 is a sequence chart showing a process of executing a job flow B.

FIG. 17 is a sequence chart showing a process of executing the job flow B. In FIG. 17, steps corresponding to steps S301 through S310 shown in FIG. 10 are assigned the same step numbers and descriptions of those steps are omitted here.

When receiving a request for executing the current job flow (job flow B) from the operations panel control unit 102, the flow analysis/execution unit 104 sends execution requests simultaneously to the process components constituting the job flow B excluding the plotter control unit 107 and the HDD control unit 106 (S511, S512). In other words, when a job flow contains a pause (interrupt) to wait for a user input, the flow analysis/execution unit 104 does not send execution requests at this timing to the process components to be executed after the pause. In this example, the flow analysis/execution unit 104 sends execution requests to the scanner control unit 109 and the image data processing device control unit 108.

The scanner control unit 109, when receiving the execution request from the flow analysis/execution unit 104, inputs image data from the scanner 15 (S513). The scanner control unit 109 outputs the image data to the pipe A between itself and the image data processing device control unit 108 (S514) and reports the completion of the scanning job to the flow analysis/execution unit 104 (S515).

The image data processing device control unit 108, when detecting the input of the image data to the pipe A, processes (for example, N-up processes) the image data (S516). After completing the image data processing job, the image data processing device control unit 108 reports the completion of the image data processing job to the flow analysis/execution unit 104 (S517), and outputs the processed image data to the pipe B between itself and the plotter control unit 107 and to the pipe C between itself and the HDD control unit 106 (S518, S519). At this stage, since execution requests have not been sent from the flow analysis/execution unit 104, the plotter control unit 107 and the HDD control unit 106 do not start their respective jobs even when the processed image data are input to the pipe B and the pipe C.

When receiving the completion report from the image data processing device control unit 106, the flow analysis/execution unit 104 requests the operations panel control unit 102 to display a prompt for a user input and waits for the user input (S520). The operations panel control unit 102, for example, displays a message such as "Continue the processing?" as a prompt. When the user chooses to continue the processing (job flow B) and, for example, presses a start button, the operations panel control unit 102 requests the flow analysis/execution unit 104 to continue the job flow B.

Then, the flow analysis/execution unit 104 sends execution requests to the process components to be executed after the pause. In this example, the flow analysis/execution unit 104 sends execution requests simultaneously to the plotter control unit 107 and the HDD control unit 106 (S522, S523). Step S524 and subsequent steps (output to the plotter 13 and the HDD 12) are substantially the same as step S322 and subsequent steps shown in FIG. 10 and therefore descriptions of those steps are omitted here.

Thus, the image forming apparatus 10 of this embodiment may also be configured to be able to control the execution of a job flow containing a pause (interrupt) to wait for a user input. This configuration makes it possible for the user to control execution timings of process components and thereby makes it possible to improve the usability of the image forming apparatus 10.

Figure 18:
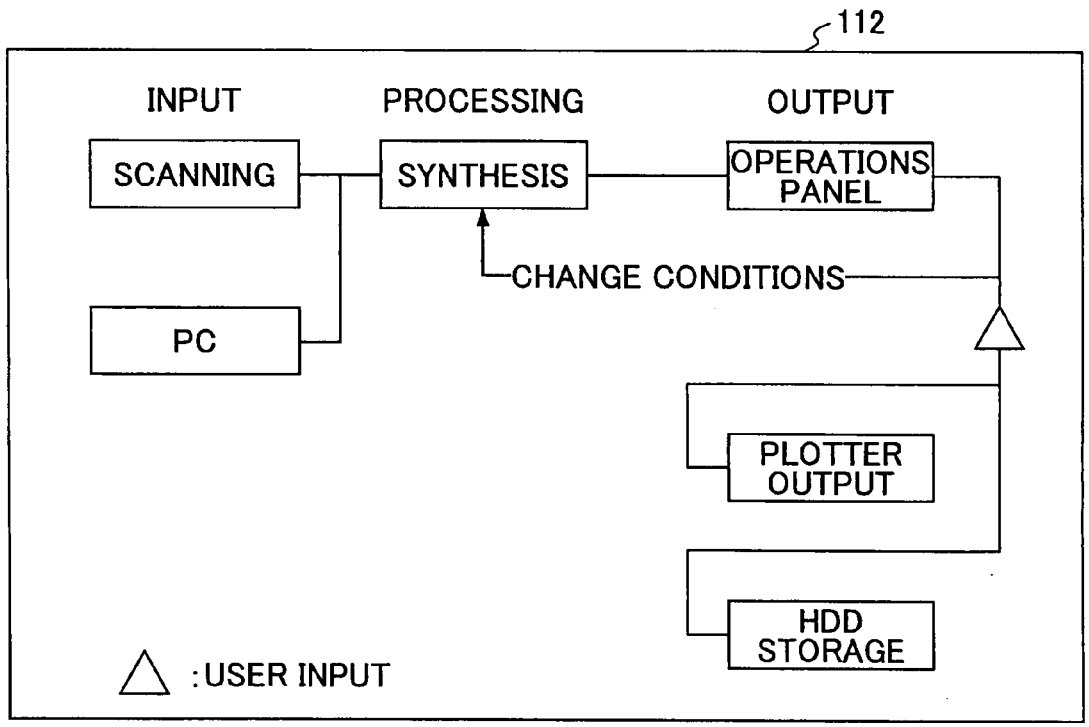
FIG. 18 is a drawing illustrating a job flow detail screen for a job flow C.

The job flow B described above is a simple example of a job flow involving a user input. A job flow C shown in FIG. 18 is a more practical example. FIG. 18 is a drawing illustrating a job flow detail screen for the job flow C.

As shown in FIG. 18, the job flow C is designed to synthesize scanned image data and image data from a PC, to display a preview image of the synthesized image data on an operations panel, and to wait for a user input. When the preview image is satisfactory, the user enters a command to continue the job flow C. Then, the plotter output component and the HDD storage component are executed. When the preview image is not satisfactory, the user changes conditions to synthesize the image data. In this case, the image data are synthesized again and a preview image is displayed again.

Figure 19:
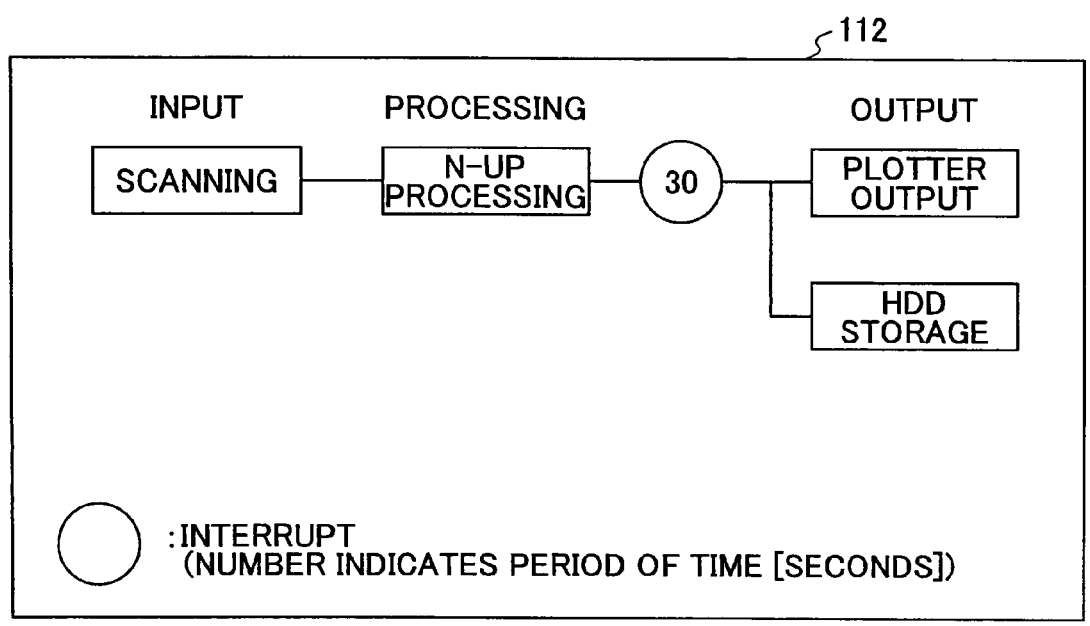
FIG. 19 is a drawing illustrating a job flow detail screen for a job flow D.

Next, an exemplary process of executing a job flow D shown in FIG. 19 is described. FIG. 19 is a drawing illustrating a job flow detail screen for the job flow D. In the job flow detail screen 112 shown in FIG. 19, a circle indicates that the execution of the job flow D is interrupted for a period of time indicated by a number in the circle. The job flow D is designed to input image data from a scanner, to process (for example, to N-up process) the image data, and, after a pause (interrupt) of 30 seconds, to output the processed image data on a plotter and to an HDD concurrently. The job flow D is different from the job flow shown in FIG. 10 in that the execution is interrupted for a specified period of time after the image data are processed.

Figure 20:
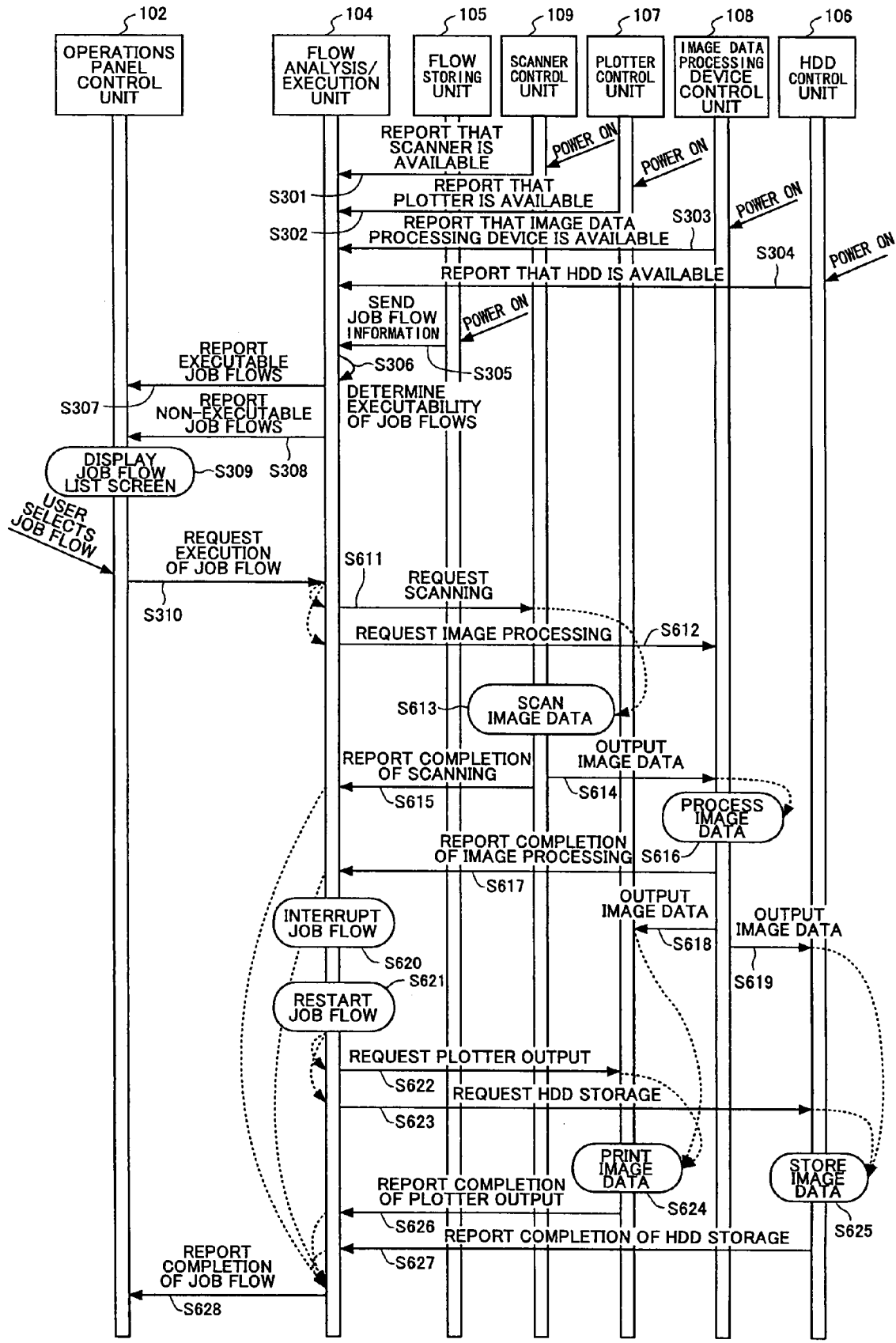
FIG. 20 is a sequence chart showing a process of executing a job flow D.

FIG. 20 is a sequence chart showing a process of executing the job flow D. In FIG. 20, steps corresponding to steps S301 through S310 shown in FIG. 10 are assigned the same step numbers and descriptions of those steps are omitted here.

When receiving a request for executing the current job flow (job flow D) from the operations panel control unit 102, the flow analysis/execution unit 104 sends execution requests simultaneously to the process components constituting the job flow D excluding the plotter control unit 107 and the HDD control unit 106 (S611, S612). In other words, when a job flow contains a pause (interrupt) of a specified period of time, the flow analysis/execution unit 104 does not send execution requests at this timing to the process components to be executed after the pause. In this example, the flow analysis/execution unit 104 sends execution requests to the scanner control unit 109 and the image data processing device control unit 108.

When receiving the execution request from the flow analysis/execution unit 104, the scanner control unit 109 inputs image data from the scanner 15 (S613). The scanner control unit 109 outputs the image data to the pipe A between itself and the image data processing device control unit 108 (S614) and reports the completion of the scanning job to the flow analysis/execution unit 104 (S615).

When detecting the input of the image data to the pipe A, the image data processing device control unit 108 processes (for example, N-up processes) the image data (S616). After completing the image data processing job, the image data processing device control unit 108 reports the completion of the image data processing job to the flow analysis/execution unit 104 (S617), and outputs the processed image data to the pipe B between itself and the plotter control unit 107 and to the pipe C between itself and the HDD control unit 106 (S618, S619). At this stage, since execution requests have not been sent from the flow analysis/execution unit 104, the plotter control unit 107 and the HDD control unit 106 do not start their respective jobs even when the processed image data are input to the pipe B and the pipe C.

The flow analysis/execution unit 104, when receiving the completion report from the image data processing apparatus control unit 106, starts counting the specified period of time (S620). When the specified period of time elapses (s621), the flow analysis/execution unit 104 sends execution requests to the process components to be executed after the pause. In this case, the flow analysis unit 104 sends execution requests simultaneously to the plotter control unit 107 and the HDD control unit 106 (S622, S623). Step S624 and subsequent steps (output to the plotter 13 and the HDD 12) are substantially the same as step S322 and subsequent steps shown in FIG. 10 and therefore descriptions of those steps are omitted here.

Thus, the image forming apparatus 10 of this embodiment may also be configured to control the execution of a job flow containing a pause (interrupt) of a specified period of time. This configuration makes it possible to control execution timings of process components using a pause and thereby to improve the usability of the image forming apparatus 10. A pause may be inserted anywhere, for example, between an input component and a processing component or between serially connected output components. Also, instead of specifying a period of time, it is possible to specify time of day (for example, to specify the time when a fax transmission is performed).

As described above, the image forming apparatus 10 of the first embodiment makes it possible to generate and register a job flow defining a combination and an execution sequence of process components. Also, the image forming apparatus 10 is configured to dynamically control execution of registered job flows. With the image forming apparatus 10, the user can execute an application or perform a task by just selecting the corresponding job flow.

Further, the image forming apparatus 10 configured to dynamically control execution of job flows can flexibly adapt to addition and removal of process components. This in turn makes it possible to expand functionality of the image forming apparatus 10 by adding process components or generating new combinations (job flows) of process components while minimizing the need to modify existing process components or applications.

A second embodiment of the present invention is described below. In the second embodiment, synchronization of process components using pipes is described in more detail. Here, differences from the first embodiment are mainly described and descriptions in the first embodiment may also apply to the second embodiment unless otherwise mentioned.

As described above in the first embodiment, a process component waits until image data are input to the input pipe and, when the image data are input, starts the corresponding job. In such a process, a process component may not have to wait until the input of image data to a pipe is completed before starting its job. For example, when image data are composed of multiple pages, process components may be synchronized page by page. Further, when each page of image data is composed of multiple units, process components may be synchronized unit by unit.

Figure 21:
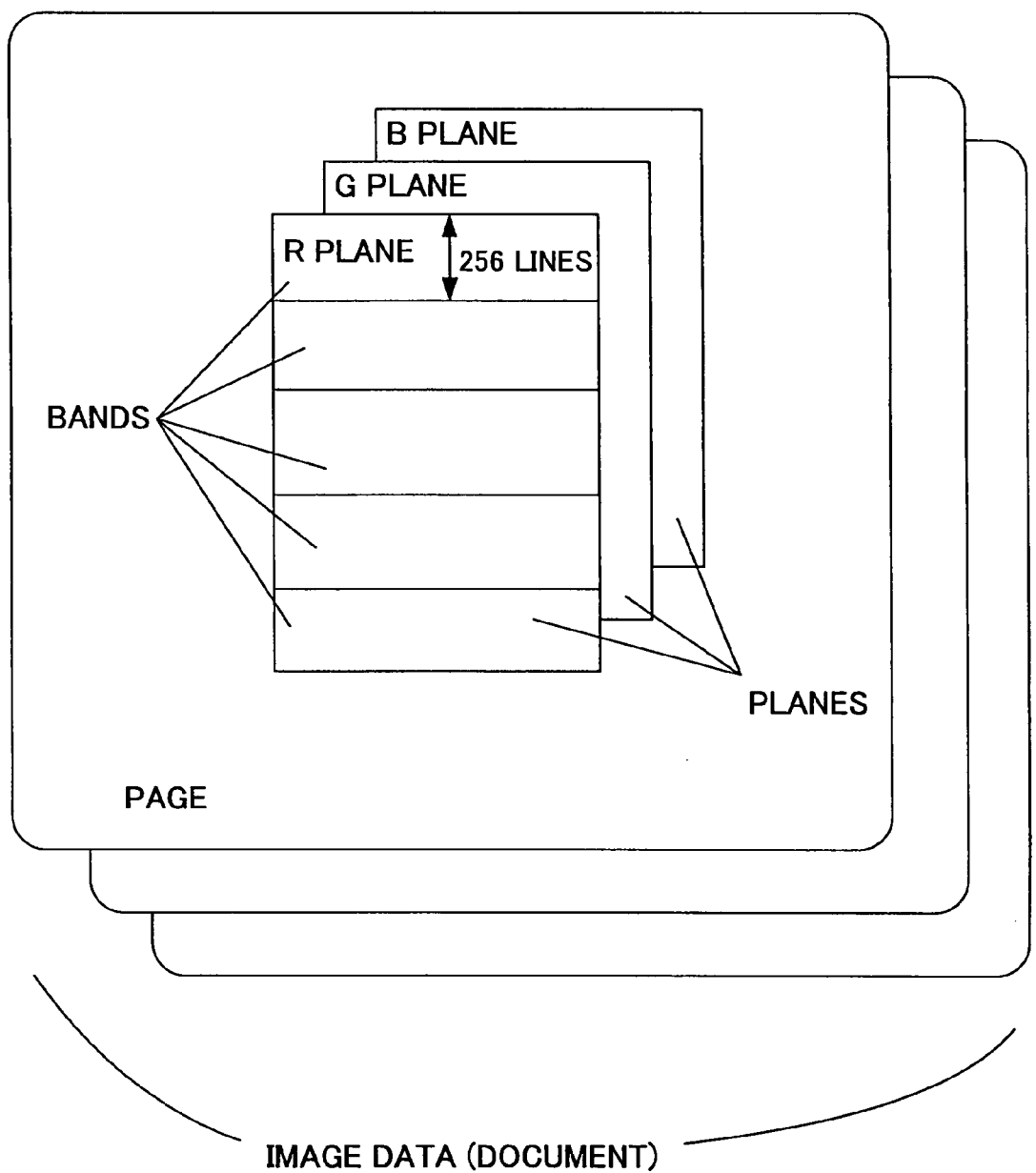
FIG. 21 is a drawing illustrating an exemplary structure of image data according to a second embodiment of the present invention.

FIG. 21 is a drawing illustrating an exemplary structure of image data according to the second embodiment of the present invention. In FIG. 21, image data correspond to a document. In other words, image data in this case refer to data obtained by scanning a document with the scanner 15 in one complete scanning operation. Accordingly, the obtained image data are composed of one or more pages (images). Each page is composed of multiple planes (color planes). The types and the number of the color planes depend on the color space used. For example, when the RGB color space is used, each page is composed of an R plane, a G plane, and a B plane. Further, each plane is divided into units called bands. The size of each band depends on the size of a band memory. In FIG. 21, it is assumed that a band is composed of 256 lines.

When image data have a structure as described above, process components may be synchronized at various timings or by various units (image data by image data, page by page, plane by plane, or band by band). In the second embodiment, when process components are synchronized page by page, plane by plane, or band by band (other than image data by image data), the process components are considered as being executed concurrently (concurrent execution). A process component waiting for the input of image data to the pipe can start its job before the previous process component completes, for example, inputting, processing, or outputting the entire image data. Therefore, at one point during the process, the two process components may run concurrently. On the other hand, when process components are synchronized image data by image data, the process components are considered as being executed in series (serial execution).

In this embodiment, the user can select concurrent execution or serial execution by specifying a property of a line connecting process components on the job flow generation screen 510. For example, the user displays a context menu including menu items such as "serial" and "concurrent" by clicking the right mouse button on a line between process components and selects either "serial" or "concurrent". When "serial" is selected, the process components are executed in series and when "concurrent" is selected, the process components are executed concurrently. Also, the job flow generation screen 510 may be configured to change the appearance of a line connecting two process components depending on whether "serial" or "concurrent" is selected so that the user can easily identify the property of the line.

Figure 22:
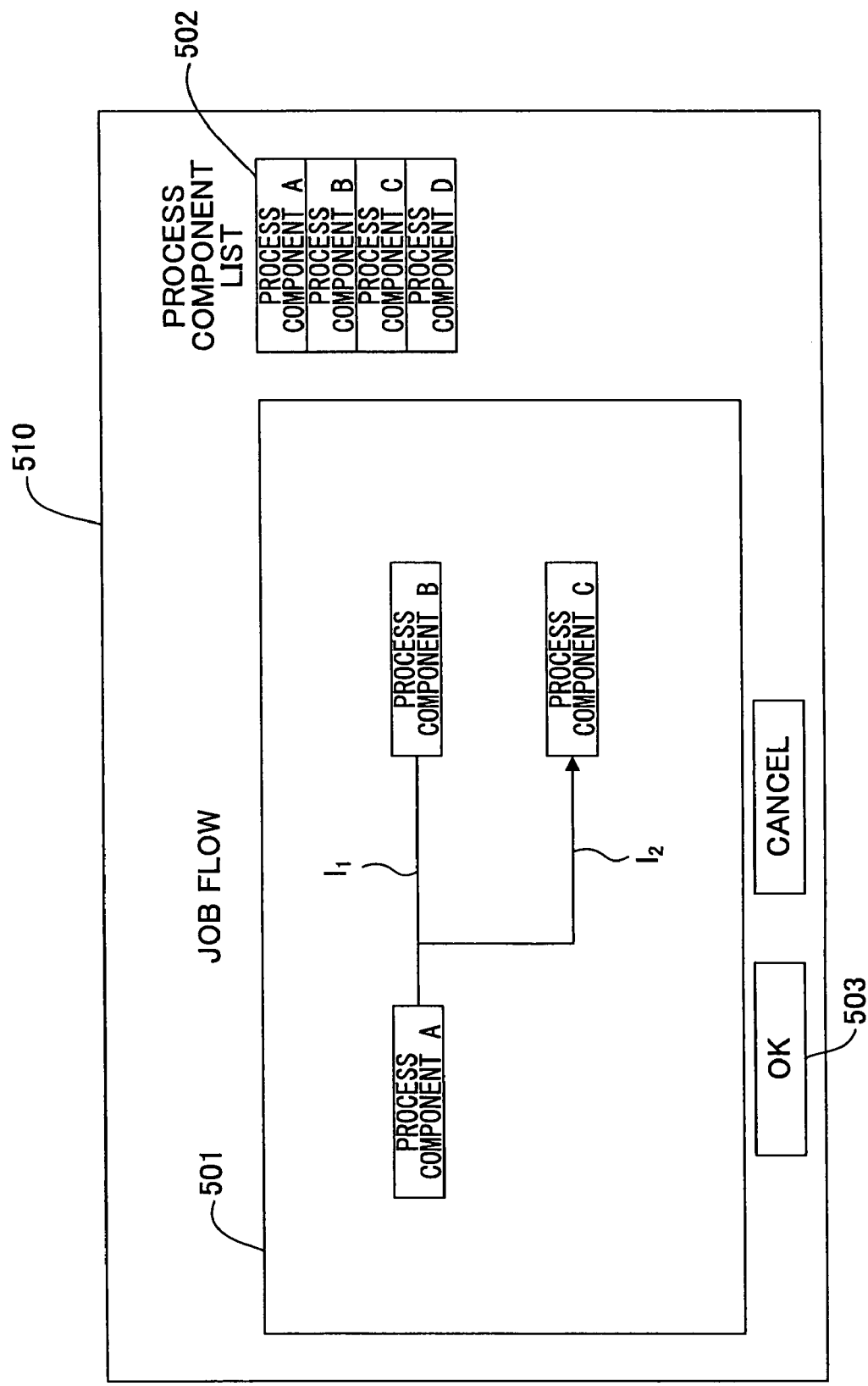
FIG. 22 is a drawing illustrating an exemplary job flow generation screen where the appearance of a line connecting process components changes according to its property.

FIG. 22 is a drawing illustrating an example of the job flow generation screen 510 where the appearance of a line connecting process components changes according to its property. In FIG. 22, parts corresponding to those shown in FIGS. 5A and 5B are assigned the same reference numbers and descriptions of those parts are omitted here.

A job flow shown in FIG. 22 is composed of process components A through C. A line $l_2$ connecting the process components A and C has an arrow at an end. The line $l_2$ indicates that the process components A and C are executed in series. On the other hand, a line $l_1$ connecting the process components A and B has no arrow. The line $l_1$ indicates that the process components A and B are executed concurrently.

After the job flow is generated on the job flow generation screen 510 as shown in FIG. 22 and the OK button 503 is clicked on, the job flow information of the generated job flow is stored in the HDD 12 through steps as described above with reference to FIG. 4.

Figure 23:
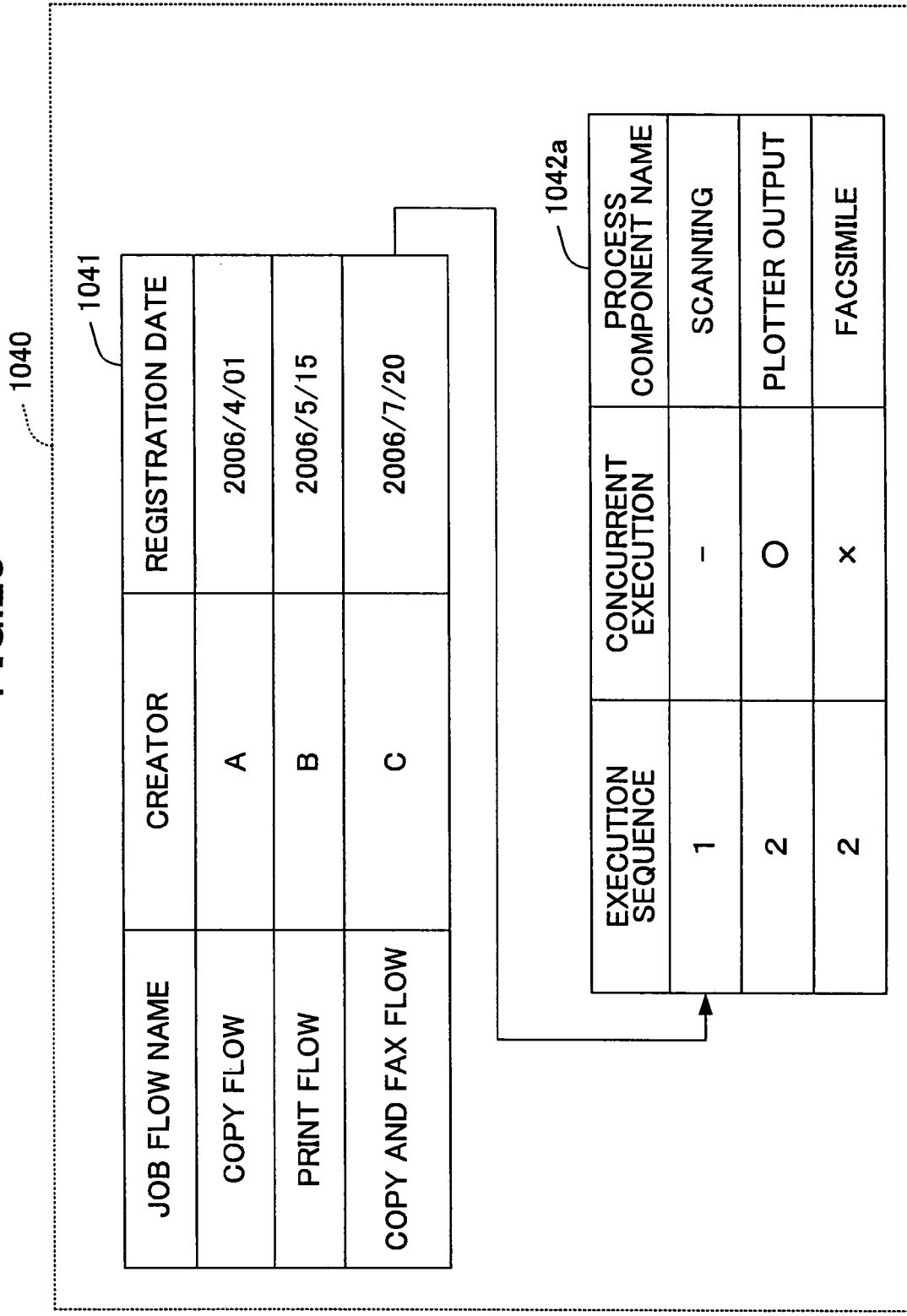
FIG. 23 is a drawing illustrating an exemplary format of job flow information according to the second embodiment.

FIG. 23 is a drawing illustrating an exemplary format of job flow information according to the second embodiment. In FIG. 23, parts corresponding to those shown in FIG. 6 are assigned the same reference numbers and descriptions of those parts are omitted here. As shown in FIG. 23, the job flow information 1040 of the second embodiment includes information indicating whether a process component is executed concurrently with the previous process component, in addition to the names of the process components constituting each job flow and the execution information (execution sequence and execution conditions) of the constituent process components. In FIG. 23, ○ indicates concurrent execution and X indicates serial execution. For example, a copy and fax job flow shown in FIG. 23 is designed to execute a scanning component first, to execute a plotter output component concurrently with the scanning component, and to execute a facsimile component in series with the scanning component. The unit (timing) of synchronization in concurrent execution (page, plane, or band) may be predefined and stored in the HDD 12 as a separate entry. Also, the job flow generation screen 510 may be configured to allow the user to select the unit (timing) of synchronization together with the type of execution ("serial" or "concurrent") for each line connecting process components and thereby to change the unit of synchronization from one process component to another. In this case, information indicating the unit of synchronization may be registered for each process component in the job flow information 1040 instead of information indicating whether a process component is executed concurrently.

When a job flow is executed based on the job flow information 1040 including the units of synchronization, each process component starts its job according to the specified unit of synchronization. For example, when the unit of synchronization for a process component is "page", the process component starts its job when a page of image data is input to the pipe. When the unit of synchronization for a process component is "plane", the process component starts its job when a plane of image data is input to the pipe. When the unit of synchronization for a process component is "band", the process component starts its job when a band of image data is input to the pipe. The input of a unit of image data to the pipe may be monitored by the process component itself or by a separate program module. When a program module is used, the program module reports the input of a unit of image data to the process component waiting for the input.

As described above, the image forming apparatus 10 of the second embodiment makes it possible to more flexibly specify the timing (unit of synchronization) at which two adjacent process components are synchronized.

A third embodiment of the present invention is described below. According to the third embodiment, executability of a job flow is determined according to the attribute information of constituent process components when the job flow is registered. In the third embodiment, differences from the first and second embodiments are mainly described and descriptions in the first and second embodiments may also apply to the third embodiment unless otherwise mentioned.

Figure 24:
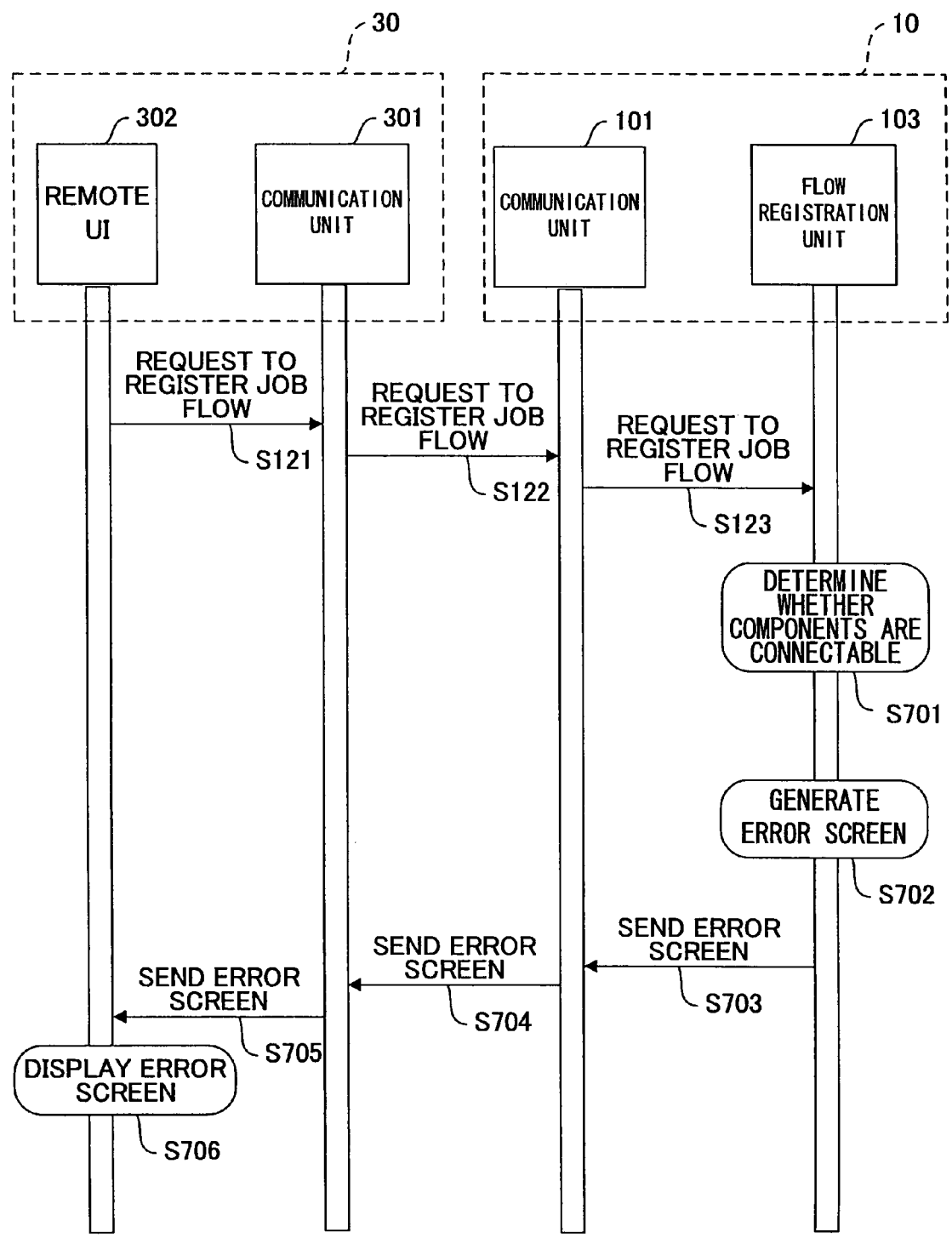
FIG. 24 is a sequence chart showing a process of registering a job flow according to a third embodiment of the present invention.

FIG. 24 is a sequence chart showing a process of registering a job flow according to the third embodiment. In FIG. 24, steps corresponding to those shown in FIG. 4 are assigned the same step numbers and descriptions of those steps are omitted here. The steps shown in FIG. 24 are performed following the steps shown in FIG. 3.

When the registration of a job flow is requested in step S123, the flow registration unit 103 determines the executability of the job flow based on the attribute information of the constituent process components specified in the job flow information included in the registration request (S701). According to the third embodiment, the flow registration unit 103 determines the executability of a job flow by determining whether process components are connectable based on formats of image data that the process components can receive from pipes and formats of image data that the process components can output to pipes. The image forming apparatus 10 of the third embodiment stores attribute information for each process component. For a process component that receives data from a pipe, the attribute information includes a format of image data (input data format) that the process component can receive from the pipe. For a process component that outputs data to a pipe, the attribute information includes a format of image data (output data format) that the process component can output to the pipe. The attribute information is hereafter called process component interface information. In step S701, the flow registration unit 103 determines whether process components are connectable based on the process component interface information.

Figure 25:
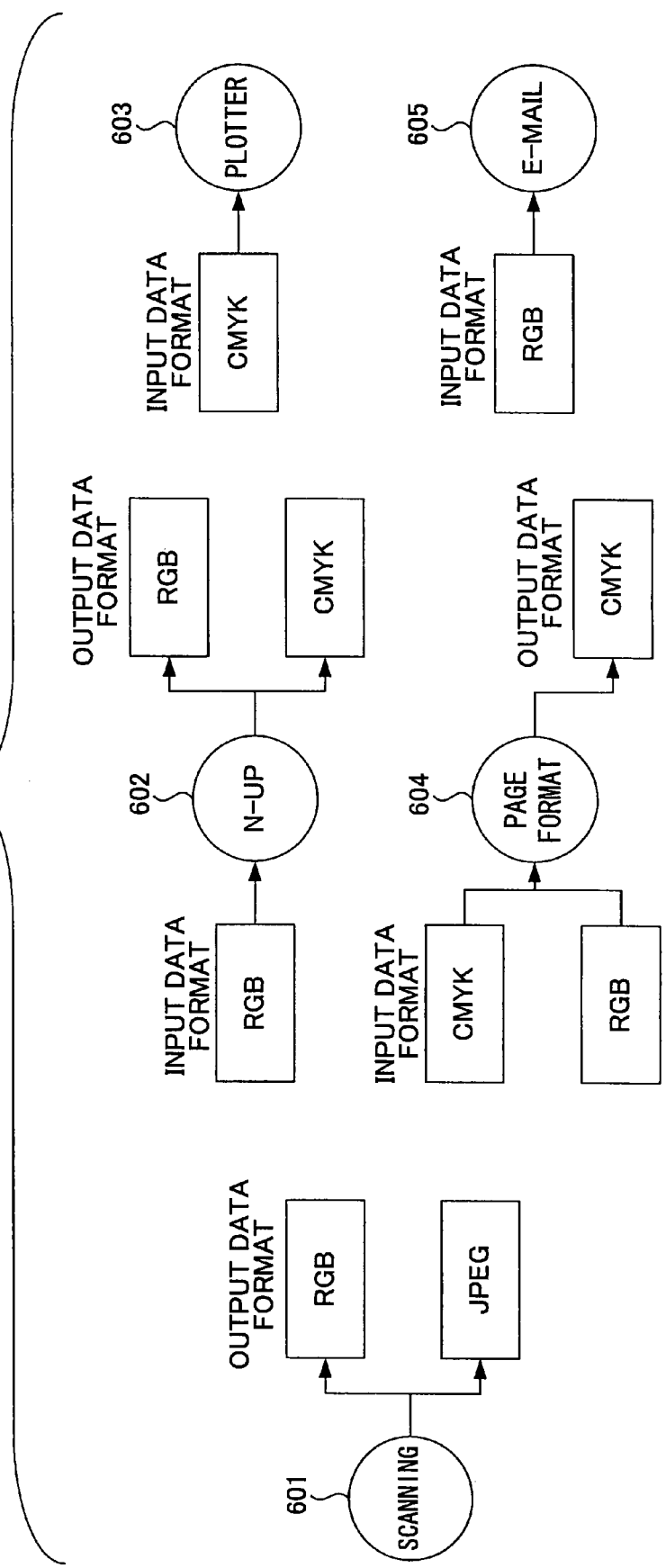
FIG. 25 is a schematic diagram illustrating exemplary process component interface information.

FIG. 25 is a schematic diagram illustrating exemplary process component interface information. In FIG. 25, circles represent process components and rectangles represent formats of image data that the process components can receive or output (that the process components can handle). For example, as shown in FIG. 25, a scanning component 601 can output image data in the RGB or JPEG format. An N-up processing component 602 can receive image data in the RGB format and output the image data in the RGB or CMYK format. A plotter output component 603 can receive image data in the CMYK format. A page format component 604 can receive image data in the CMYK or RGB format and output the image data in the CMYK format. An e-mail transmission component 605 can receive image data in the RGB format.

The flow registration unit 103 compares the output data format(s) of a preceding process component and the input data format(s) of a succeeding process component and thereby determines whether the adjacent process components are connectable. More specifically, the flow registration unit 103 determines that the adjacent process components are connectable if one of the output data formats of the preceding process component matches one of the input data formats of the succeeding process component. If none of the output data formats of the preceding process component matches the input data formats of the succeeding process component, the flow registration unit 103 determines that the adjacent process components are not connectable.

Figure 26:
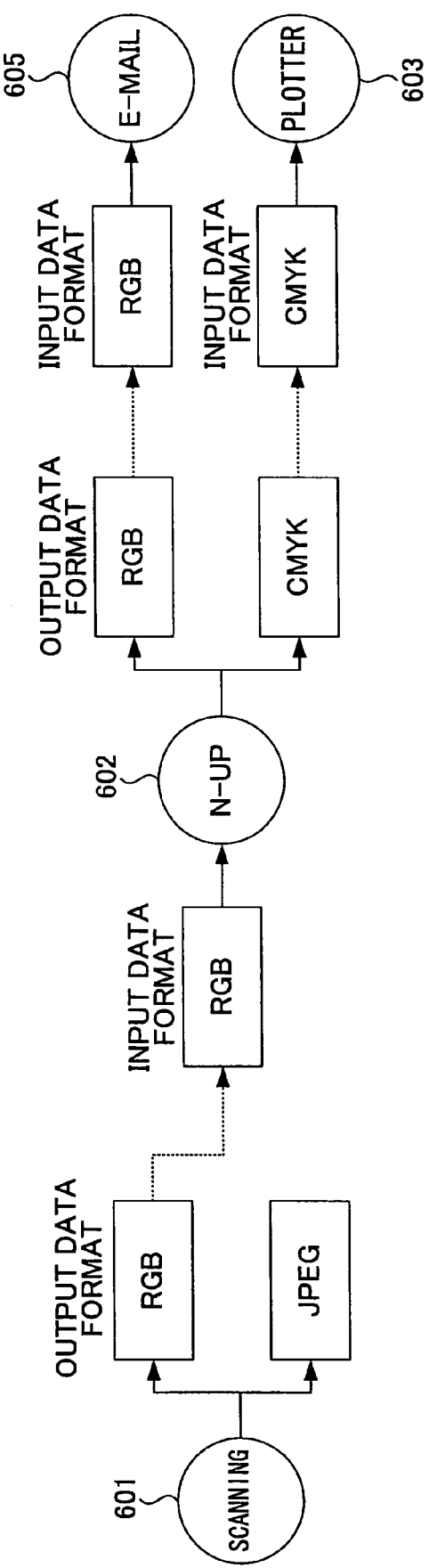
FIG. 26 is a drawing illustrating an exemplary job flow where all process components are connectable.

FIG. 26 is a drawing illustrating an exemplary job flow where all process components are connectable. In the exemplary job flow shown in FIG. 26, the scanning component 601 is followed by the N-up processing component 602 and the N-up processing component 602 is followed by the e-mail transmission component 605 and the plotter output component 603. The scanning component 601 can output image data in the RGB or JPEG format and the N-up processing component 602 can receive image data in the RGB format. Therefore, the N-up processing component 602 can receive image data from the scanning component 601 in the RGB format (they are connectable). The N-up processing component 602 can output image data in the RGB or CMYK format, the e-mail transmission component 605 can receive image data in the RGB format, and the plotter output component can receive image data in the CMYK format. Therefore, the e-mail transmission component 605 can receive image data from the N-up processing component 602 in the RGB format, and the plotter output component 603 can receive image data from the N-up processing component 602 in the CMYK format. Thus, all of the process components in the exemplary job flow shown in FIG. 26 are connectable.

Figure 27:
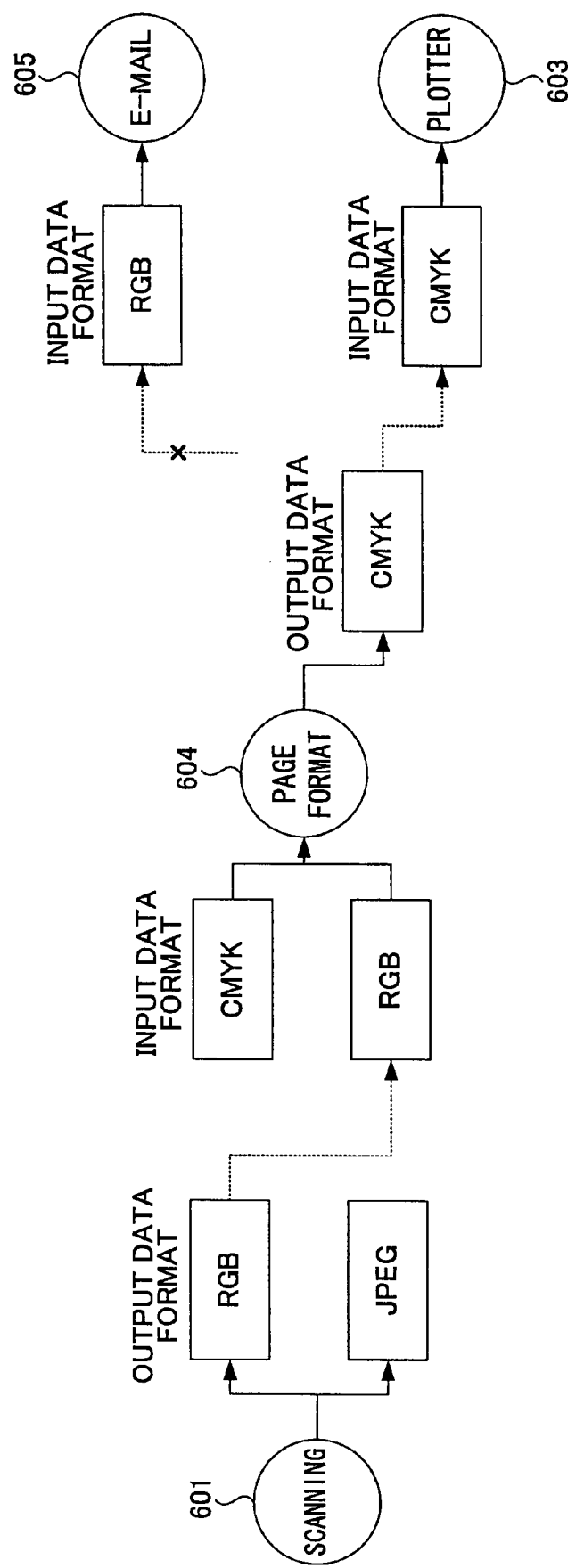
FIG. 27 is a drawing illustrating an exemplary job flow where one of process components is not connectable.

FIG. 27 is a drawing illustrating an exemplary job flow where one of process components is not connectable. In the exemplary job flow shown in FIG. 27, the scanning component 601 is followed by the page format component 604 and the page format component 604 is followed by the e-mail transmission component 605 and the plotter output component 603. The page format component 604 can output image data only in the CMYK format and the e-mail transmission component 605 can receive image data only in the RGB format. Therefore, in the exemplary job flow shown in FIG. 27, the page format component 604 and the e-mail transmission component 605 are not connectable.

The process component interface information may be retained separately by respective process components or stored collectively in the HDD 12. In the former case, the flow registration unit 103 refers to process components for the process component interface information. In the latter case, the flow registration unit 103 retrieves the process component interface information from the HDD 12.

If all the process components in a job flow are connectable in step S701, the flow registration unit 103 determines that the job flow is executable and steps S124 through S131 are performed.

If any pair of the process components in a job flow is not connectable in step S701, the flow registration unit 103 determines that the job flow is not executable, generates HTML data to display an error screen reporting that the job flow is not executable (S702), and sends the HTML data to the communication unit 101 (S703).

The communication unit 101 sends the HTML data to the communication unit 301 of the client PC 30 (S704). The communication unit 301 sends the received HTML data to the remote UI 302 (S705). Then, the remote UI 302 displays the error screen based on the HTML data on a display unit of the client PC 30 (S706).

Figure 28:
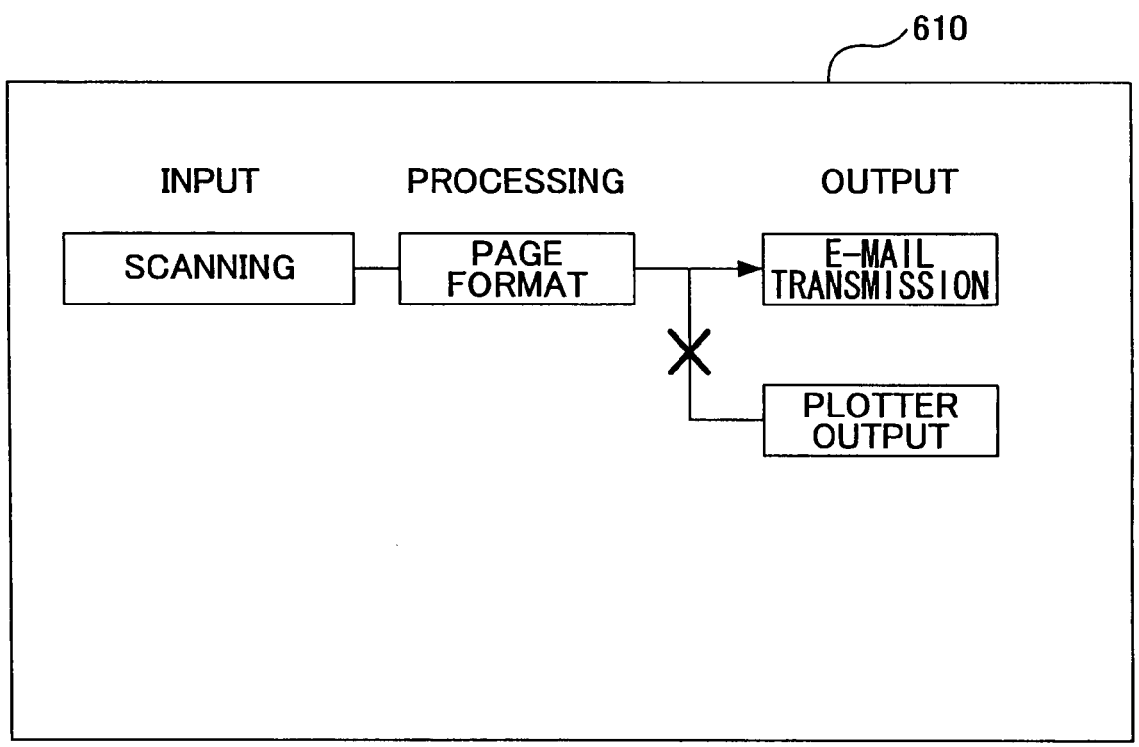
FIG. 28 is a drawing illustrating an exemplary error screen.

FIG. 28 is a drawing illustrating an exemplary error screen. An error screen 610 in FIG. 28 shows a job flow the registration of which has been requested. In FIG. 28, an X mark indicates a point where process components (a page format component and a plotter output component) cannot be connected. By referring to the error screen 610, the user identifies process components that cannot be connected and regenerates the job flow.

As described above, the image forming apparatus 10 of the third embodiment determines whether a generated job flow is executable by determining whether the constituent process components are connectable, and thereby makes it possible to register only correctly configured job flows. In other words, the image forming apparatus 10 of the third embodiment makes it possible to prevent malfunctioning of a job flow resulting from the difference in data formats the process components can handle.

The operations panel control unit 102, the flow registration unit 103, the flow analysis/execution unit 104, and the flow storing unit 105 of the image forming apparatus 10 are examples of a display control unit, a registration unit, an analysis unit, and a storing unit, respectively.

Figure 29:
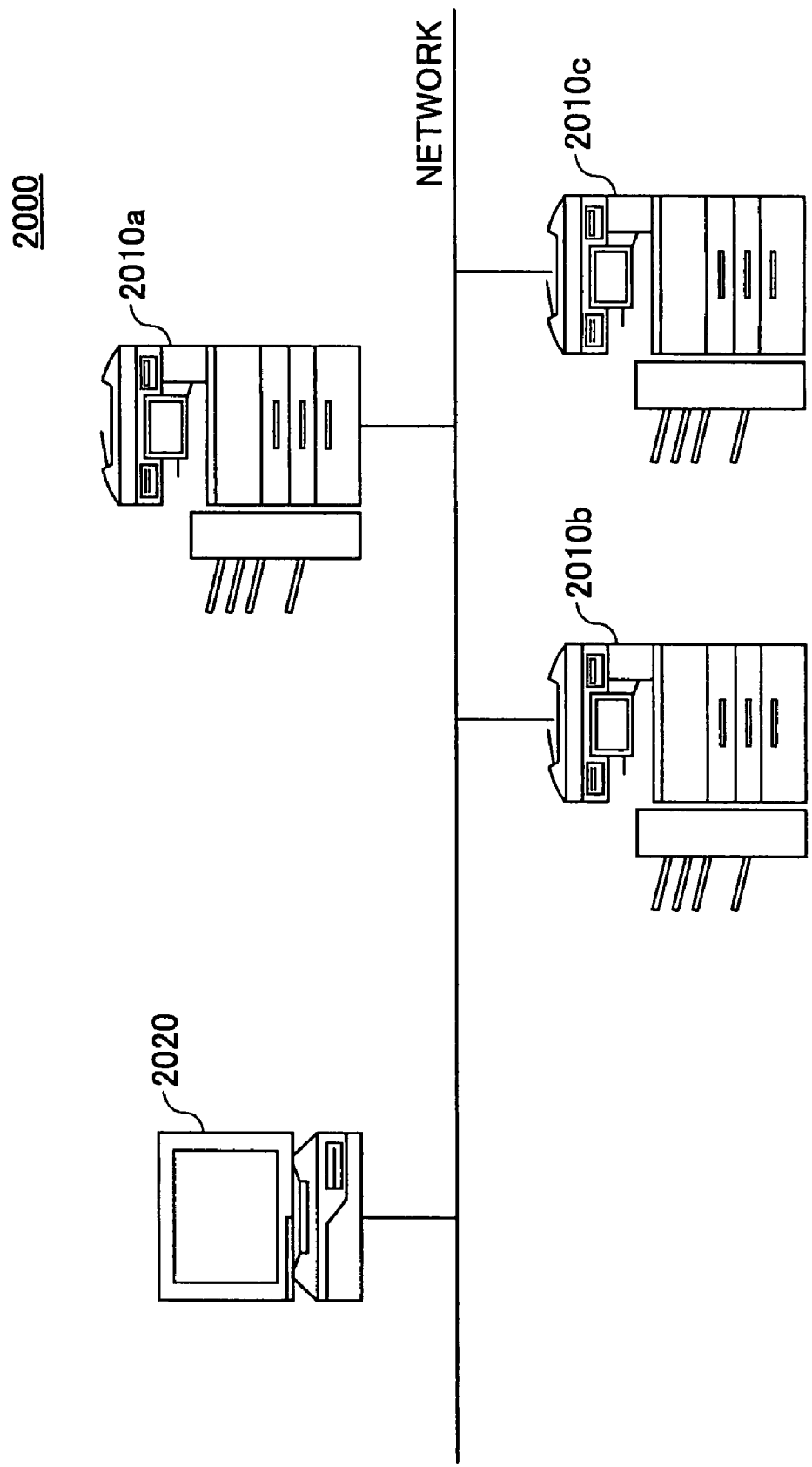
FIG. 29 is a drawing illustrating a configuration of an exemplary image processing system according to a fourth embodiment of the present invention.

FIG. 29 is a drawing illustrating an exemplary configuration of an image processing system 2000 according to a fourth embodiment of the present invention. In this embodiment, the image processing system 2000 is an example of an information processing system. As shown in FIG. 29, the image processing system 2000 includes one or more image forming apparatuses (image forming apparatuses 2010a, 2010b, and 2010c, which hereafter may also be called image forming apparatuses 2010) and a client PC 2020. The above components of the image processing system 2000 are connected via a network (either wired or wireless) such as a local area network (LAN).

The image forming apparatus 2010 is an image processing apparatus such as a copier, printer, or multifunction copier and is an example of an electronic apparatus in this embodiment. The image forming apparatus 2010 is designed such that application programs can be added or removed after shipment. Application programs for the image forming apparatus 2010 may be developed, for example, by using Java (registered trademark) or C language. In this embodiment, an application program is a piece of software executed by the image forming apparatus 2010 to provide a particular service (sequence of jobs from input of a request to output of the result) for the user. More specifically, the image forming apparatus 2010 is designed so as to allow addition or removal of functional components (process components) constituting application programs. For example, an application program of the image forming apparatus 2010 may be composed of process components for inputting, processing, or outputting data. Compared with an environment where addition and removal of functions are possible only in units of application programs, a framework where application programs are composed of process components allows adding and removing functions based on the process components and thereby makes it possible to improve efficiency in developing application programs and to flexibly provide services to the user. In this embodiment, a process component for inputting data is called an input component, a process component for processing data is called a processing component, and a process component for outputting data is called an output component.

The client PC 2020 is implemented by a general-purpose computer and provides a user interface for operating the image forming apparatuses 2010.

Figure 30:
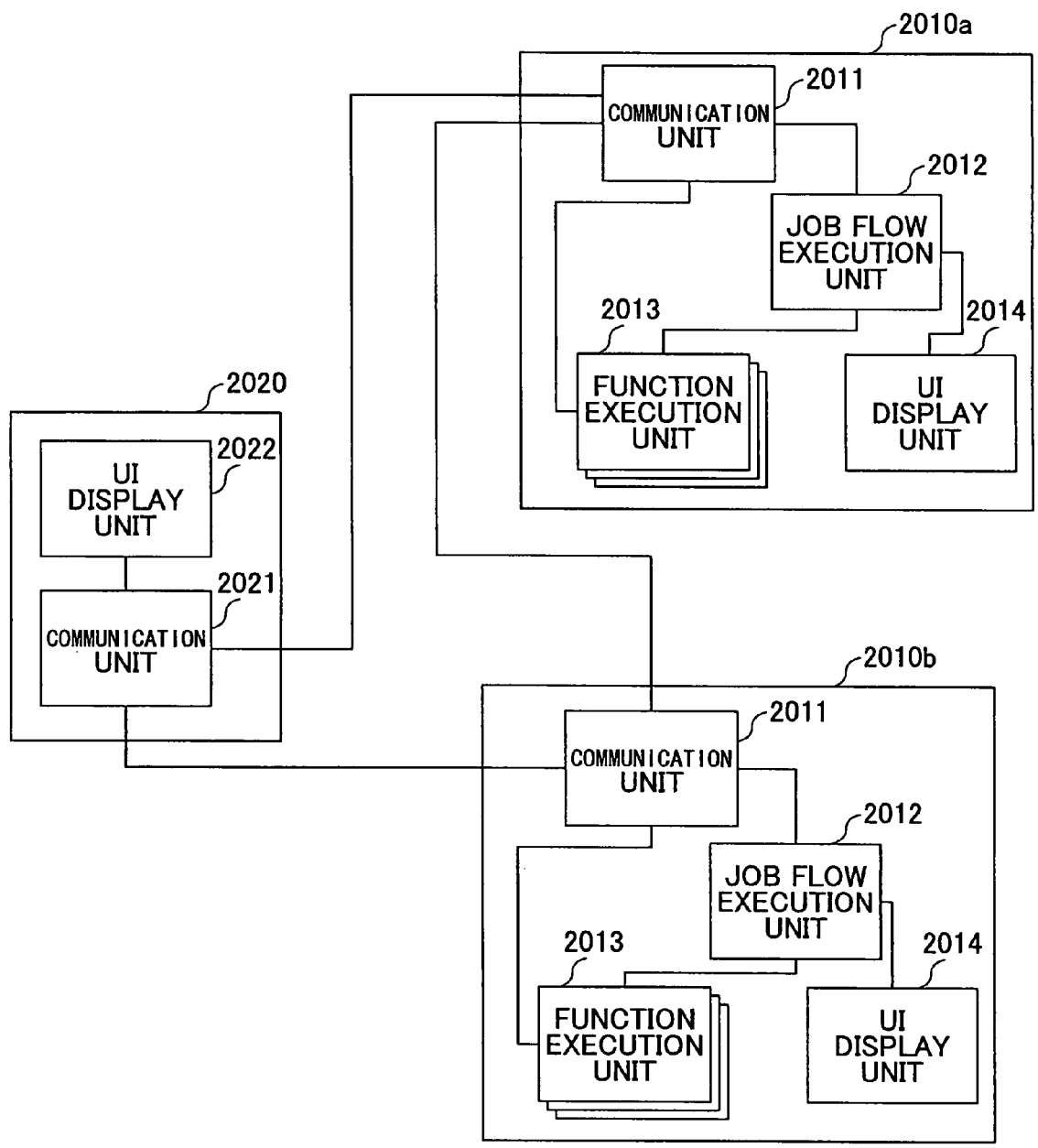
FIG. 30 is a drawing illustrating a functional configuration of the exemplary image processing system according to the fourth embodiment.

FIG. 30 is a drawing illustrating an exemplary functional configuration of the image processing system 2000. As shown in FIG. 30, each of the image forming apparatuses 2010a and 2010b includes a communication unit 2011, a job flow execution unit 2012, function execution units 2013, and a user interface (UI) display unit 2014 as software components. In FIG. 30, the image forming apparatus 2010c is omitted for brevity.

The communication unit 2011 controls network communications. The job flow execution unit 2012 controls processes for registering a job flow and executing a registered job flow. A "job flow" refers to information for controlling the sequence of jobs in an application program and includes a list of process components and the execution sequence of the process components. Thus, the image forming apparatus 2010 of this embodiment is configured to allow the user to register combinations of process components as job flows and to use a service of the image forming apparatus 2010 by selecting the corresponding job flow.

The function execution units 2013 are programs that implement process components in the image forming apparatus 2010 and may be stored in a storage unit such as an HDD. The number and types of the function execution units 2013 may differ depending on the image forming apparatus 2010. Examples of the function execution units 2013 include a scanning component for inputting image data from a scanner, a processing component for processing (for example, N-up processing) image data, a plotter output component for outputting image data on a plotter, and a facsimile component for faxing image data. In this embodiment, a job flow is composed of one or more function execution units 2013. Also, as described above, it is possible to add or remove process components or functional execution units 2013 to/from the image forming apparatus 2010. In other words, it is possible to develop a new function execution unit 2013 and install it in the image forming apparatus 2010.

The client PC 2020 includes a communication unit 2021 and a user interface (UI) display unit 2022 as software components. The communication unit 2021 controls network communications. The UI display unit 2022 provides a user interface for operating the image forming apparatuses 2010 via a network. In this embodiment, a Web browser is used as the UI display unit 2022. However, the UI display unit 2022 may be implemented by a dedicated application program.

Figure 31:
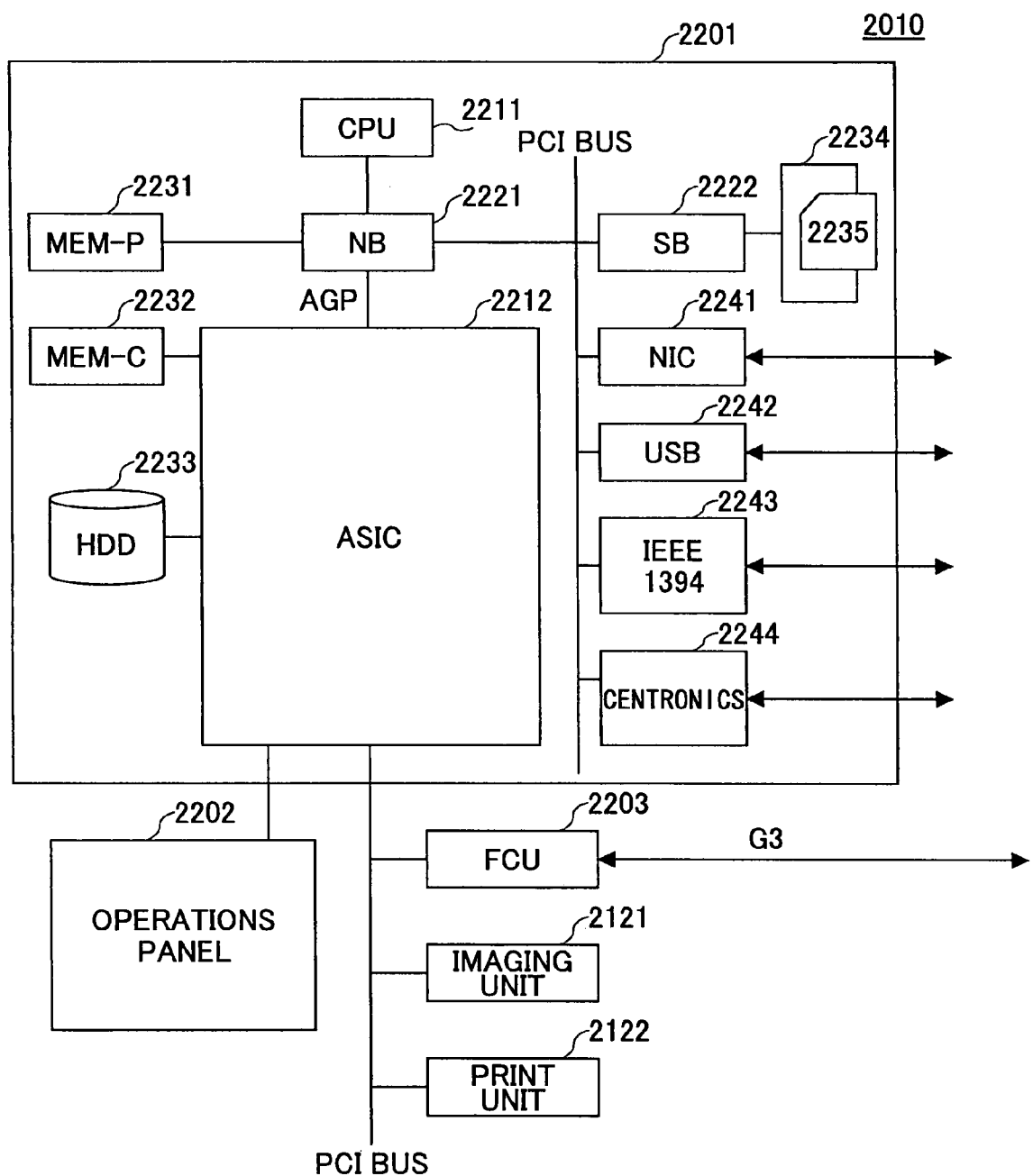
FIG. 31 is a drawing illustrating a hardware configuration of an exemplary image forming apparatus according to the fourth embodiment.

FIG. 31 is a drawing illustrating a hardware configuration of the image forming apparatus 2010 according to the fourth embodiment. The image forming apparatus 2010 includes, as hardware components, a controller 2201, an operations panel 2202, a facsimile control unit (FCU) 2203, an imaging unit 2121, and a print unit 2122.

The controller 2201 includes a CPU 2211, an ASIC 2212, an NB 2221, an SB 2222, a MEM-P 2231, a MEM-C 2232, a hard disk drive (HDD) 2233, a memory card slot 2234, a network interface controller (NIC) 2241, a USB interface 2242, an IEEE 1394 interface 2243, and a Centronics interface 2244.

The CPU 2211 is an IC for information processing. The ASIC 2212 is an IC for image processing. The NB 2221 is the northbridge of the controller 2201. The SB 2222 is the southbridge of the controller 2201. The MEM-P 2231 is a system memory of the image forming apparatus 2010. The MEM-C 2232 is a local memory of the image forming apparatus 2010. The HDD 2233 is a storage device of the image forming apparatus 2010. The memory card slot 2234 is a card slot for a memory card 2235. The NIC 2241 is a controller for controlling network communication based on MAC addresses. The USB interface 2242 is for connecting USB devices. The IEEE 1394 interface 2243 is for connecting devices conforming to the IEEE 1394 standard. The Centronics interface 2244 is for connecting devices conforming to the Centronics standard. The operations panel 2202 functions both as an operations unit for user input and a display unit for displaying information from the image forming apparatuses 2010.

The communication unit 2011, the job flow execution unit 2012, the function execution units 2013, and the UI display unit 2014 may be stored in the MEM-C 2232 or the memory card 2235 and executed by the CPU 2211.

Figure 32:
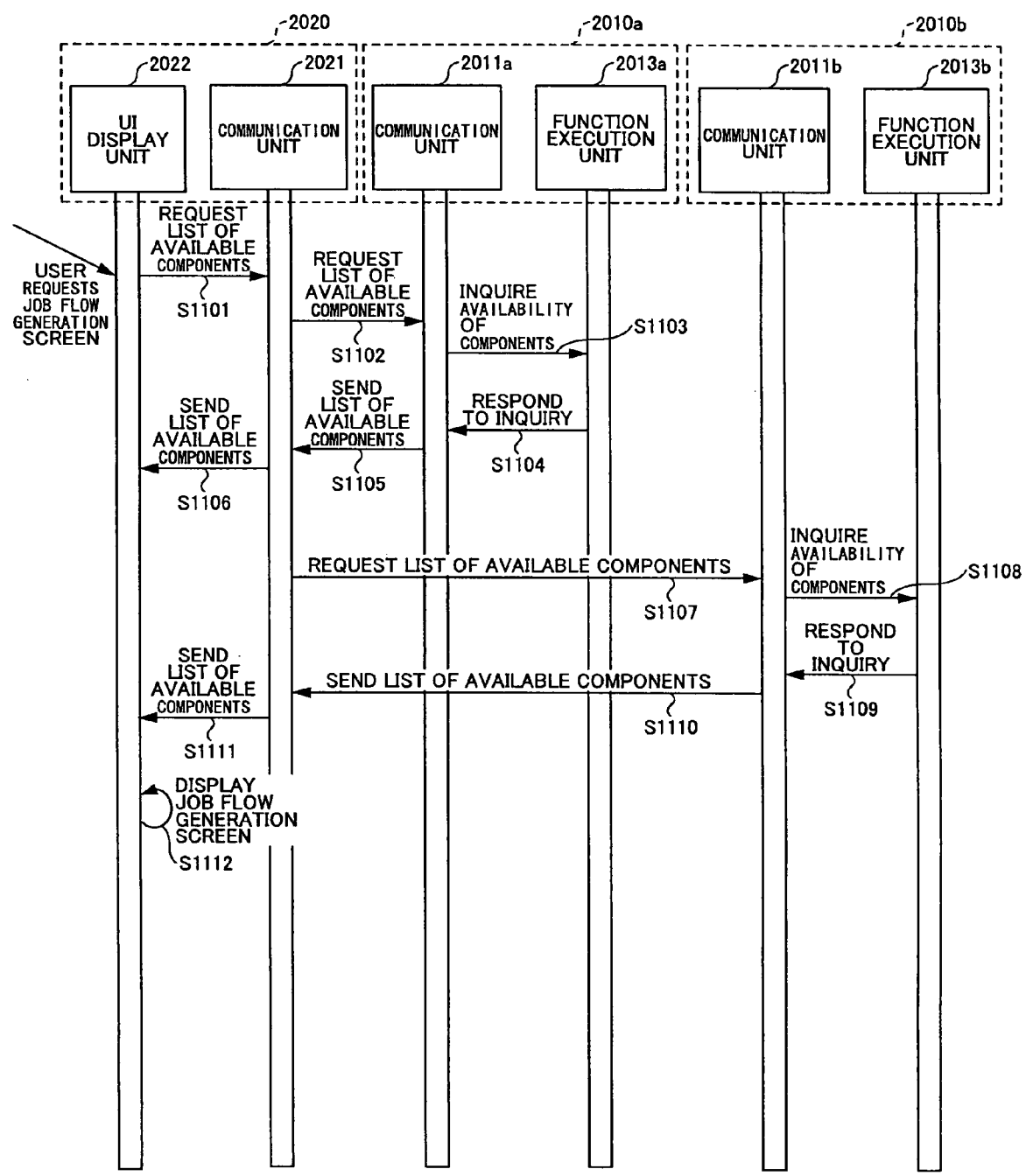
FIG. 32 is a sequence chart showing a process of registering a job flow according to the fourth embodiment.
Figure 33:
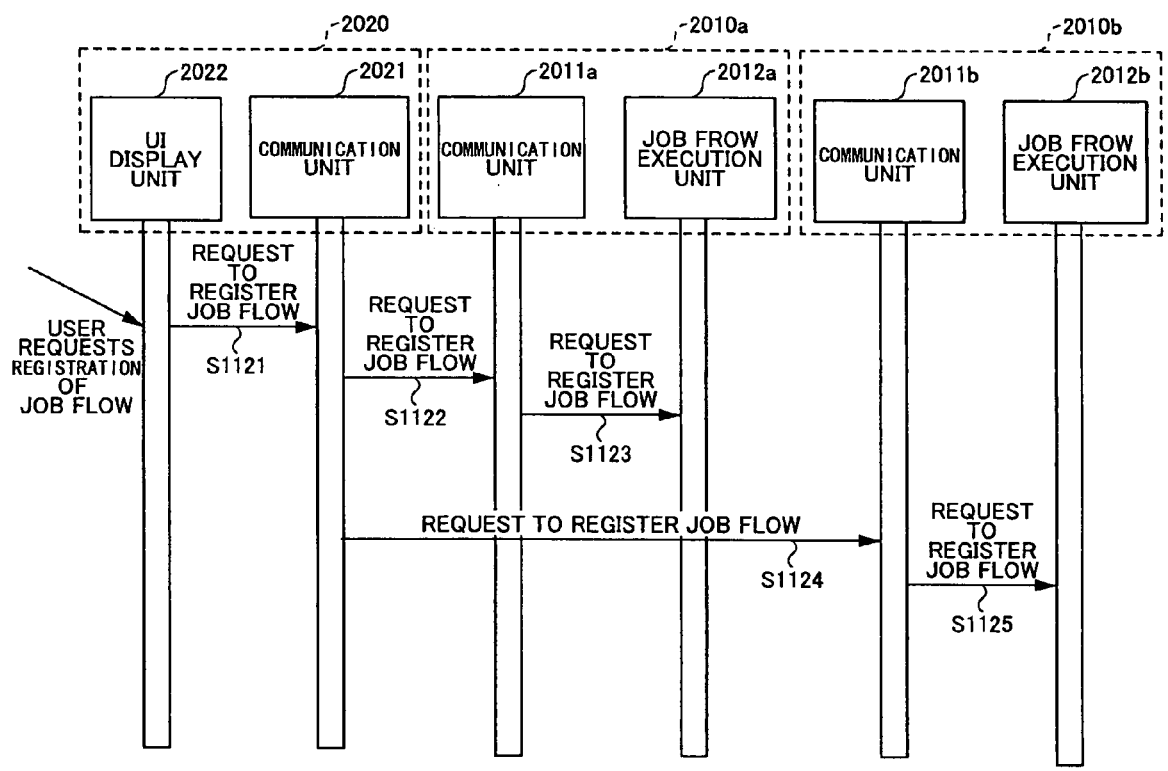
FIG. 33 is a sequence chart showing a process of registering a job flow according to the fourth embodiment.

Exemplary processes in the image processing system 2000 are described below. First, an exemplary process of registering a job flow is described. FIGS. 32 and 33 are sequence charts showing a process of registering a job flow according to the fourth embodiment. In FIGS. 32 and 33, to distinguish components of the image forming apparatus 2010a and components of the image forming apparatus 2010b, "a" is attached to the reference numbers of components of the image forming apparatus 2010a and "b". is attached to those of the image forming apparatus 2010b. The same applies to sequence charts shown in FIGS. 36, 39, and 40.

When the user requests the UI display unit 2022 of the client PC 2020 to display a job flow generation screen for two or more of the image forming apparatuses 2010 (in this example, it is assumed that the image forming apparatuses 2010a and 2010b are selected), the UI display unit 2022 requests the communication unit 2021 to obtain a list of functions (process components) available in the image forming apparatus 2010a and a list of functions (process components) available in the image forming apparatus 2010b (S1101). A job flow generation screen in this case refers to a screen for combining process components, thereby generating (defining) a job flow, and registering the generated job flow. For example, the user selects two or more of the image forming apparatuses 2010 as registration destinations and requests a job flow generation screen from a Web page provided by either of the selected image forming apparatuses 2010 and displayed by the UI display unit 2022. In this exemplary process, it is assumed that the image forming apparatuses 2010a and 2010b are selected. When receiving a request from the UI display unit 2022, the communication unit 2021 requests the image forming apparatuses 2010a and 2010b to send a list of available process components (S1102, S1107).

The communication unit 2011a of the image forming apparatus 2010a refers to the process components (the function execution units 2013a) installed in the image forming apparatus 2010a for their availability (S1103, S1104), generates a list of process components available in the image forming apparatus 2010a, and sends the list to the client PC 2020 (S1105).

Also, the communication unit 2011b of the image forming apparatus 2010b queries the process components (the function execution units 2013b) installed in the image forming apparatus 2010b for their availability (S1108, S1109), generates a list of process components available in the image forming apparatus 2010b, and sends the list to the client PC 2020 (S1110).

The communication unit 2021 of the client PC 2020 sends the lists of process components from the image forming apparatuses 2010a and 2010b to the UI display unit 2022 (S1106, S1111). The UI display unit 2022 displays a job flow generation screen based on the lists of process components on a display unit of the client PC 2020 (S1112).

FIGS. 34A and 34B are drawings illustrating an exemplary job flow generation screen according to the fourth embodiment. FIG. 34A shows the initial state of a job flow generation screen 2310 (immediately after being displayed). FIG. 34B shows the job flow generation screen 2310 where a job flow (definition) has been generated by the user.

The job flow generation screen 2310 includes a job flow generation pane 2301 and a process component list pane 2302. The process component list pane 2302 lists icons or buttons (hereafter called process component icons) representing process components available in the image forming apparatuses 2010a and 2010b separately. In FIGS. 34A and 34B, process components A through D are listed as process components available in an image forming apparatus A (in this case, the image forming apparatus 2010a). Also, process components A, B', and E are listed as process components available in an image forming apparatus B (in this case, the image forming apparatus 2010b).

The job flow generation pane 2301 is used to generate (define) a job flow using the process component icons listed in the process component list pane 2302. As shown in FIG. 34B, the user can generate a job flow by dragging the process component icons in the process component list pane 2302 into the job flow generation pane 2301 and connecting them in the order of execution. For example, a job flow for copying may be generated by connecting a process component for inputting image data by scanning a document (scanning component), a process component for converting image data (image data conversion component), and a process component for outputting image data on a plotter (plotter output component). Double-clicking a process component icon in the job flow generation pane 2301 displays a screen for specifying the execution conditions of the corresponding process component. For example, the execution conditions for a scanning component may include resolution and paper size.

A job flow may include job components from multiple image forming apparatuses 2010. Also, it is possible to include multiple input components, multiple processing components, and/or multiple output components in a job flow. For example, at least two input components and two output components are necessary to generate a job flow that combines a scanned image and an image stored in the HDD 2233 of the image forming apparatus 2010, and prints and faxes the combined image.

When generation of a job flow is completed on the job flow generation screen 2310 and an OK button 2303 is clicked on, the UI display unit 2022 displays a screen for entering a name of the generated job flow (job flow name). After a job flow name is entered on the screen, the UI display unit 2022 sends a request for registering the job flow (job flow registration request) to the communication unit 2021 (S1121 in FIG. 33). The job flow registration request includes information (job flow information or control information) specified on the job flow generation screen 2310 such as a job name, identifiers of process components constituting the job flow, an execution sequence of the process components, execution conditions of the process components, and identifiers (host names or IP addresses) of the image forming apparatuses 2010 on which the process components are to be executed. The communication unit 2021 sends the job flow registration request at least to the communication units (2011a and 2011b) of the image forming apparatuses 2010 (the image forming apparatuses 2010a and 2010b) on which the process components in the job flow are to be executed.

According to the job flow registration request, the communication unit 2011a of the image forming apparatus 2010a requests the job flow execution unit 2012a to register the job flow (S1123). The job flow execution unit 2012a stores the job flow information in the HDD 2233 of the image forming apparatus 2010a in a predetermined format. Similarly, according to the job flow registration request, the communication unit 2011b of the image forming apparatus 2010b requests the job flow execution unit 2012b to register the job flow (S1125). The job flow execution unit 2012b stores the job flow information in the HDD 2233 of the image forming apparatus 2010b in a predetermined format.

FIG. 35 is a table showing exemplary job flow information (or control information) according to the fourth embodiment. FIG. 35 shows job flow information 2131 of a job flow E. As shown in FIG. 35, the job flow information 2131 includes a job flow name, identifiers of process components constituting the job flow, the execution sequence of the process components, and identifiers of the image forming apparatuses 2010 on which the process components are to be executed. The job flow E defined in the job flow information 2131 shown in FIG. 35 corresponds to the job flow shown in FIG. 34B. The job flow E is composed of process components A, B', and D. The process components A and D are executed on the image forming apparatus A and the process component B' is executed on the image forming apparatus B.

Figure 36:
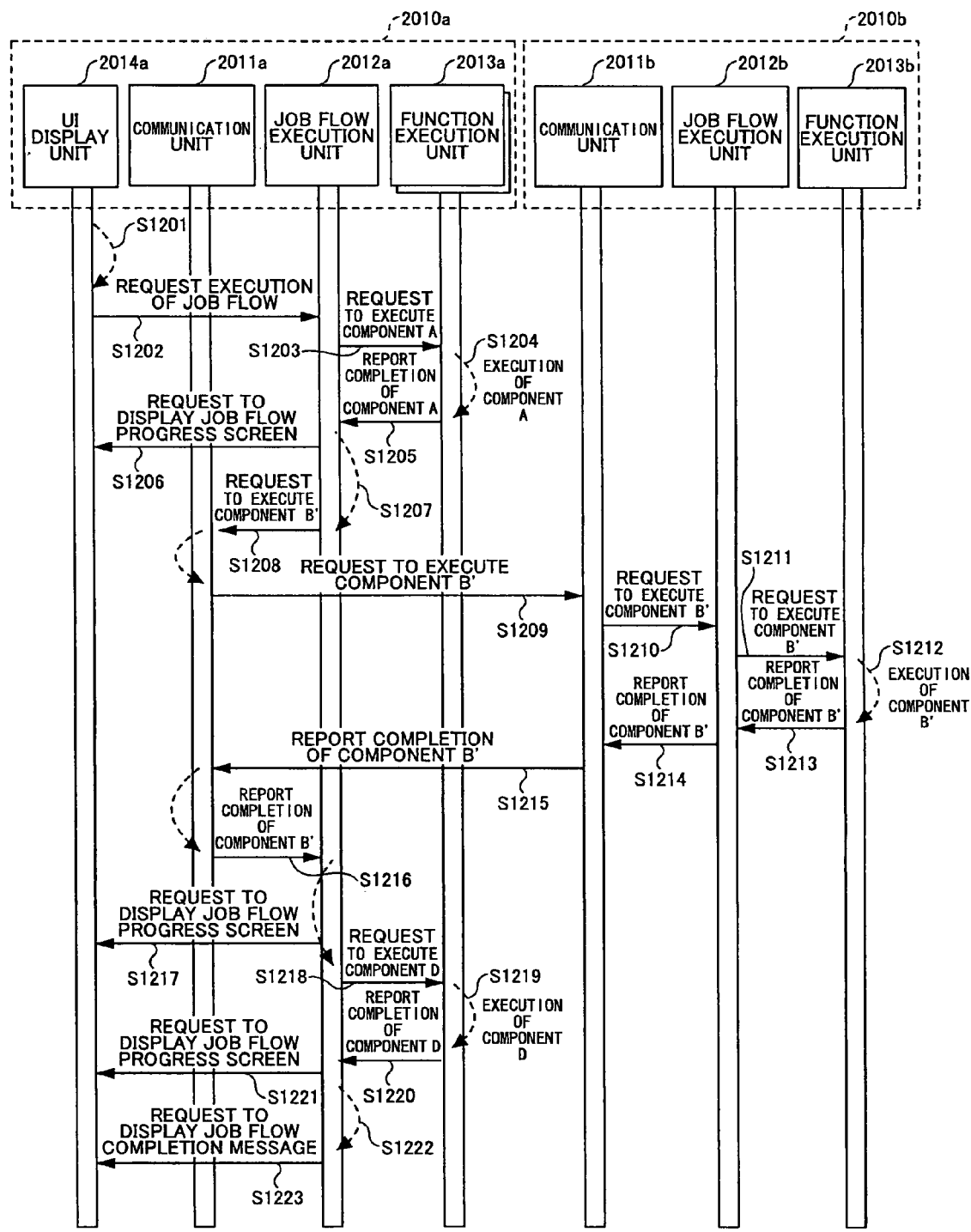
FIG. 36 is a sequence chart showing a first exemplary process of executing a job flow E.

Next, exemplary processes for executing the registered job flow E are described. FIG. 36 is a sequence chart showing a first exemplary process of executing the job flow E according to the fourth embodiment. In the first exemplary process, the user requests the execution of the job flow E on the image forming apparatus 2010a When receiving a request from the user, the UI display unit 2014a of the image forming apparatus 2010a displays a job flow list screen on the operations panel 2202 based on job flow information stored in the HDD 2233 (S1201).

Figure 37:
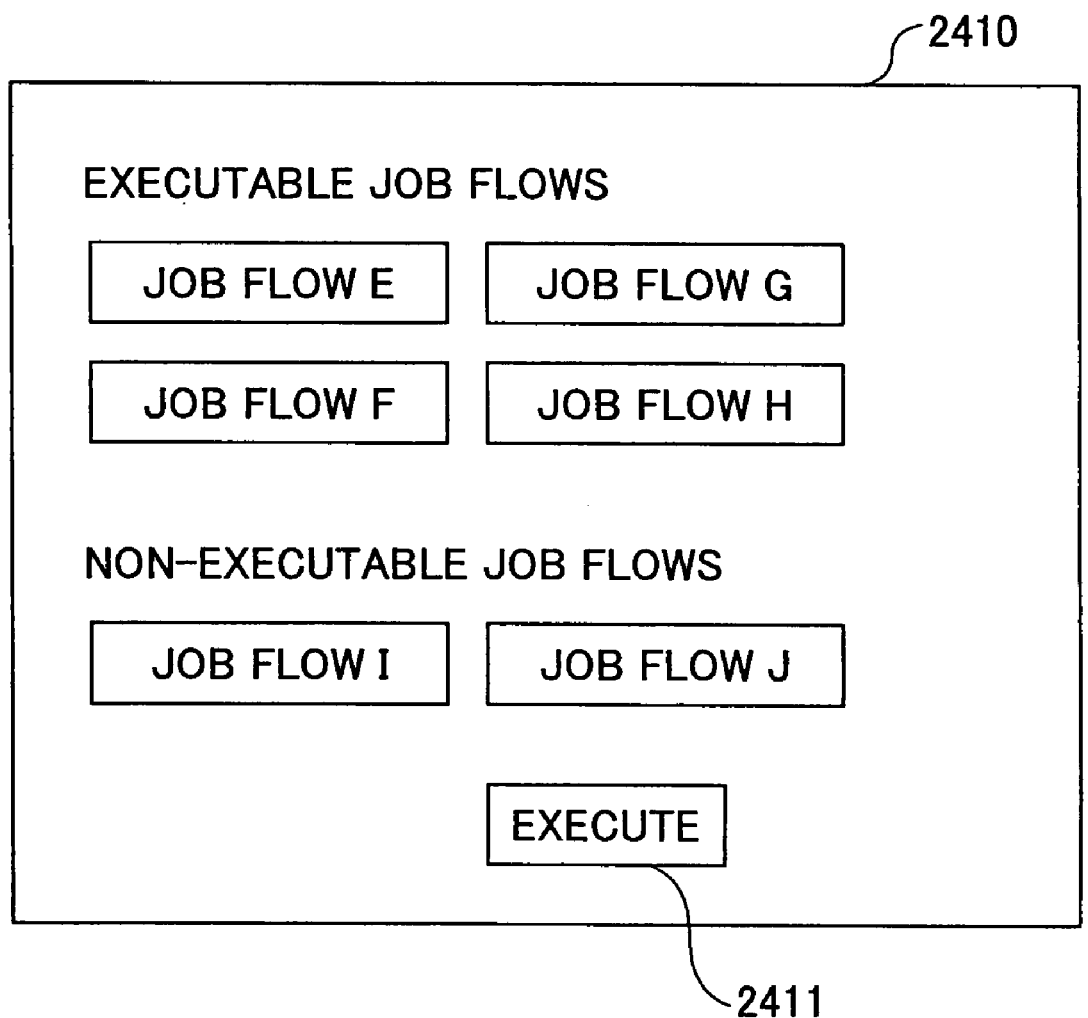
FIG. 37 is a drawing illustrating an exemplary job flow list screen according to the fourth embodiment.

FIG. 37 is a drawing illustrating an exemplary job flow list screen according to the fourth embodiment. As shown in FIG. 37, a job flow list screen 2410 lists job flows (job flow names) registered in the image forming apparatus 2010a. In the job flow list screen 2410, executable job flows and non-executable job flows are listed in separate areas so that the user can easily distinguish the executable job flows from the non-executable job flows. As an alternative, the job flow list screen 2410 may be configured to list only executable job flows. In such a case, the executability of a job flow may be, for example, determined based on whether the first process component (normally an input component) to be executed first in the job flow is available in the current image forming apparatus 2010 on which the user has made a request to execute the job flow. In other words, if the input component of a job flow is available in the current image forming apparatus 2010 (in this case, the image forming apparatus 2010a), the UI display unit 2014a determines that the job flow is executable; and if not, the UI display unit 2014a determines that the job flow is not executable. For example, when the input component of a job flow is a scanning component for inputting image data from a scanner, the user has to place a document on a scan bed. Therefore, the scanning component cannot be executed unless it is available in the current image forming apparatus 2010 where the user manually places a document on a scan bed.

As an exception, for example, when the input component of a job flow is an HDD input component for retrieving image data from the HDD 2233, the HDD input component and the HDD 2233 may be in a remote image forming apparatus 2010 other than the current image forming apparatus 2010 because the user can select the image data in the HDD 2233 of the remote image forming apparatus 2010 via a network. Thus, it is more preferable to determine the executability of a job flow based on whether the first process component to be executed first in the job flow is available in the current image forming apparatus 2010 and whether the first process component requires a manual operation by the user. In this case, job flow information preferably includes information on whether each process component is operable from a remote apparatus.

Also, the image forming apparatus 2010 may be configured to request other image forming apparatuses 2010 where process components in a job flow are to be executed to send information on whether the process components are executable.

When an executable job flow (in this case, job flow E) is selected and an execute button 2411 is pressed on the job flow list screen 2410, the UI display unit 2014a sends the identifier (for example, job flow name) of the job flow E to the job flow execution unit 2012a and thereby requests the execution of the job flow E (S1202). As another example, the image processing system may be configured to display the job flow list screen 2410 on a display unit of an external device such as a PC connected to the image forming apparatus 2010 via a network and to allow the user to send an execution request of a job flow from the external device.

The job flow execution unit 2012a obtains the job flow information of the job flow E based on the job flow name sent from the UI display unit 2014a and dynamically controls the execution of the job flow E based on the obtained job flow information. As shown in FIG. 35, the process component A is to be executed first in the job flow E and to be executed on the image forming apparatus A (the image forming apparatus 2010a). Therefore, the job flow execution unit 2012a calls the function execution unit 2013a of the image forming apparatus 2010a which function execution unit 2013a corresponds to the process component A (S1203). The function execution unit 2013a, for example, retrieves image data from the HDD 2233, and temporarily stores the retrieved image data in a storage area (S1204). After completing the job, the function execution unit 2013a reports the completion of the job to the job flow execution unit 2012a (S1205).

The job flow execution unit 2012a, when receiving the completion report, requests the UI display unit 2014a to display a job flow progress screen indicating the completion of the process component A execution (S1206). The UI display unit 2014a displays the job flow progress screen on the operations panel 2202.

At the same time, the job flow execution unit 2012a determines the next process component to be executed based on the job flow information (S1207). As shown in FIG. 35, the process component B' follows the process component A, and the process component B' is to be executed on the image forming apparatus B (the image forming apparatus 2010b). Therefore, the job flow execution unit 2012a sends a request for executing the job flow E via the communication unit 2011a to the image forming apparatus 2010b (S1208, S1209). The execution request includes the name of a job flow (job flow E) to be executed and an identifier of a process component (process component B') to be executed. Also, the image data temporarily stored in a storage area by the process component A are sent to the image forming apparatus 2010b together with the execution request.

When receiving the execution request for the job flow E, the communication unit 2011b of the image forming apparatus 2010b requests the job flow execution unit 2012b to execute the process component B' and sends the image data to the job flow execution unit 2012b (S1210). The job flow execution unit 2012b temporarily stores the image data in a storage area and calls the function execution unit 2013b corresponding to the process component B' (S1211). The function execution unit 2013b, for example, converts the image data and temporarily stores the converted image data in a storage area (S1212). After completing the job, the function execution unit 2013b reports the completion of the process component B' execution to the job flow execution unit 2012b (S1213). Then, the job flow execution unit 2012b reports completion of the process component B' execution via the communication unit 2011b to the image forming apparatus 2010a (S1214, S1215). Also, the job flow execution unit 2012b sends the image data converted by the process component B' to the image forming apparatus 2010a together with the completion report.

When receiving the completion report of the process component B' execution, the communication unit 2011a of the image forming apparatus 2010a sends the completion report and the converted image data to the job flow execution unit 2012a (S1216). The job flow execution unit 2012a, when receiving the completion report, requests the UI display unit 2014a to display a job flow progress screen indicating the completion of the process component B' execution (S1217). The UI display unit 2014a displays the job flow progress screen on the operations panel 2202.

At the same time, the job flow execution unit 2012a determines the next process component to be executed based on the job flow information. As shown in FIG. 35, the process component D follows the process component B', and the process component D is to be executed on the image forming apparatus A (the image forming apparatus 2010a). Therefore, the job flow execution unit 2012a calls the function execution unit 2013a of the image forming apparatus 2010a which function execution unit 2013a corresponds to the process component D (S1218). The function execution unit 2013a, for example, outputs (prints) the image data on a plotter (the print unit 2122) (S1219). After completing the job, the function execution unit 2013a reports the completion of the job to the job flow execution unit 2012a (S1220). In step S1219, since the process component D is an output component, it does not store the image data in a storage area.

The job flow execution unit 2012a, when receiving the completion report, requests the UI display unit 2014a to display a job flow progress screen indicating the completion of the process component D execution (S1221). The UI display unit 2014a displays the job flow progress screen on the operations panel 2202. At the same time, the job flow execution unit 2012a determines the next process component to be executed based on the job flow information (S1222). As shown in FIG. 35, the process component D is the last process component to be executed in the job flow E. Therefore, the job flow execution unit 2012a requests the UI display unit 2014a to display a message indicating that the execution of the job flow E is completed (S1223). The UI display unit 2014a, for example, displays the message on the operations panel 2202.

Figure 38:
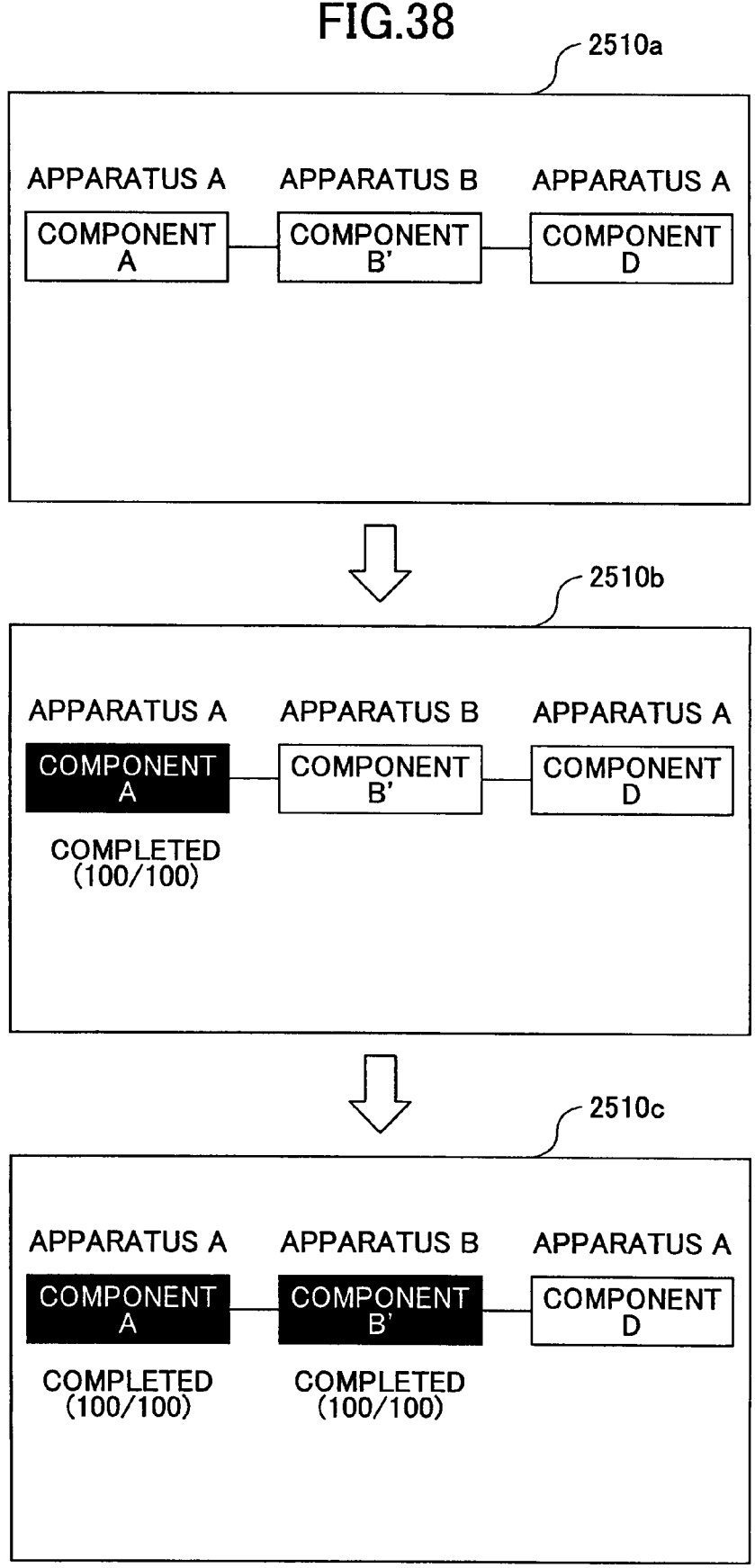
FIG. 38 is a drawing illustrating exemplary job flow progress screens.

FIG. 38 is a drawing illustrating exemplary job flow progress screens.

In FIG. 38, a job flow progress screen 2510a indicates the job flow E before being executed. In the job flow progress screen 2510a, rectangles represent process components constituting the job flow E and the process components are arranged in the order of execution. A job flow progress screen 2510b indicates that the process component A execution has been completed and corresponds to step S1206 shown in FIG. 36. In the job flow progress screen 2510b, the rectangle representing the process component A is shaded to indicate that the process component A execution has been completed. A job flow progress screen 2510c indicates that the process component B' execution has been completed and corresponds to step S1217 shown in FIG. 36. In the job flow progress screen 2510c, the rectangle representing the process component B' is shaded to indicate that the process component B' execution has been completed.

Thus, the job flow progress screens enable the user to easily check the progress of a job flow. In FIG. 38, the number (100/100) displayed under each completed process component indicates a percentage of completion. Thus, the job flow progress screen may be configured to indicate a percentage of completion of executing a process component by changing the number during the execution of the process component. In this case, the UI display unit 2014 updates the job flow progress screen according to the progress of each process component execution in a job flow.

Although two image forming apparatuses 2010 (the image forming apparatuses 2010a and 2010b) are used in the exemplary process shown in FIG. 36, a job flow may be executed by three or more image forming apparatuses 2010.

As described above, the image processing system 2000 of the fourth embodiment makes it possible to execute a job flow composed of process components selected from multiple image forming apparatuses 2010 and thereby to provide better usability. For example, the image processing system 2000 enables the user to use more functions than available with one image forming apparatus 2010. More specifically, the image processing system 2000 enables the user to use functions not available in one image forming apparatus 2010 by making other image forming apparatuses 2010 perform those functions. In other words, the user can use functions of remote image forming apparatuses 2010 by remote-controlling the remote image forming apparatuses 2010 through a local image forming apparatus 2010.

Also, the fourth embodiment makes it possible to implement an application that is normally available only in a high-end image forming apparatus by combining process components in low-end image forming apparatuses and thereby makes it possible to avoid costs necessary to purchase a high-end image forming apparatus.

Further, the fourth embodiment makes it possible to use process components in remote image forming apparatuses. This in turn eliminates the need to install all necessary process components in each image forming apparatus and thereby reduces the workload to maintain process components.

Meanwhile, in the first exemplary process of executing the job flow E described above, the image forming apparatus 2010b takes a passive role. In the first exemplary process, the image forming apparatus 2010a controls the execution of the job flow E based on the job flow information, and the image forming apparatus 2010b just executes the process component B' as requested by the image forming apparatus 2010a and reports the completion of the process component B' execution to the image forming apparatus 2010a. Controlling a job flow or managing job flow information solely by the image forming apparatus 2010a eliminates the need to store the job flow information in the image forming apparatus 2010b and therefore simplifies the management of job flow information.

One disadvantage of the first exemplary process is that it requires passive image forming apparatuses to send resulting image data to a controlling image forming apparatus each time the execution of the corresponding process component is completed. Accordingly, executing a job flow involving execution of process components on many image forming apparatuses as in the first exemplary process may increase the number of times image data are transmitted and therefore increase the network traffic. A second exemplary process described below is designed to solve the above problem.

Figure 39:
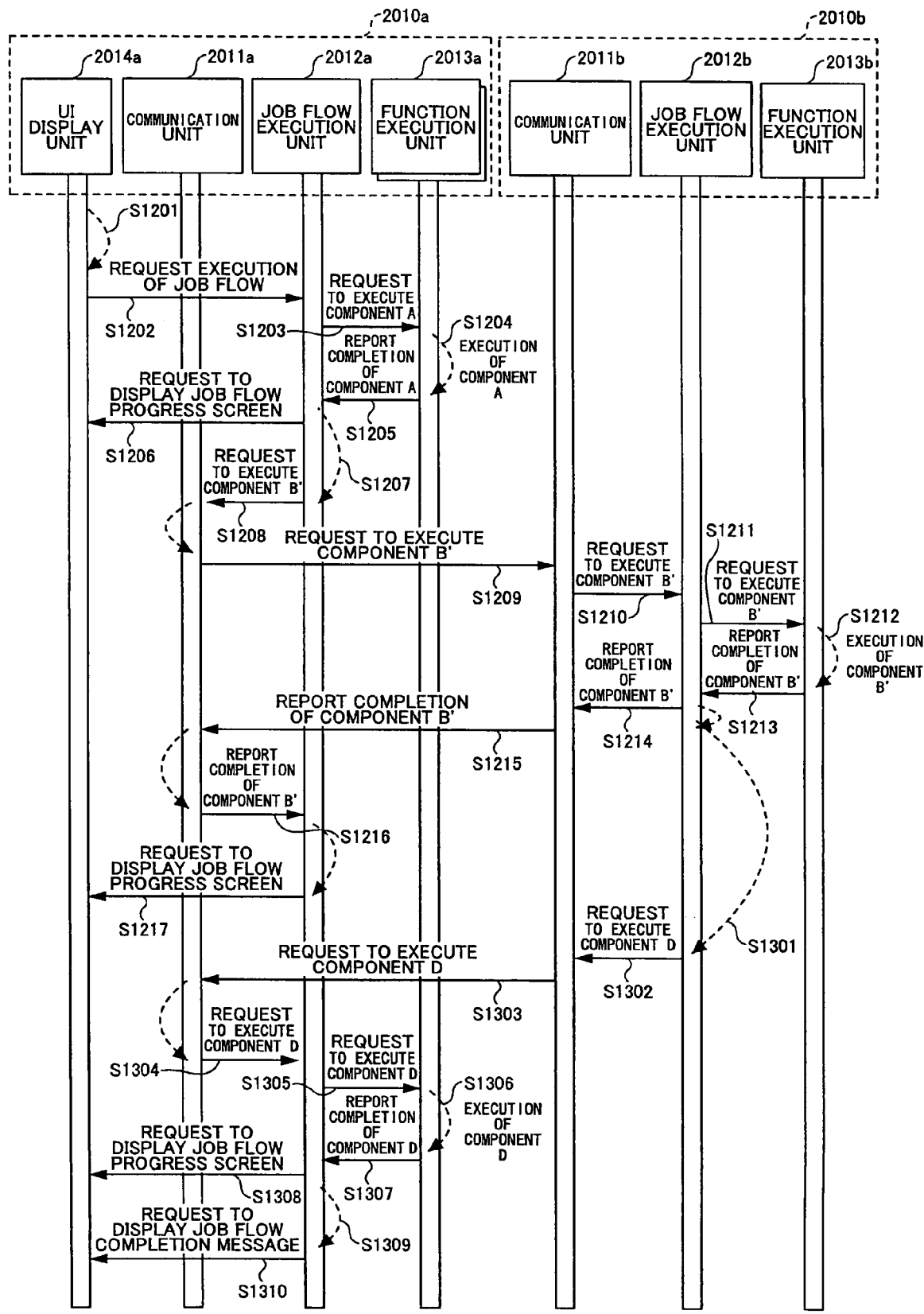
FIG. 39 is a sequence chart showing a second exemplary process of executing a job flow E.

FIG. 39 is a sequence chart showing a second exemplary process of executing the job flow E. In FIG. 39, steps corresponding to those shown in FIG. 36 are assigned the same step numbers and descriptions of those steps are omitted here. In the second exemplary process shown in FIG. 39, unlike in the first exemplary process, the image forming apparatus 2010b determines the next process component to be executed after completing the execution of the process component B' and requests the-execution of the next process component.

When receiving the completion report from the function execution unit 2013b corresponding to the process component B' (S1213), the job flow execution unit 2012b of the image forming apparatus 2010b reports the completion of the process component B' execution via the communication unit 2011b to the image forming apparatus 2010a (S1214, S1215). Unlike in the first exemplary process, the job flow execution unit 2012b does not send the image data converted by the process component B' to the image forming apparatus 2010a together with the completion report.

Instead, the job flow execution unit 2012b determines the next process component to be executed based on the job flow information registered in the image forming apparatus 2010b (S1301). As shown in FIG. 35, the process component D follows the process component B', and the process component D is to be executed on the image forming apparatus A (the image forming apparatus 2010a). Therefore, the job flow execution unit 2012b sends a request for executing the job flow E via the communication unit 2011b to the image forming apparatus 2010a (S1302, S1303). The execution request includes the name of a job flow (job flow E) to be executed and an identifier of a process component (process component D) to be executed. The job flow execution unit 2012b also sends the image data converted by the process component B' to the image forming apparatus 2010a together with the execution request.

When receiving the execution request for the job flow E and the image data, the communication unit 2011a of the image forming apparatus 2010a requests the job flow execution unit 2012a to execute the process component D and sends the received image data to the job flow execution unit 2012a (S1304). Step S1305 and subsequent steps (the execution of the process component D to the display of a completion message) are substantially the same as step S1218 and subsequent steps shown in FIG. 36 and therefore descriptions of those steps are omitted here.

Thus, in the second exemplary process, each image forming apparatus 2010 determines the next process component to be executed and requests execution of the next process component. In other words, an execution request and the accompanying image data are sent from one image forming apparatus to another without going through a controlling image forming apparatus. Therefore, compared with the first exemplary process, the second exemplary process makes it possible to reduce the network traffic and to improve the process efficiency. Even in the second exemplary process, job flow information is not necessarily registered in each image forming apparatus 2010. For example, job flow information may be sent from one image forming apparatus 2010 to another together with the execution request of a process component.

Figure 40:
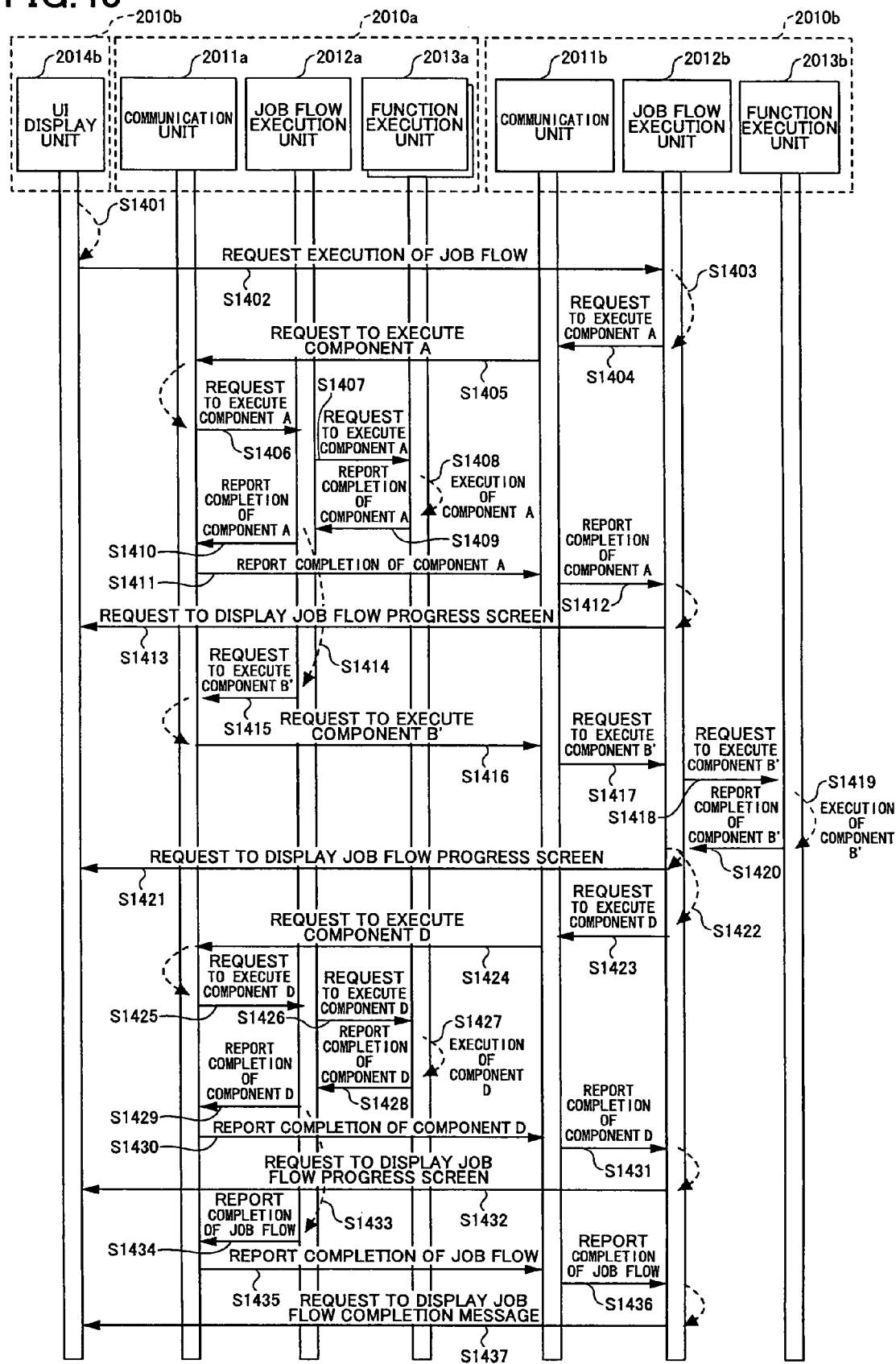
FIG. 40 is a sequence chart showing a third exemplary process of executing a job flow E.

Next, a third exemplary process of executing the job flow E is described. FIG. 40 is a sequence chart showing the third exemplary process of executing the job flow E. In the third exemplary process, it is assumed that the user requests the execution of the job flow E on the image forming apparatus 2010b where the first process component of the job flow E is not available.

When receiving a request from the user, the UI display unit 2014b of the image forming apparatus 2010b displays the job flow list screen 2410 as shown in FIG. 37 on the operations panel 2202 based on job flow information stored in the HDD 2233 (S1401). Executable job flows listed in the job flow list screen 2410 displayed by the image forming apparatus 2010b do not necessarily match those listed in the job flow list screen 2410 displayed by the image forming apparatus 2010a, since the executability of a job flow is determined as described above by the type of the first process component in the job flow. Here, it is assumed that the job flow E is executable on both the image forming apparatuses 2010a and 2010b When an executable job flow (in this case, job flow E) is selected and the execute button 2411 is pressed on the job flow list screen 2410, the UI display unit 2014b sends the identifier (for example, job flow name) of the job flow E to the job flow execution unit 2012b and thereby requests the execution of the job flow E (S1402).

The job flow execution unit 2012b obtains the job flow information of the job flow E based on the job flow name sent from the UI display unit 2014b and determines the first process component to be executed in the job flow E based on the obtained job flow information (S1403). As shown in FIG. 35, the process component A is to be executed first in the job flow E and to be executed on the image forming apparatus A (the image forming apparatus 2010a). Therefore, the job flow execution unit 2012b sends a request for executing the job flow E via the communication unit 2011b to the image forming apparatus 2010a (S1404, S1405). The execution request includes the name of a job flow (job flow E) to be executed and an identifier of a process component (process component A) to be executed.

When receiving the execution request for the job flow E, the communication unit 2011a of the image forming apparatus 2010a requests the job flow execution unit 2012a to execute the process component A (S1406). The job flow execution unit 2012a calls the function execution unit 2013a corresponding to the process component A (S1407). The function execution unit 2013a performs a job (executes a function) corresponding to the process component A and saves the resulting image data in a storage area (S1408). After completing the job, the function execution unit 2013a reports the completion of the process component A execution to the job flow execution unit 2012a (S1409). The job flow execution unit 2012a reports the completion of the process component A execution via the communication unit 2011a to the image forming apparatus 2010b (S1410, S1411). When receiving the completion report of the process component A execution, the communication unit 2011b of the image forming apparatus 2010b sends the completion report to the job flow execution unit 2012b (S1412). The job flow execution unit 2012b, when receiving the completion report, requests the UI display unit 2014b to display a job flow progress screen indicating the completion of the process component A execution (S1413) The UI display unit 2014b displays the job flow progress screen on the operations panel 2202.

The job flow execution unit 2012a of the image forming apparatus 2010a, when receiving the completion report in step S1409, also determines the next process component (the process component B' to be executed on the image processing apparatus 2010b) based on the job flow information (S1414). Then, the job flow execution unit 2012a sends a request for executing the job flow E via the communication unit 2011a to the image forming apparatus 2010b (S1415, S1416). The execution request includes the name of a job flow (job flow E) to be executed and an identifier of a process component (process component B') to be executed. The job flow execution unit 2012a also sends the image data temporarily stored in a specified storage area by the process component A to the image forming apparatus 2010b together with the execution request.

In the subsequent steps S1417 through S1420, as in steps S1211 through S1213 shown in FIG. 36, the process component B' is executed on the image forming apparatus 2010b. When receiving the completion report of the process component B' execution (S1420), the job flow execution unit 2012b requests the UI display unit 2014b to display a job flow progress screen indicating the completion of the process component B' execution (S1421). The UI display unit 2014b displays the job flow progress screen on the operations panel 2202.

The job flow execution unit 2012b, when receiving the completion report in step S1420, also determines the next process component (the process component D to be executed on the image processing apparatus 2010a) based on the job flow information registered in the image forming apparatus 2010b (S1422). Then, the job flow execution unit 2012b sends a request for executing the job flow E via the communication unit 2011b to the image forming apparatus 2010a (S1423, S1424). The execution request includes the name of a job flow (job flow E) to be executed and an identifier of a process component (process component D) to be executed. The job flow execution unit 2012b also sends the image data converted by the process component B' to the image forming apparatus 2010a together with the execution request.

In the subsequent steps S1425 through S1428, as in steps S1304 through S1307 shown in FIG. 39, the process component D is executed on the image forming apparatus 2010a. When receiving the completion report of the process component D execution (S1428), the job flow execution unit 2012a reports the completion of the process component D execution via the communication unit 2011a to the image forming apparatus 2010b (S1429, S1430). The communication unit 2011b of the image forming apparatus 2010b, when receiving the completion report of the process component D execution, sends the completion report to the job flow execution unit 2012b (S1431). The job flow execution unit 2012b then requests the UI display unit 2014b to display a job flow progress screen indicating the completion of the process component D execution (S1432). The UI display unit 2014b displays the job flow progress screen on the operations panel 2202.

The job flow execution unit 2012a of the image forming apparatus 2010a, when receiving the completion report in step S1428, also determines that execution of the job flow E has been completed based on the job flow information (S1433). Then, the job flow execution unit 2012a sends a completion report of the job flow E execution via the communication unit 2011a to the image forming apparatus 2010b (S1434, S1435).

When receiving the completion report of the job flow E execution, the communication unit 2011b of the image forming apparatus 2010b sends the completion report to the job flow execution unit 2012b (S1436). The job flow execution unit 2012b requests the UI display unit 2014b to display a message indicating that the execution of the job flow E has been completed (S1437). The UI display unit 2014b, for example, displays the message on the operations panel 2202.

Thus, the fourth embodiment also makes it possible to request execution of a job flow on an image forming apparatus 2010 in which the first process component of the job flow is not available and thereby to improve the usability of the image processing system 2000.

The job flow execution unit 2012 of the image forming apparatus 2010 is an example of a job flow execution control unit.

Embodiments of the present invention provide an image processing apparatus and an information processing system that make it possible to implement an application program by combining process components while maintaining good operability.

According to an embodiment of the present invention, an information processing system includes at least one image processing apparatus including process components configured to input, process, or output image data; and an information processing apparatus connected via a network to the image processing apparatus and configured to obtain a list of the process components available in the image processing apparatus, to display on a display unit a screen for selecting one or more of the process components from the list and thereby defining a combination of the process components which combination implements an application program for performing an image processing task, and to register the combination with an identifier in the image processing apparatus.

An embodiment of the present invention provides a method of registering an application program for performing an image processing task which application program is implemented by a combination of process components configured to input, process, or output image data. The method includes a list obtaining step of obtaining a list of the process components available in an image processing apparatus; a list display step of displaying on a display unit a screen for selecting one or more of the process components from the list and thereby defining the combination of the process components; and a registration step of registering the combination with an identifier in the image processing apparatus.

In the above method of registering an application program, the execution sequence of the process components in the combination may be specified on the displayed screen.

The above method of registering an application program may also include an identifier entering step of entering the identifier of the combination.

As an alternative, the identifier of the combination may be automatically generated based on the process components in the combination.

The above method of registering an application program may also include a second list obtaining step of obtaining a list of the process components available in another image processing apparatus connected via a network to the image processing apparatus. In this case, the list display step may be designed to display on the display unit a screen for selecting one or more of the process components from the lists of the process components available in the image forming apparatus and the another image forming apparatus and thereby defining the combination of the process components, and the registration step may be designed to register the combination with the identifier in the image processing apparatus and the another image processing apparatus.

Another embodiment of the present invention provides a method of registering an application program in an information processing system including at least one image processing apparatus and an information processing apparatus connected via a network to the image processing apparatus. The method is performed by the information processing apparatus and includes a list obtaining step of obtaining a list of process components available in the image processing apparatus which process components are configured to input, process, or output image data; a list display step of displaying on a display unit a screen for selecting one or more of the process components from the list and thereby defining a combination of the process components which combination implements an application program for performing an image processing task; and a registration step of registering the combination with an identifier in the image processing apparatus.

Another embodiment of the present invention provides a method of executing an application program for performing an image processing task which application program is implemented by a combination of process components configured to input, process, or output image data. The method includes a storing step of storing combinations of the process components, an analysis step of determining whether the combinations are executable based on availability information sent from the process components and indicating whether the process components are available, and a display control step of displaying a list of the combinations on a display unit based on determination results from the analysis step in such a manner that executable ones of the combinations are distinguishable.

The analysis step of the above method of executing an application program may be designed to determine that a combination is not executable if one or more of the process components in the combination are not available.

The display control step of the above method of executing an application program may be designed to display availability of each of the process components on the display unit.

The above method of executing an application program may also include an execution control step of controlling execution of a selected one of the combinations included in the displayed list.

In the above method of executing an application program, the process components send identifiers of programs performing the functions of the process components together with the availability information, and the execution control step may be designed to dynamically call the programs corresponding to the process components in the selected one of the combinations based on the identifiers.

According to another embodiment of the present invention, an information processing system includes multiple electronic apparatuses configured to implement an application program for performing an information processing task by a combination of process components configured to input, process, or output electronic data, wherein the information processing system is configured such that a first one of the electronic apparatuses executes one of the process components in the combination to input the electronic data and a second one of the electronic apparatuses executes at least another one of the process components in the combination to process or output the electronic data.

In the above information processing system, at least the first one of the electronic apparatuses may retain control information containing identifiers of the process components in the combination, an execution sequence of the process components in the combination, and identifiers of the electronic apparatuses that execute the process components in the combination; and the first one of the electronic apparatuses may be configured to cause the second one of the electronic apparatuses to execute the at least another one of the process components based on the control information.

In the above information processing system, the second one of the electronic apparatuses may be configured to determine a next one of the process components to be executed based on the control information.

In the above information processing system, the second one of the electronic apparatuses may also retain the control information.

In the above information processing system, at least one of the electronic apparatuses may be configured to obtain a list of the process components available in the at least one of the electronic apparatuses and other ones of the electronic apparatuses connected via a network to the at least one of the electronic apparatuses, to display on a display unit a screen for selecting one or more of the process components from the list and thereby defining the combination of the process components, and to register the control information of the combination in at least each of the electronic apparatuses that execute the process components in the combination.

In the above information processing system, the first one of the electronic apparatuses may be configured to transfer the control information to the second one of the electronic apparatuses.

The above information processing system may be configured to display the progress of execution of the process components on the display unit.

According to another embodiment of the present invention, an electronic apparatus includes an execution control unit configured to implement an application program for performing an information processing task by a combination of process components configured to input, process, or output electronic data, wherein the execution control unit causes another electronic apparatus connected to the electronic apparatus to execute at least one of the process components in the combination to input, process, or output the electronic data.

Another embodiment of the present invention provides an information processing method in an information processing system including multiple electronic apparatuses configured to implement an application program for performing an information processing task by a combination of process components configured to input, process, or output electronic data. The method includes the steps of inputting the electronic data by one of the process components of a first one of the electronic apparatuses and processing or outputting the electronic data by one of the process components of another one of the electronic apparatuses.

Still another embodiment of the present invention provides an information processing method in an information processing system including multiple electronic apparatuses configured to implement an application program for performing an information processing task by a combination of process components configured to input, process, or output electronic data. The information processing method includes the step of executing the combination on a first one of the electronic apparatuses, wherein the first one of the electronic apparatuses causes another one of the electronic apparatuses to execute at least one of the process components in the combination.

The present invention is not limited to the specifically disclosed embodiments, and variations and modifications may be made without departing from the scope of the present invention.

The present application is based on Japanese Priority Application No. 2006-148861 filed on May 29, 2006, Japanese Priority Application No. 2006-148862 filed on May 29, 2006, Japanese Priority Application No. 2006-148863 filed on May 29, 2006, and Japanese Priority Application No. 2007-088518 filed on Mar. 29, 2007, the entire contents of which are hereby incorporated herein by reference.

What is claimed is:

1. An image processing apparatus, comprising:
   process components configured to input, process, or output image data; and
   a registration unit configured to obtain a list of the process components available in the image processing apparatus, to display on a display unit a screen for selecting a plurality of the process components from the list and thereby defining a combination of the process components which combination implements an application program for performing an image processing task, and to register the combination with an identifier in the image processing apparatus.

2. The image processing apparatus as claimed in claim 1, wherein the screen displayed by the registration unit has a function to specify an execution sequence of the process components in the combination.

3. The image processing apparatus as claimed in claim 1, wherein the registration unit is configured to display a screen for entering the identifier of the combination.

4. The image processing apparatus as claimed in claim 1, wherein the registration unit is configured to automatically generate the identifier of the combination based on the process components in the combination.

5. The image processing apparatus as claimed in claim 1, wherein the registration unit is configured to also obtain a list of the process components available in another image processing apparatus connected via a network to the image processing apparatus, to display on the display unit a screen for selecting a plurality of the process components from the lists of the process components available in the image processing apparatus and the other image processing apparatus and thereby defining the combination of the process components, and to register the combination with the identifier in the image processing apparatus and the other image processing apparatus.

6. The image processing apparatus as claimed in claim 1, wherein the screen displayed by the registration unit has a function to specify a timing at which an adjacent pair of the process components in the combination are synchronized and to register the timing in the image processing apparatus.

7. The image processing apparatus as claimed in claim 1, wherein the registration unit is configured to determine whether the application program implemented by the combination of the process components is executable based on attribute information of the process components in the combination and to register the combination with the identifier in the image processing apparatus if the application program is executable.

8. The image processing apparatus as claimed in claim 7, wherein the registration unit is configured to display an error screen if the application program is not executable.

9. The image processing apparatus as claimed in claim 7, wherein the attribute information contains image data formats that the process components can handle.

10. An image processing apparatus, comprising:
    process components configured to input, process, or output image data;
    a storing unit configured to store combinations of the process components, wherein each of the combinations implements an application program for performing an image processing task;
    an analysis unit configured to determine whether the combinations are executable based on availability information sent from the process components and indicating whether the process components are available; and
    a display control unit configured to display a list of the combinations on a display unit based on determination results from the analysis unit in such a manner that executable ones of the combinations are distinguishable.

11. The image processing apparatus as claimed in claim 10, wherein, if one or more of the process components in one of the combinations are not available, the analysis unit determines that the one of the combinations is not executable.

12. The image processing apparatus as claimed in claim 10, wherein the display control unit is configured to display on the display unit the availability information of the process components in the combinations.

13. The image processing apparatus as claimed in claim 10, wherein the analysis unit is configured to control execution of a selected one of the combinations included in the displayed list.

14. The image processing apparatus as claimed in claim 13, wherein the process components are configured to send the analysis unit identifiers of programs performing functions of the process components together with the availability information; and the analysis unit is configured to dynamically call the programs corresponding to the process components in the selected one of the combinations based on the identifiers.

15. An information processing system, comprising:

multiple electronic apparatuses configured to implement an application program for performing an information processing task by a combination of process components configured to input, process, or output electronic data; wherein the information processing system is configured such that a first one of the electronic apparatuses executes one of the process components in the combination to input the electronic data and a second one of the electronic apparatuses executes at least another one of the process components in the combination to process or output the electronic data.

16. The information processing system as claimed in claim 15, wherein at least the first one of the electronic apparatuses retains control information containing identifiers of the process components in the combination, an execution sequence of the process components in the combination, and identifiers of the electronic apparatuses that execute the process components in the combination; and the first one of the electronic apparatuses is configured to cause the second one of the electronic apparatuses to execute the at least another one of the process components based on the control information.

17. The information processing system as claimed in claim 16, wherein at least one of the electronic apparatuses is configured to obtain a list of the process components available in the at least one of the electronic apparatuses and other ones of the electronic apparatuses connected via a network to the at least one of the electronic apparatuses, to display on a display unit a screen for selecting a plurality of the process components from the list and thereby defining the combination of the process components, and to register the control information of the combination at least in the first one of the electronic apparatuses.

18. The information processing system as claimed in claim 17, wherein the displayed screen has a function to specify the execution sequence of the process components in the combination.

19. The information processing system as claimed in claim 16, wherein the first one of the electronic apparatuses is configured to determine a next one of the process components to be executed based on the control information when execution of the at least another one of the process components is completed by the second one of the electronic apparatuses.

20. The information processing system as claimed in claim 16, wherein the second one of the electronic apparatuses is configured to determine a next one of the process components to be executed based on the control information.

\* \* \* \* \*